United States Patent [19]
Sasaki et al.

[11] Patent Number: 5,499,306
[45] Date of Patent: Mar. 12, 1996

[54] POSITION-AND-ATTITUDE RECOGNITION METHOD AND APPARATUS BY USE OF IMAGE PICKUP MEANS

[75] Inventors: Mikio Sasaki; Yukihiro Kanayama; Hideki Saitou, all of Kariya; Tetsuya Kominami, Oobu, all of Japan

[73] Assignee: Nippondenso Co., Ltd., Kariya, Japan

[21] Appl. No.: 206,828

[22] Filed: Mar. 7, 1994

[30] Foreign Application Priority Data

| | | | | |
|---|---|---|---|---|
| Mar. 8, 1993 | [JP] | Japan | ................................ | 5-046362 |
| Mar. 10, 1993 | [JP] | Japan | ................................ | 5-049240 |
| Oct. 1, 1993 | [JP] | Japan | ................................ | 5-247228 |
| Oct. 1, 1993 | [JP] | Japan | ................................ | 5-247229 |
| Nov. 9, 1993 | [JP] | Japan | ................................ | 5-279223 |

[51] Int. Cl.$^6$ .................................................. G06K 9/36
[52] U.S. Cl. ......................... 382/291; 382/153; 382/203
[58] Field of Search ................................... 382/48, 49, 1, 382/8, 100, 153, 203, 291, 302; 348/94, 95; 395/85, 86, 89, 94

[56] References Cited

U.S. PATENT DOCUMENTS

4,942,539  7/1990  McGee et al. ............................ 348/94

FOREIGN PATENT DOCUMENTS

| | | |
|---|---|---|
| 63-134912 | 6/1988 | Japan . |
| 2243914 | 9/1990 | Japan . |
| 3166072 | 7/1991 | Japan . |
| 3166073 | 7/1991 | Japan . |
| 5138582 | 6/1993 | Japan . |

OTHER PUBLICATIONS

Kanayama et al: "Position-and-Attitude Recognition for Autonomous Mobile Robot System" pp. 1–8 Nov. 11, 1993.
Saito, et al "A Fast and Robust Localization for a Hand–Eye System"; Computer Television; 85–5; Sep. 30, 1993; pp. 33–40.

Sasaki et al: "The Calculation of the Position and the Attitude of a Viewpoint by Monocular Vision" PCSJ 93; Oct. 4–6; pp. 57 and 58.

Feddema et al., "Automatic Selection of Image Features For Visual Servoing of a Robot Manipulator," IEEE, 1989, pp. 832–837.

Y. Kuno, Y. Okamoto, and S. Okada, "Robot Vision Using a Feature Search Strategy Generated from a 3-D Object Model," IEEE Trans. Patt. Anal. Machine Intell., vol. 13, No. 10, pp. 1085–1097, Oct. 1991.

*Primary Examiner*—Leo Boudreau
*Assistant Examiner*—Phuoc Tran
*Attorney, Agent, or Firm*—Cushman, Darby & Cushman

[57] ABSTRACT

A positional relationship between an autonomous mobile robot and a workpiece to be handled by the robot is calculated promptly and accurately on the basis of the image information obtained from a monocular vision camera mounted on the robot. Extracting the image feature points of the workpiece taken by the camera, a search region with a plurality of discrete space points is set on the basis of the estimated position and attitude of the camera. Then, the estimated image feature points of the workpiece, to be obtained when the workpiece is taken a view from these space points, are obtained. Then an error between the image feature point and the estimated feature point is calculated, and the position and attitude of the camera can be determined by finding the space point where the error is minimized.

19 Claims, 29 Drawing Sheets

1) $(X,Y) \xrightarrow{\gamma} (X',Y') \; (Z'=Z)$

2) $(X',Z') \xrightarrow{\alpha} (X'',Y'') \; (Y''=Y')$

3) $(Y'',Z'') \xrightarrow{\beta} (y,z) \; (x=X'')$

POSITION-AND-ATTITUDE RECOGNITION METHOD AND APPARATUS BY USE OF IMAGE PICKUP MEANS

BACKGROUND OF THE INVENTION

1. Field of the Invention

The present invention relates to a position-and-attitude recognition method and apparatus to recognize the 3-dimensional position and the 3-dimensional attitude of a monocular vision camera, which is mounted on an autonomous mobile robot or the like, on the basis of image information of the handling object taken by the monocular vision camera.

2. Description of the Prior Art

One of recently developed robot is an autonomous mobile robot, which moves toward a handling object whose shape and absolute coordinate position are already known and executes an active manipulation, such as gripping of the handling object by the robot arm. For this kind of autonomous mobile robot, it is mandatory to recognize the 3-dimensional position thereof with respect to the handling object on the basis of 2-dimensional image information obtained from, for example, a CCD camera installed on the robot. In this case, an excellent apparatus for executing recognition of 3-dimensional position will be required to realize high accuracy and rapid calculation, as well as reduction of computational costs.

Among conventional methods, a relatively simple method is disclosed, for example, in Unexamined Japanese Patent Application No. HEI 3-166072/1991 or Unexamined Japanese Patent Application No. HEI 3-166073/1991. According to these conventional methods, a camera takes a view of a geometric shape a so-called marker whose shape and size are already known, fixed on the handling object. For example, obtaining a center of gravity of the marker based on thus obtained two-dimensional image information, the three-dimensional positional relationship between the camera and the handling object is determined.

However, the above conventional method always requires a marker to be provided on the handling object; therefore, it takes a significantly long time for preparation of markers and the camera needs its position to be adjusted its position with respect to the marker every time so that an optical axis of the camera is always perpendicular to each marker. Such an aiming adjustment will be troublesome, if applied to a camera which varies its position and attitude flexibly.

In order to solve this kind of problem, there is known a theoretical method for computer vision that inversely calculates the parameters representing the position and attitude of a camera based on the components of the perspective transformation matrix in the solution of the Perspective n-Point problem with a least-square estimation. According to this method, its principle assures obtaining the parameters representing the position and attitude of the camera even if the relationship is unknown between the optical axis of the camera and the origin of the absolute coordinates depicting the object.

However, in a case where a computer is actually used for the execution of explicit calculations, not only are the equations to be adopted very complicated but the volume of calculation becomes huge. It means that promptness in calculation is not guaranteed and, therefore, practical use of this kind method is not recommendable.

In addition to the above, it is be further predicted that the contour of the object may not be accurately detected due to variation of background environment of the object and difference of illumination. Thus, it becomes difficult to realize a highly accurate and robust extraction of the feature points.

Furthermore, when the perspective transformation matrix derived from the Perspective n-Point problem is used to estimate the error between the image feature point of the object and an estimated feature point thereof, estimation is generally carried out based on a distance between the image feature point and the estimated feature point. Accordingly, an intersecting condition of line segments may deteriorate the accuracy of estimation, which will give adverse effects to the robustness of recognition result.

SUMMARY OF THE INVENTION

Accordingly, in view of above-described problems and disadvantages encountered in the prior art, a first object of the present is to provide a method and an apparatus for recognizing the 3-dimensional position and 3-dimensional attitude of a camera relative to an object based on visual information, wherein the parameters representing the position and attitude of the camera can be simply and promptly obtained on the basis of the 2-dimensional image information taken by the camera, even if the relationship is unknown between the optical axis of the camera and the origin of the absolute coordinates depicting the object whose shape is already known.

A second object of the present invention is to provide a method and an apparatus for recognizing the 3-dimensional position and 3-dimensional attitude of a camera relative to an object based on visual information, wherein not only high accuracy and robustness are realized in the detection of feature points of the object but high accuracy is assured in the evaluation of the estimated search points, even if actual environment by which the object is surrounded is too bad to extract the image feature points from image information of the object taken by the image pickup means.

In short, the present invention extracts actual image features, such as image feature points representing the known shape of the object, on the basis of the image information of the object, obtained by the image pickup means, such as a camera; sets a search region with a plurality of discrete space points allocated in the vicinity of the position and attitude of the image pickup means with respect to the object, estimated in advance from external information etc; calculates estimated image feature to be obtained when a view of the object is taken at each space point of the search region; calculates an error between the actual image feature extracted by said image processing procedure and the estimated image feature calculated at each space point; and searches the space points to find a space point which minimizes the error, thereby determining the position and attitude of the image pickup means with respect to the object.

The above and other objects, features and advantages of the present invention will become more apparent from the following detailed description which is to be read in conjunction with the accompanying drawings.

BRIEF DESCRIPTION OF THE DRAWINGS

FIG. 18 is a view showing the relationship between the coordinate axes of the camera and the image with respect to the absolute coordinate axes in accordance with the third and fourth embodiments of the present invention;

FIG. 28 is a flowchart showing feature point correction program in accordance with the fourth embodiment of the present invention;

DETAILED DESCRIPTION OF THE PREFERRED EMBODIMENTS

Hereinafter, preferred embodiments of the present invention, which are applied to the 3-dimensional position-and-attitude recognition apparatus to be mounted on an autonomous mobile robot travelling on rails in a factory or the like, will be explained in detail with reference to accompanying drawings.

FIRST EMBODIMENT

Figure 1:
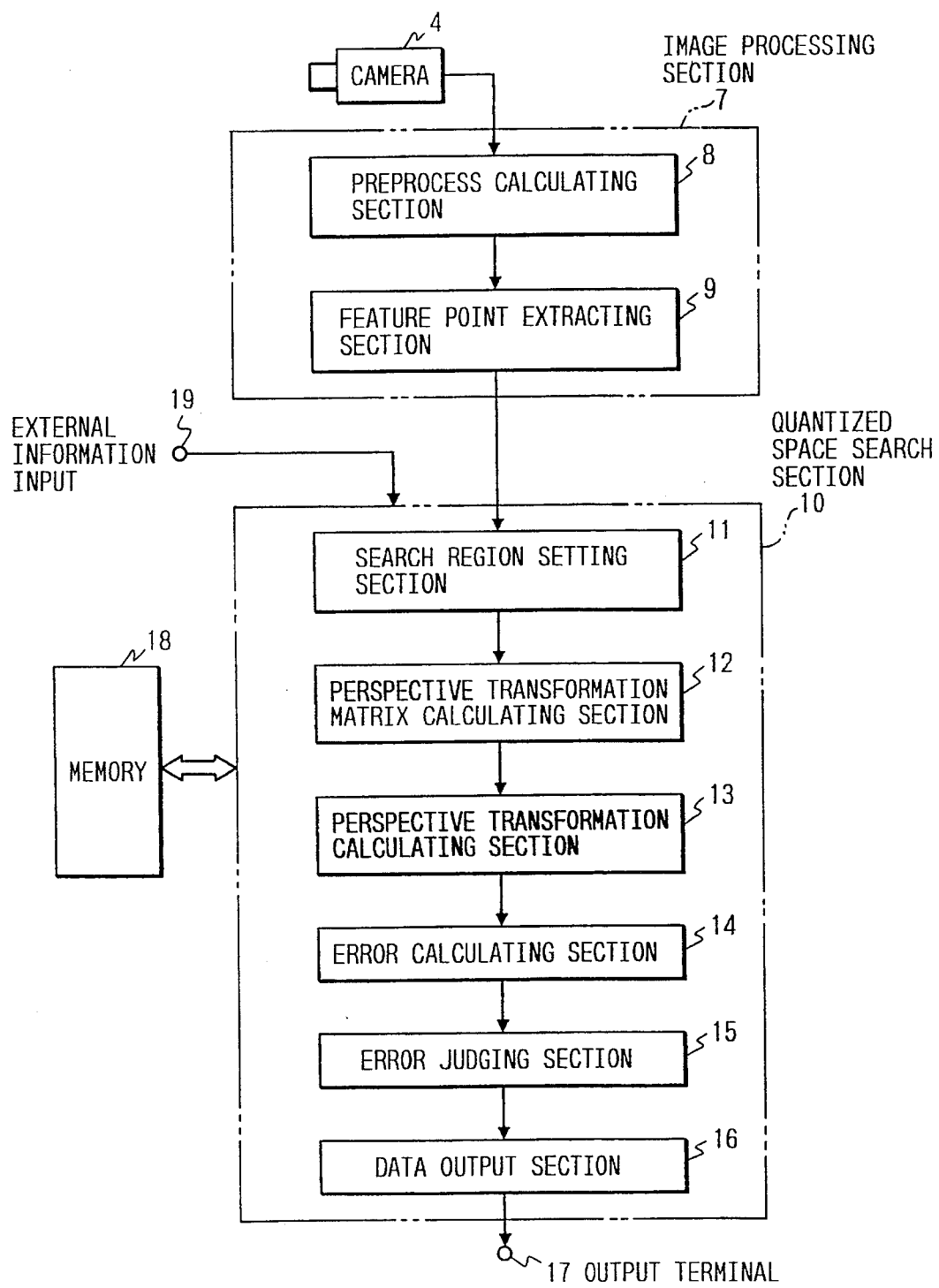
FIG. 1 is a schematic block diagram showing a first embodiment of the present invention.
Figure 2:
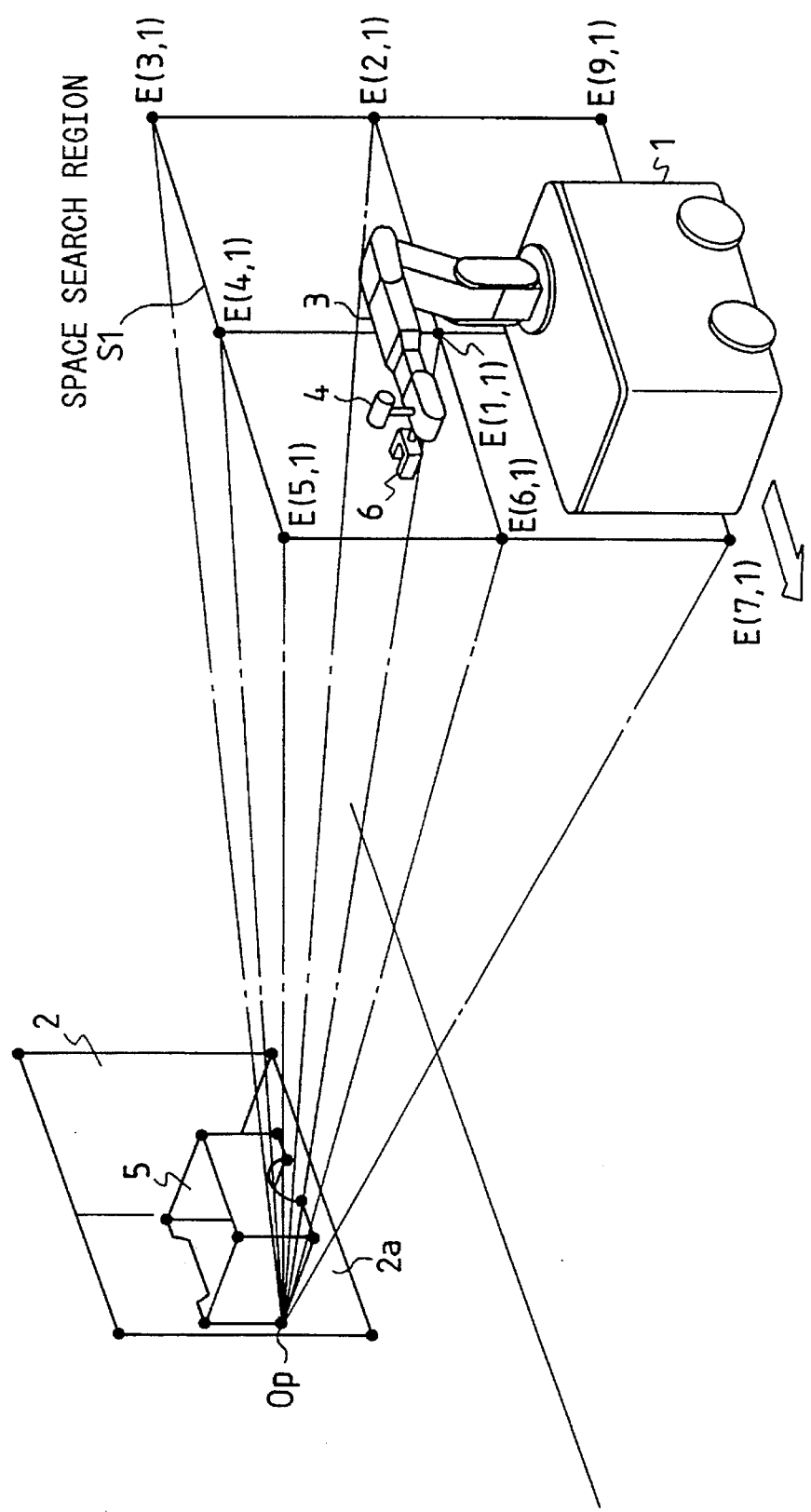
FIG. 2 is a view illustrating the relationship between an autonomous mobile robot and a work area in accordance with first and second embodiments of the present invention.

In FIG. 2, illustrating an overall constitution of the first embodiment, an autonomous mobile robot 1 travels on the rails, for example, provided on a floor of a factory so as to move from one work area 2 to another work area 2. This autonomous mobile robot 1 is equipped with the 3-dimensional position-and-attitude recognition apparatus (FIG. 1) of the present invention. The autonomous mobile robot 1 has an arm 3 provided on the upper surface thereof. The arm 3 has a distal end equipped with a camera 4 as image pickup means and a hand 6 executing various manipulation works, such as gripping a workpiece 5 qualifying as an object to be detected. In this embodiment, the work area 2 is a rectangular cavity formed on a wall, with a base 2a on which the workpiece 5 of a predetermined shape is placed.

FIG. 1 shows a schematic circuit diagram of the 3-dimensional (hereinafter, abbreviated as 3-D) position-and-attitude recognition apparatus. An image processing section 7, serving as image processing means, consists of a preprocess calculating section 8 and a feature point extraction section 9. The preprocess calculating section 8 preprocesses an image signal of a view of the workpiece 5 taken by the camera 4. On the basis of the image information calculated by the preprocess calculating section 8, the feature point extraction section 9 extracts two-dimensional (hereinafter abbreviated as 2-D) image feature points corresponding to the feature points of the workpiece 5, respectively, as described later.

A quantized space search section 10 comprises a search region setting section 11 qualifying as search region setting means; a perspective transformation matrix calculating section 12 qualifying as perspective transformation matrix calculating means; a perspective transformation calculating section qualifying as perspective transformation calculating means; an error calculating section 14 qualifying as error calculating means; an error judging section 15 qualifying as error judging means; and a data output section 16 qualifying as data output means.

The search region setting section 11, as a process for setting a search area, sets a space search region S containing a plurality of discrete quantized space points E having a density determined based on approximate position information of the autonomous mobile robot 1 with respect to the workpiece 5 in the work area 2. The perspective transformation matrix calculating section 12, as a process for calculating the perspective transformation matrix, calculates a perspective transformation matrix M based on approximate position information of the autonomous mobile robot 1 and attitude parameters of the camera 4, for obtaining the coordinates of image feature points on an image obtained from an image signal when a view of the workpiece 5 is taken by the camera 4 at a quantized space point E of the space search region S. The perspective transformation calculating section 13, as a process for calculating the perspective transformation, calculates 2-D estimated image feature points to be obtained corresponding to the feature points of the workpiece 5 using the perspective transformation matrix M when a view of the workpiece 5 is taken by the camera 4 from the quantized space point E.

The error calculating section 14, as a process for calculating an error, interrelates the image feature point extracted from the image processing section 7 with the estimated image feature point and further calculates a position error therebetween based on the error evaluation function obtaining square error sum. The error judging section 15, as a process for error judgement, judges whether the square error sum is smaller than a required error accuracy $\epsilon$. When the square error sum is smaller than the required error accuracy $\epsilon$, the position-and-attitude data of the camera 4 are output through an output terminal 17. On the contrary, if the square error sum is not smaller than the required error accuracy $\epsilon$, the program returns to the search region setting section 11 and repeats the above-described processes in respective sections. And, the data output section 16, as a process for data output, generates a concerned quantized space point E in the space search region S on the basis of the result of above-described judgement.

The quantized space search section 10 is connected with a memory 18 qualifying as memory means which memorizes various data later described, so that these data can be written or read out. Furthermore, there is provided an external information input terminal 19 which allows input of various signals, such as a travelling control signal supplied from a controller (not shown) to the autonomous mobile robot 1 or a position detecting sensor signal indicating an approximate position of the autonomous mobile robot 1. The data memorized in advance in the memory 18 are, for example, a feature point matching list; 3-D absolute coordinate data of the workpiece 5 and the work area 2; parameters of the camera 4; and a list of the quantized space points E together with their coordinate data.

Next, an operation of the first embodiment will be explained with reference to FIGS. 3 to 10.

Figure 3:
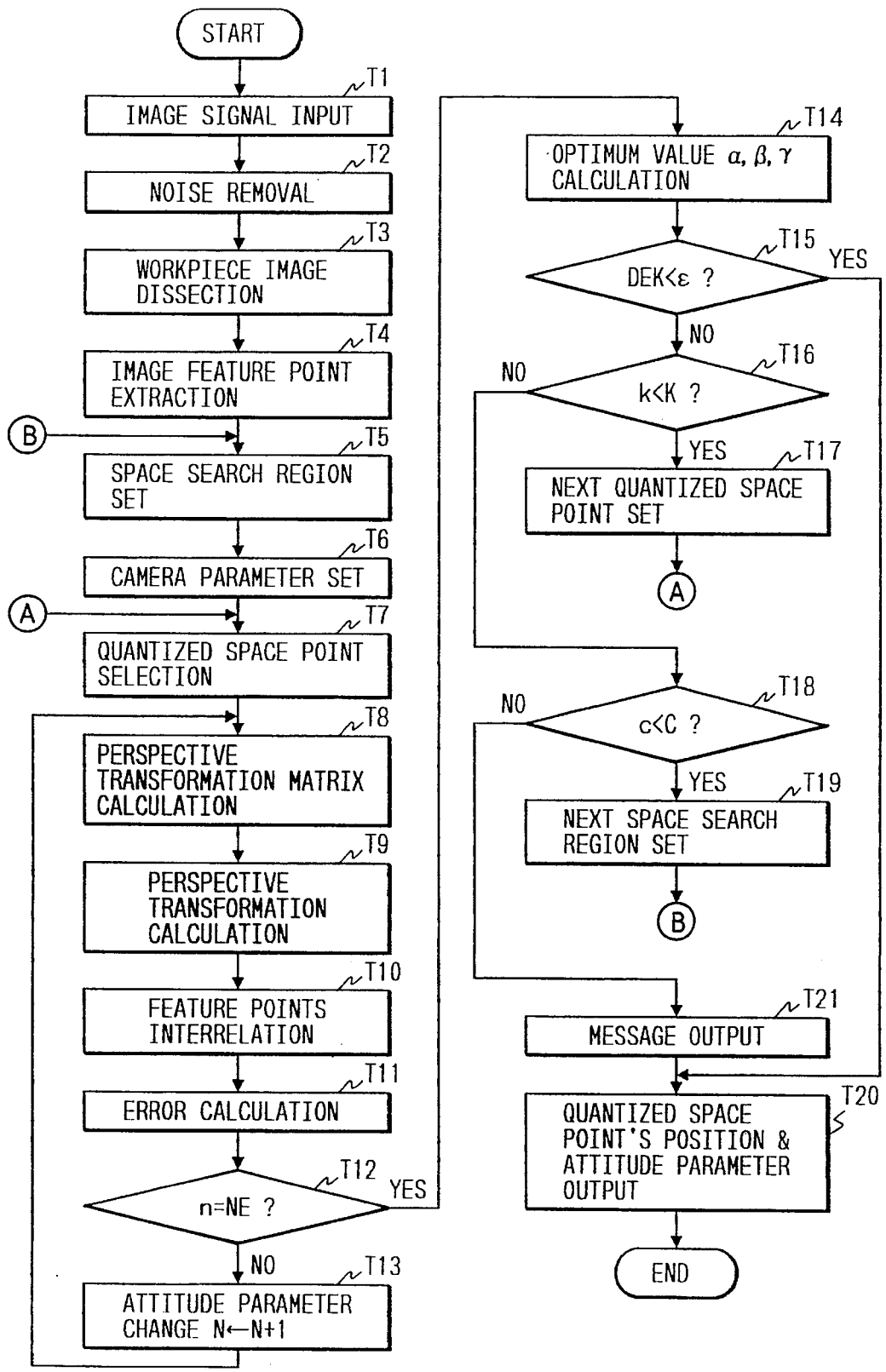
FIG. 3 is a flowchart schematically explaining the processes of the first embodiment of the present invention.
Figure 4A:
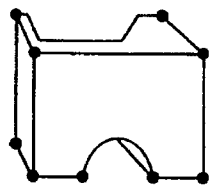
FIGS. 4(A) to 4(F) are views showing various patterns of perspective views of the object to be seen.
Figure 4B:
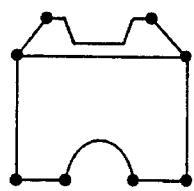
Figure 4C:
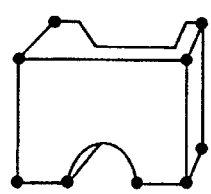
Figure 4D:
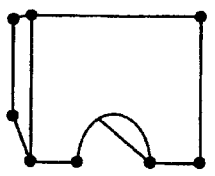
Figure 4E:
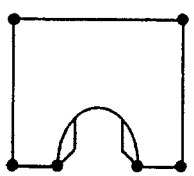
Figure 4F:
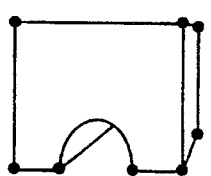

The 3-D position-and-attitude recognition apparatus acts according to the steps shown in the flowchart of FIG. 3 to recognize the position where the autonomous mobile robot 1 is located. First, in the condition shown in FIG. 2, when the autonomous mobile robot 1 travels on the rails and approaches the work area 2—namely, when the work area 2 comes into an image pickup zone of the camera 4, the image processing section 7 initiates inputting image signals from the camera 4. (Step T1) In this case, as the autonomous mobile robot 1 simply travels on a predetermined track in a predetermined direction and an approximate stop position of the autonomous mobile robot 1 can be known beforehand from internal information of the controller, it will be possible to set the relationship between the workpiece 5 qualifying as an object and the camera 4 in such a manner that the workpiece 5 is positioned within the visual field of the camera 4 at the stop position of the autonomous mobile robot 1.

Next, an image signal of the workpiece 5 taken by the camera 4 is preprocessed in the preprocess calculating section 8 of the image processing section 7. That is, noise removal process (Step T2) and image dissecting process of the image of the workpiece 5 (Step T3) are executed. Thereafter, the feature extracting section 9 outputs a set Q consisting of m image feature points $Q_j$, based on the image signal in the following manner. (Step T4)

More specifically, the set of the image feature points Qj is defined as follows.

$$Q=\{Q_j; j=1, 2, \text{---}, m\} \quad (1)$$

$$Q_{j=(u_j, v_j)} \quad (2)$$

Where, $u_j$ and $v_j$ are element values representing each image feature point $Q_j$ in the 2-D coordinates on an image pickup display screen.

In extracting the image feature point $Q_j$, the following calculation is carried out on the basis of approximate position information given through the input terminal 19 as external information. In this embodiment, the approximate position information comprises, for example, a work plan memorizing the traveling path of the autonomous mobile robot 1, and hysteresis information representing the spacial trace of the autonomous mobile robot 1 as a result of travelling control. Based on these external information, the central position of the autonomous mobile robot 1 is obtained in terms of approximate 3-D absolute coordinate values. Namely, an approximate position A0 of the central position of the autonomous mobile robot 1 is expressed in the absolute coordinates system as follows.

$$A0=(X0, Y0, Z0) \quad (3)$$

The 3-D absolute coordinates of the approximate position A0 is defined to have its origin $O_p$ placed at a predetermined point of the work area 2.

FIGS. 4(A) to 4(F) show various patterns of perspective views representing the workpiece 5 when placed in the work area 2, which are memorized in advance in the memory 18. Of these patterns, one is selected as a pattern corresponding to the approximate position A0. Let us assume now, for example, that the pattern of FIG. 4(B) corresponds to the approximate position A0, and a set of the 3-D feature points $P_i$ of the workpiece 5 depicted on this pattern is expressed as follows.

$$P=\{P_i; i=1, 2, ---, n\} \quad (4)$$

Then, the image feature points $Q_j$ are obtained so as to correspond to the feature points $P_i$. Extracted image feature points $Q_j$ are memorized in the memory 18.

The quantized space search section 10 sets a space search region Sc by the search region setting section 11, so that the approximate position A0 (X0, Y0, Z0) serves as a reference point in this space search region Sc. (Step T5)

$$Sc\ (c=1, 2, ---, C) \quad (5)$$

Figure 5:
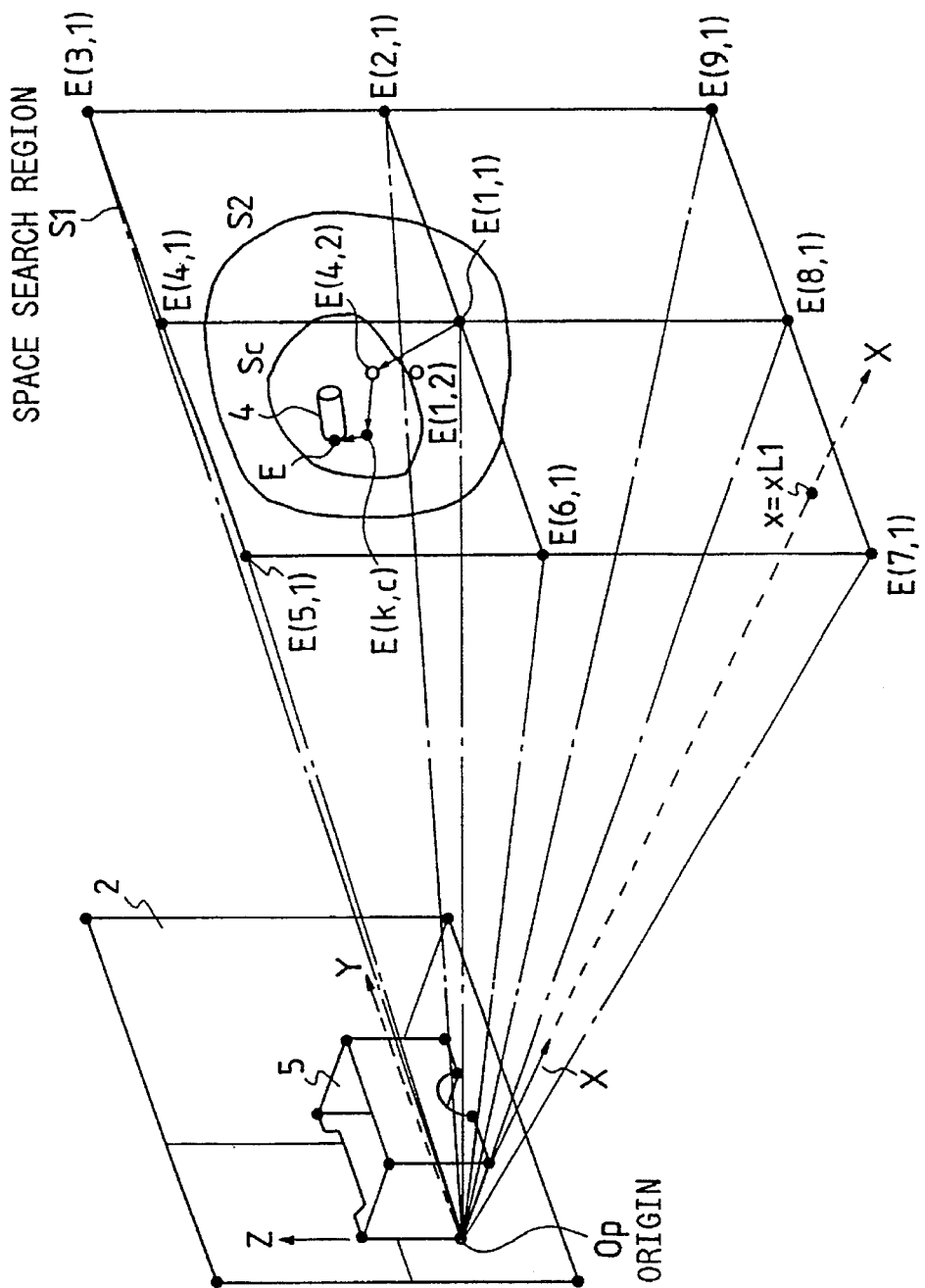
FIG. 5 is a view illustrating the relationship between a space search region and the work area in accordance with the first and second embodiments of the present invention.
Figure 6:
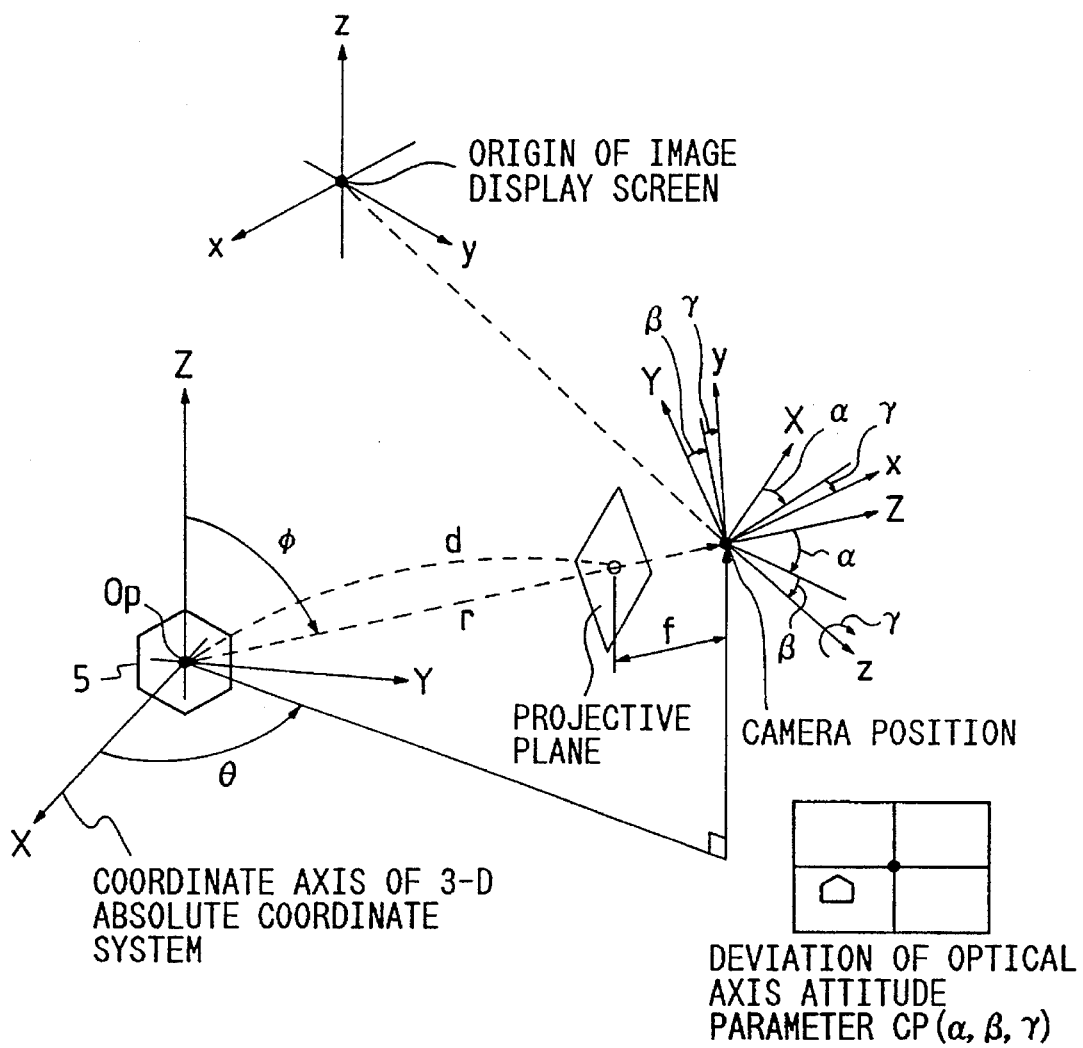
FIG. 6 is a view showing the relationship between the coordinate axes of a camera and an image with respect to the absolute coordinate axes in accordance with the present invention.

This space search region Sc includes a plurality of discrete quantized space points E(k, c) quantized and allocated in a lattice form so as to have a predetermined density, as shown in FIG. 5.

$$E(k, c)\ (k=1,2, ---, K, c=1,2, ---, C) \quad (6)$$

In this case, it can be presumed that the camera 4 faces the workpiece 5 and is placed on a plane defined by an equation X=XL1 in the absolute coordinate system with respect to the origin $O_p$ of the work area 2. In this absolute coordinate system, the X axis corresponds to a direction normal to a plane (wall) of the work area 2. More specifically, XL1 denotes an estimation value of the X coordinate value representing the view point of the camera 4. This estimation value can be determined based on the X-axis coordinate value X0 of the approximate position A0 of the autonomous mobile robot 1 and the mutual coordinate value of the camera 4 with respect to the robot 1. The Z-axis coordinate value Z0 of the approximate position A0 can be regarded as substantially a constant value because the autonomous mobile robot 1 moves on a horizontal plane—the X-Y plane. Accordingly, the search region can be narrowed with respect to the Z-axis coordinate value of the camera 4.

Subsequently, search region for various parameters of the camera 4 is determined. (Step T6) In this embodiment, the parameters of the camera 4 are as follows:

(a) Attitude parameters CP($\alpha$, $\beta$, $\gamma$); (7)

(b) Focal distance parameter f; and (8)

(c) Position parameters (r, $\theta$, $\phi$). (9)

Figure 8:
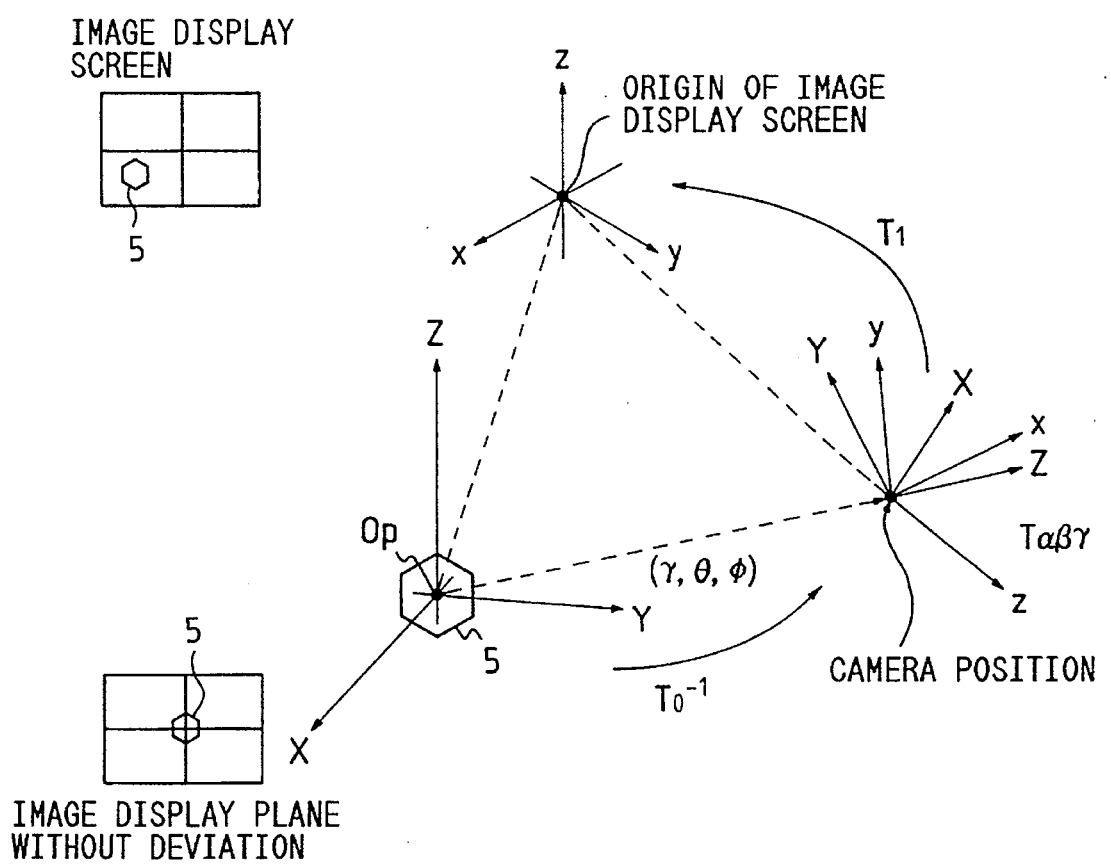
FIG. 8 is a view illustrating the relationship between coordinate axes used in the calculation of the perspective transformation matrix in accordance with one embodiment of the present invention.

FIG. 8 shows the relationship among these parameters. The focal distance f is data inherently determined depending on the characteristic of the camera 4; therefore, the memory 18 stores it as focal distance data beforehand. Let us assume that the optical axis of the camera 4 is defined by a z axis, the horizontal direction of the camera 4 is an x axis, and a vertical direction of the camera 4 is a y axis. The attitude parameters CP are defined as follows: the parameter $\alpha$ represents a rotational angle about the x axis; the parameter $\beta$ represents a rotational angle about the y axis; and the parameter $\gamma$ represents a rotational angle about the z axis. Furthermore the position parameters are polar coordinate values representing the view point of the camera 4 with respect to the origin of the 3-D absolute coordinates system. Namely, r represents a distance while $\theta$ and $\phi$ represent inclined angles.

Figure 7:
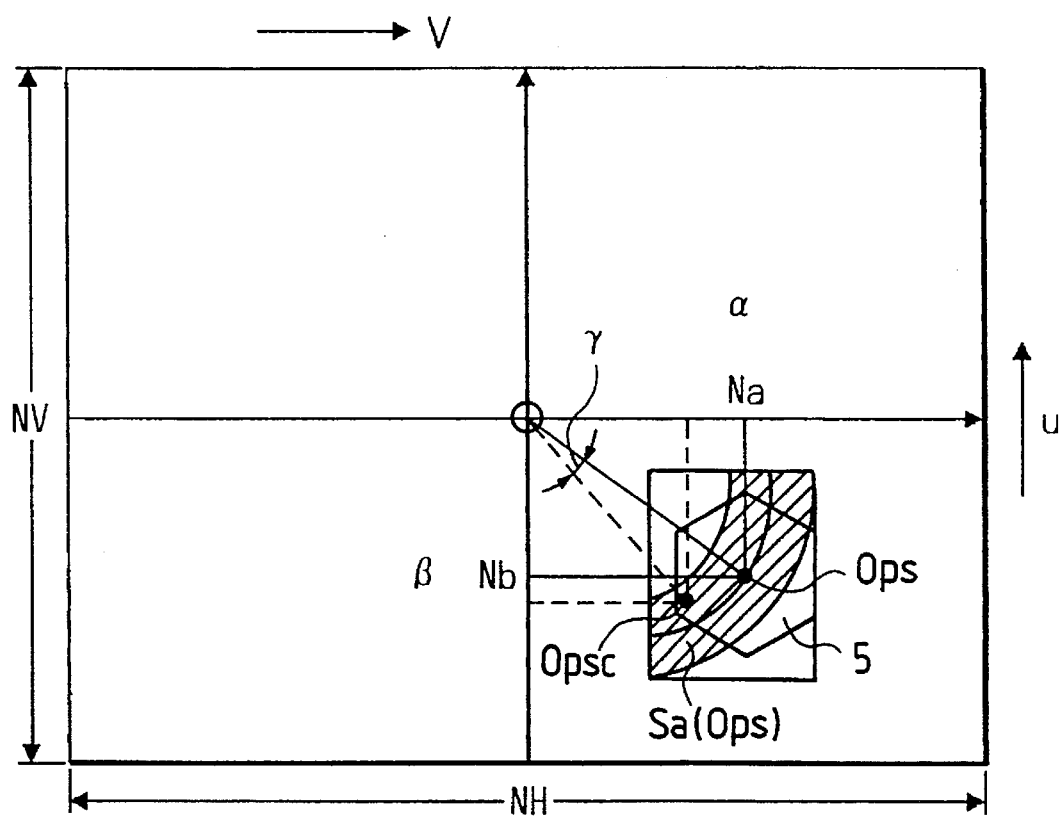
FIG. 7 is a view illustrating the relationship between a workpiece displayed on an image display unit and attitude parameters of the camera in accordance with one embodiment of the present invention.

Here, it will be required to determine only the search region of the attitude parameters CP ($\alpha$, $\beta$, $\gamma$) which represent the deviation of the optical axis of the camera 4 with respect to the central position of the workpiece 5. More specifically, the search region of the attitude parameters CP of the camera 4 is shown as shown in FIG. 7, when $\gamma=0$. If an image position $O_{ps}$ of the origin $O_p$ is designated as a predetermined position of the workpiece 5, this image position $O_{ps}$ is for example expressed as (Na, Nb) in the 2-D coordinates (u, v) of a picture element with respect to the origin of the image display screen. (The origin $O_p$ can be replaced by another feature point if the origin $O_p$ is not included in the image information) In this case, estimation values of the parameters $\alpha$ and $\beta$ can be calculated according to the following equations.

$$\alpha=2\times arctan\ \{(Na/NH)\times tan\ (w_H/2)\} \quad (10)$$

$$\beta=2\times arctan\ \{(Nb/NV)\times tan\ (w_V/2)\} \quad (11)$$

Where, NH represents the horizontal image size of the image display screen; NV represents the vertical image size of the image display screen; $w_H$ represents the horizontal field angle of the camera; and $w_V$ represents the vertical field angle of the camera.

If the required error accuracy is not so high, the following equations will be derived as a result of linear approximation.

$$\alpha=(Na/NH)\times w_H \quad (12)$$

$$\beta=(Nb/NV)\times w_V \quad (13)$$

Accordingly, above equations 10 and 11 can be substituted by these equations 12 and 13 as occasion demands.

Next, when $\gamma$ is not equal to 0, it is believed that a $\gamma$-corrected $O_{psc}$ exists within the circular ring region Sa ($O_{ps}$) including the image position $O_{ps}$ representing the center of the workpiece 5. Therefore, the parameters $\alpha$ and $\beta$ are determined with respect to the quantized space point $O_{psc}$ in the region Sa ($O_{ps}$) in accordance with the equations 10, 11 or 12, 13. And, $\gamma$ is replaced as follows.

$$\gamma=Y_{psc}\ (\text{An angle between } O_{ps} \text{ and } O_{psc})$$

Then, the succeeding search processes are carried out. By the way, in this embodiment, the autonomous mobile robot 1 moves on substantially the horizontal floor. And, a rotational angle of the camera 4 can be adjusted accurately using the coordinate values of the approximate position A0. Of the attitude parameters ($\alpha$, $\beta$, $\gamma$), the one required the widest search capability is $\alpha$ representing the horizontal angular deviation. Accordingly, the search for $\beta$ and $\gamma$ can be carried out within a narrower search region.

Next, the perspective transformation matrix calculating section 12 selects a quantized space point E(1, 1) from the quantized space point E(k, 1), where k=1,2, ---,K, as an initial search point in the space search region S1. (Step T7) Using the 3-D absolute coordinates of this quantized space point E(1, 1) and an initial value of the estimated attitude parameters CP($\alpha$, $\beta$, $\gamma$) of the camera 4 obtained from image information, the perspective transformation matrix $$M(k, c)\ (k=1,2, ---,K \text{ and } c=1,2, --- C) \quad (14)$$

is calculated. (Step T8)

The perspective transformation matrix M is calculated in the following manner. Namely, in the 3-D absolute coordinates system (X, Y, Z) defined with respect to the origin $O_p$ of the workpiece 5, the initial search region S1 is placed on the plane $X=X_0$ which corresponds to the X-axis coordinate value of the approximate position A0. Then, a transformation matrix M1 is obtained to convert 3-D absolute coordinate values (X, Y, Z) of the initial search region S1 into 3-D polar coordinate (r, θ, φ). The perspective transformation matrix M(k, c) is obtained based on the attitude parameters CP(α, β, γ) and a distance d with respect to the projectlye plane and a view point position of the camera 4 obtained from the focal distance parameter f, in view of the relationship shown in FIG. 6.

The perspective transformation matrix M(k, c) is expressed in the following equation.

$$M(k, c) = T \cdot M1 \cdot M2 \cdot M3 \quad (15)$$

Where, T represents a transformation matrix for rotation, parallel shift, enlargement, contraction (In this embodiment, T is used for the calculation of rotation expressed by the attitude parameters CP of the camera 4); M1 represents a perspective transformation matrix from the workpiece to the projective space; M2 represents a perspective transformation matrix from a plane in the projectlye space to the projective plane; and M3 represents a coordinate transformation matrix from the projective plane to the image display plane.

Where, a product of perspective transformation matrixes M1·M2 and the coordinate transformation matrix M3 are expressed by the following equations 16 and 17.

$$M1 \cdot M2 = \begin{pmatrix} (d-r)\sin\theta & (d-r)\cos\phi\cos\theta & -\sin\phi\cos\theta \\ -(d-r)\cos\theta & (d-r)\cos\phi\sin\theta & -\sin\phi\sin\theta \\ 0 & -(d-r)\sin\phi & -\cos\phi \\ 0 & 0 & r \end{pmatrix} \quad (16)$$

$$M3 = \begin{pmatrix} NH/(2LH) & 0 & 0 \\ 0 & NV/(2LV) & 0 \\ 0 & 0 & 1 \end{pmatrix} \quad (17)$$

$$LH = r \cdot \tan(wH/2)$$
$$LV = r \cdot \tan(wV/2)$$

Where, NH represents the horizontal image size of the image display screen; NV represents the vertical image size of the image display screen; wH represents the horizontal field angle of the camera; and wV represents the vertical field angle of the camera. Furthermore, the transformation matrix T is expressed by the following equations 18, 19 and 20, on the basis of the relationship shown in FIGS. 6 and 8. If the distance to the workpiece 5 is constant, a relationship T0=T1 is established and therefore the following equation 21 will be derived.

$$T = T0^{-1} \cdot T\alpha\beta\gamma \cdot T1 \quad (18)$$

$$= \begin{pmatrix} A'(\theta,\phi) & 0 \\ -x0 & 1 \end{pmatrix} \begin{pmatrix} R(\alpha,\beta,\gamma) & 0 \\ 0 & 1 \end{pmatrix} \begin{pmatrix} A(\theta,\phi) & 0 \\ x1 & 1 \end{pmatrix}$$

$$A(\theta,\phi) = \begin{pmatrix} -\sin\theta & \cos\theta & 0 \\ -\cos\phi\cos\theta & -\cos\phi\sin\theta & \sin\phi \\ \sin\phi\cos\theta & \sin\phi\sin\theta & \cos\phi \end{pmatrix} \quad (19)$$

$$R(\alpha,\beta,\gamma) = R\alpha \cdot R\beta \cdot R\gamma \quad (20)$$

$$= \begin{pmatrix} \cos\alpha & 0 & -\sin\alpha \\ 0 & 1 & 0 \\ \sin\alpha & 0 & \cos\alpha \end{pmatrix} \begin{pmatrix} 1 & 0 & 0 \\ 0 & \cos\beta & -\sin\beta \\ 0 & \sin\beta & \cos\beta \end{pmatrix}$$

$$\begin{pmatrix} \cos\gamma & -\sin\gamma & 0 \\ \sin\gamma & \cos\gamma & 0 \\ 0 & 0 & 1 \end{pmatrix}$$

$$x0 = (x0,y0,z0) \quad x1 = (x1,y1,z1) \quad (21)$$

$$\begin{cases} x0 = 0 \\ y0 = 0 \\ z0 = r \end{cases} \quad \begin{cases} x1 = r \cdot \sin\phi\cos\theta \\ y1 = r \cdot \sin\phi\sin\theta \\ z1 = r \cdot \cos\phi \end{cases}$$

Next, on the basis of thus calculated perspective transformation matrix M(k, c), the perspective transformation calculating section 13 executes the calculation of perspective transformation to convert n feature points $P_i$ of the set P, which represent feature points of the work area 2 and the workpiece 5 mounted thereon, into coordinates on the 2-D image display screen. And then, estimated image feature points QEi are obtained so as to correspond to respective feature points $P_i$. (Step T9) A set QE of estimated image feature points QEi is expressed in the following manner.

$$QE = \{QEi; i=1, 2, \cdots, n\} \ (n \geq m) \quad (22)$$

The transformation from the set P of the feature points to the set G of the estimated image feature points is expressed in the following manner, based on the equation 16.

$$(uEi, vEi, 1) = (Xi, Yi, Zi, 1) \cdot M \quad (23)$$

Where, (Xi, Yi, Zi, 1) represents the 3-D absolute coordinates of the feature point $P_i$, and (uEi, vEi) represents 2-D coordinates of the estimated image feature point QEi on the display screen.

Using the perspective transformation matrix M(1, 1) obtained with respect to the quantized space point E (1, 1), the set QE of the estimated image feature points is calculated so as to correspond to the set P of the feature points.

Figure 9A:
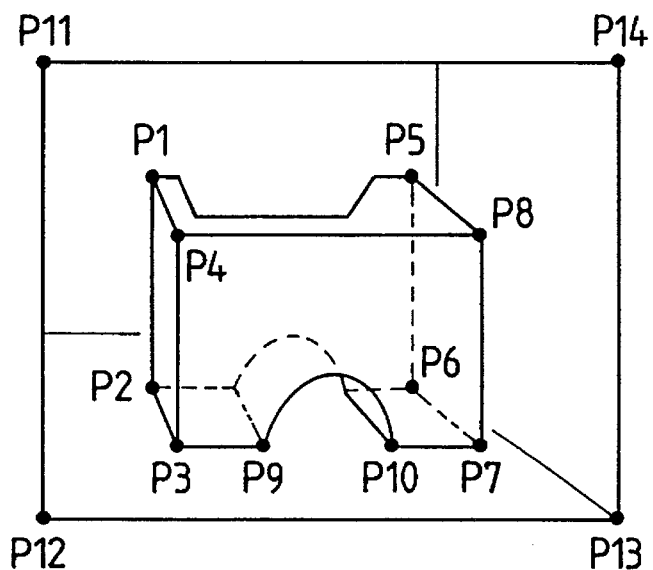
FIG. 9(A) is a view illustrating the definition of the work area and feature points of the workpiece.
Figure 9B:
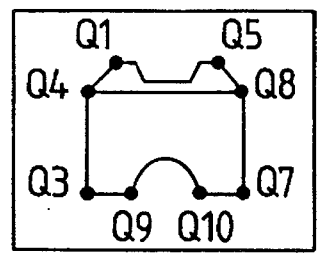
FIG. 9(B) is a view illustrating the image feature points obtained form an image signal.

Next, a feature point correspondence list is created. (Step T10) This feature point correspondence list represents the relationship between the image feature points $Q_j$ of the workpiece 5 taken by the camera 4, which are extracted from the image processing section 7, and the 3-D feature points $P_i$ of the workpiece 5 which are pre-memorized. An example of the feature point correspondence list is shown in the table 1, wherein the feature points $P_i$ of the workpiece 5 are inter-related with the image feature points $Q_j$ in view of the pattern shown in FIGS. 4(b) which corresponds to the quantized space point E(1, 1), as shown in FIGS. 9(A) and 9(B).

TABLE 1

| feature point | flag | extraction order | view point |
|---|---|---|---|
| P1 | 1 | 1 | Q1 |
| P2 | 0 | — | Q2 |
| P3 | 1 | 5 | Q3 |
| P4 | 1 | 3 | Q4 |
| P5 | 1 | 2 | Q5 |
| P6 | 0 | — | Q6 |
| P7 | 1 | 8 | Q7 |
| P8 | 1 | 4 | Q8 |
| P9 | 1 | 6 | Q9 |

TABLE 1-continued

| feature point | flag | extraction order | view point |
| --- | --- | --- | --- |
| P10 | 1 | 7 | Q10 |
| P11 | 0 | — | Q11 |
| P12 | 0 | — | Q12 |
| P13 | 0 | — | Q13 |
| P14 | 0 | — | Q14 |

The flag is used to indicate the existence of correspondence between the feature point nPi and the image feature point $Q_j$. When no image feature points $Q_j$ is found to correspond to the feature point $P_i$ the existing flag of this feature point $P_i$ becomes "0". Otherwise, the existing flag becomes "1". Meanwhile, the extraction order indicates the order according to which the feature point $P_i$ is extracted and is numbered from top left to bottom right on the image display screen.

Subsequently, the error calculating section 14 calculates an error evaluation function D (1, 1) between the image feature point $Q_j$ and the set QE (=P.M(1, 1)) of estimated image feature points. (Step T11) In this case, the error evaluation function D (k, c) obtains a value corresponding to the distance between the image feature point $Q_j$ and the estimated image feature point QEi. Thereafter, only the parameters $\alpha$ and $\beta$ of the attitude parameters CP ($\alpha$, $\beta$, $\gamma$) are varied in the concerned quantized space point E(1, 1), in order to obtain the error evaluate function D (nE, 1), where nE=1, 2, - - -, NE, in the same manner. (Steps T12, 13, 8 to 11)

Next, an optimum value DE1 ($\alpha$E, $\beta$E, $\gamma$E) is obtained from these error evaluation function D (nE, 1). (Step T14) In this embodiment, this optimum value DE1 is determined by obtaining square error sum between QE and Q as evaluation function with respect to all the feature points observed and calculating its minimum value.

Subsequently, the error judging section 15 makes a judgement as to whether the optimum value DE1 obtained from the error evaluation function D (k, 1) satisfies the following equation. (Step T15)

$$DEk < \epsilon \tag{24}$$

Where, $\epsilon$ is a required error accuracy.

If the equation 24 is not satisfied, the above calculation is carried out with respect to other quantized space point E(k, 1) in the same initial search region S1. (Steps T16, T17, and T7 to T15) If the equation 24 is not satisfied with respect to other quantized space point E(k, 1), the next space search region S2 is newly set based on the position of the quantized space point E (k, 1) whose optimum value DEk is closest to the required error accuracy $\epsilon$. (Steps T18 and T19) And, the above-described calculating processes are executed again. (Steps T5 to T15)

On the contrary, when the equation 24 is satisfied in the judging step T15, the data output section 18 outputs the position data (rE, $\theta$E, $\phi$E) of the quantized space E(k, c) corresponding to the concerned optimum value DEk and the attitude parameters ($\alpha$E, $\beta$E, $\gamma$E) of the camera 4 through the output terminal 17. (Step T20) Subsequently, the search program is terminated.

If the equation 24 is not satisfied with respect to all the space search regions S1 to SC (Step T18), a message is output that no quantized space point E(k, c) satisfies the required error accuracy $\epsilon$. (Step T21) Then, the data output section 18 outputs the position data (rE, $\theta$E, $\phi$E) of the quantized space E(k, c) whose optimum value DEk is most closest to the required error accuracy $\epsilon$ and the attitude parameters ($\alpha$E, $\beta$E, $\gamma$E) of the camera 4 through the output terminal 17. (Step T20) Subsequently, the search program is terminated.

Figure 10:
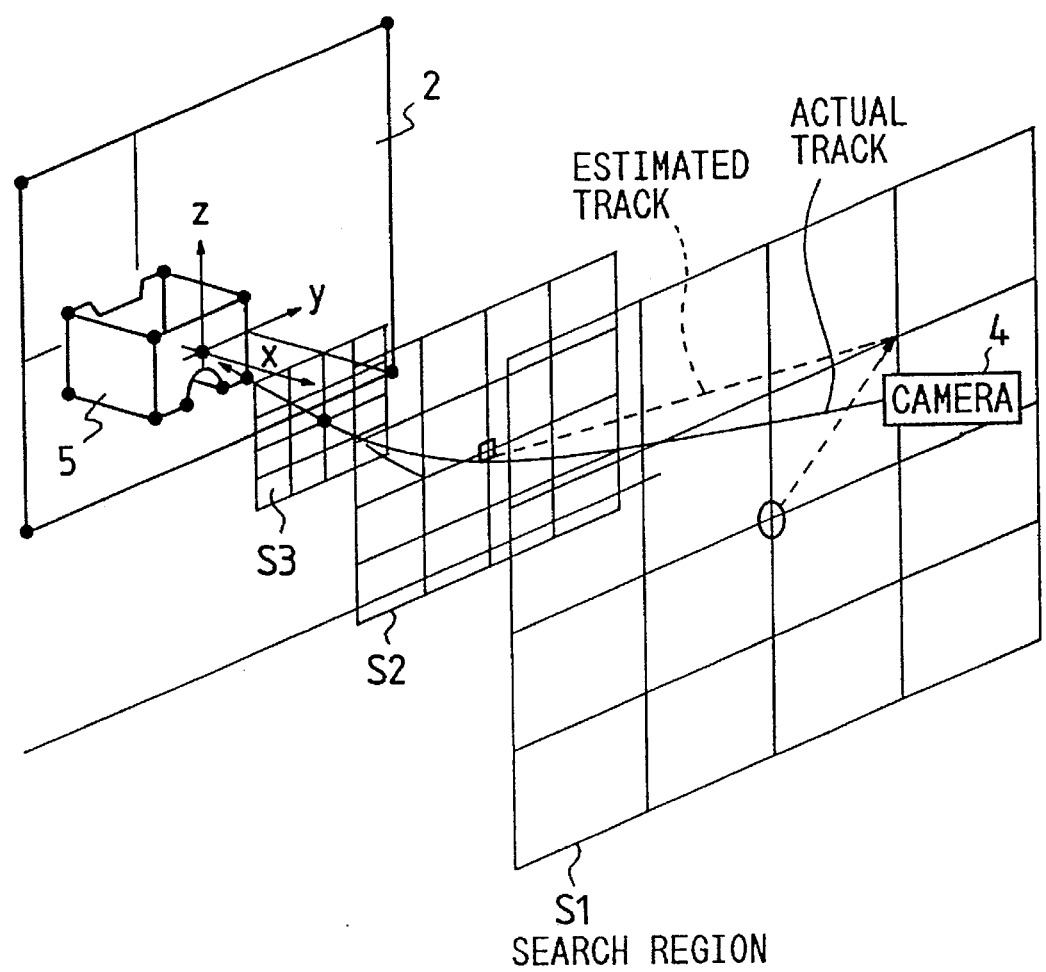
FIG. 10 is a view showing the setting of search region based on a distance from the workpiece.

Although the above-described embodiment shows the search process of setting the space search region S in order of S1, S2, - - - so that the quantized space point E (k, 1) satisfying the required error accuracy $\epsilon$ is obtained at a constant distance (X=XL1) from the origin $O_p$ of the workpiece 5 in the work area 2, it is also possible to execute the search process of setting the space search region S (k, c) in accordance to the approaching distance of the autonomous mobile robot 1 when the autonomous mobile robot 1 moves (X<XL1) toward the workpiece 5 as shown in FIG. 10.

For example, in the advancement of the autonomous mobile robot 1, one space search region S1 is set at the distance X from the origin $O_p$. Among the quantized space points E (k. 1), the closest to the required error accuracy $\epsilon$ is obtained as provisional detection data representing the position-and-attitude parameters of the camera 4. Movement of the autonomous mobile robot 1 is controlled on the basis of this provisional detection data. Subsequently, the next space search region S2 is set when the distance X from the origin $O_p$ becomes smaller. Then, among the quantized space points E (k. 2), the closest to the required error accuracy $\epsilon$ is obtained as provisional detection data. The same procedure is repeated continuously, so that the required error accuracy $\epsilon$ is finally satisfied when the autonomous mobile robot 1 comes closest to the workpiece 5.

Accordingly, the first embodiment of the present invention extracts image feature points $Q_j$ of the work area 2 and the workpiece 5 which qualify as object having known shape on the basis of the image information taken by the camera 4; sets a space search region Sc with a plurality of discrete quantized space points; calculates the estimated image feature points QEi of the workpiece to be obtained when a view of the workpiece 5 is taken at the quantized space point E(k, c) the camera with the attitude parameters CP ($\alpha$, $\beta$, $\gamma$), through the calculation of the perspective transformation matrix M (k, c); and makes a judgement as to whether the error evaluation function D (k, c) satisfies the required error accuracy $\epsilon$, thereby estimating the position-and-attitude parameters CP of the camera 4.

The first embodiment of the present invention brings the following effects.

First of all, no marker is required on the workpiece and, therefore, there is no time loss due to detection of the marker. Thus, the computational time can be reduced compared with the conventional system.

Second, this embodiment does not calculate the parameters from the components of the perspective transformation matrix. It means that the least-square estimation of the perspective transformation matrix is no longer required; accordingly, the overall calculation can be promptly accomplished because the huge calculation for the least-square estimation of the perspective transformation matrix can be omitted.

Third, this embodiment can be applicable to the camera whose attitude parameters are unknown.

Fourth, accuracy in calculating the position of the camera 4 can be flexibly adjusted by varying the setting of the quantized space point E. For example, low accuracy will be acceptable when the camera is located far away in view of work content and actual environment. Whereas, high accuracy will be required when the camera 4 comes close to the workpiece 5.

Fifth, as the calculation is executed in this manner when the camera 4 moves actively toward the workpiece 5 qualifying an object, cooperative adjustment between the camera 4 and the autonomous mobile system can be realized from rough aiming of optical axis of the camera 4 at a remote place to fine aiming at a close place.

As described in the foregoing description, the present invention provides a position-and-attitude recognition method which extracts 2-D image feature points representing structural characteristics of the object, when 3-D absolute coordinate system defining the shape of the object is known, on the basis of the image information taken by image pickup means; sets a search region based on approximate estimated points of the image pickup means by use of the search region setting step, perspective transformation matrix calculating step, perspective transformation calculating step, error calculating step, error judging step, and data output step; calculates the estimated image feature points to be obtained when a view of the object is taken at a plurality of quantized space points of the search region; calculates an error between the image feature points extracted and the estimated image feature points by the error evaluation function; searches a space point which satisfies the require error accuracy to estimate the 3-D absolute coordinate position of the image pickup means; and outputs the finally obtained position and attitude parameters of the image pickup means. Therefore, even if the optical axis of the image pickup means is deviated, the image pickup means can be recognized promptly and accurately without using a marker. Furthermore, by varying the required error accuracy, matching between calculation speed and calculation accuracy can be adequately adjusted based on the distance between the image pickup means and the object.

Moreover, the present invention provides a position-and-attitude recognition apparatus comprising means for realizing the above steps. Thus, it becomes possible to obtain the quantized space point closest to the actual 3-D absolute coordinates of the image pickup means as an approximate point, and also to detect the attitude parameters representing deviation of the optical axis of the image pickup means. Thus, the control of the mobile system can be adequately carried out on the basis of thus obtained data.

SECOND EMBODIMENT

Figure 11:
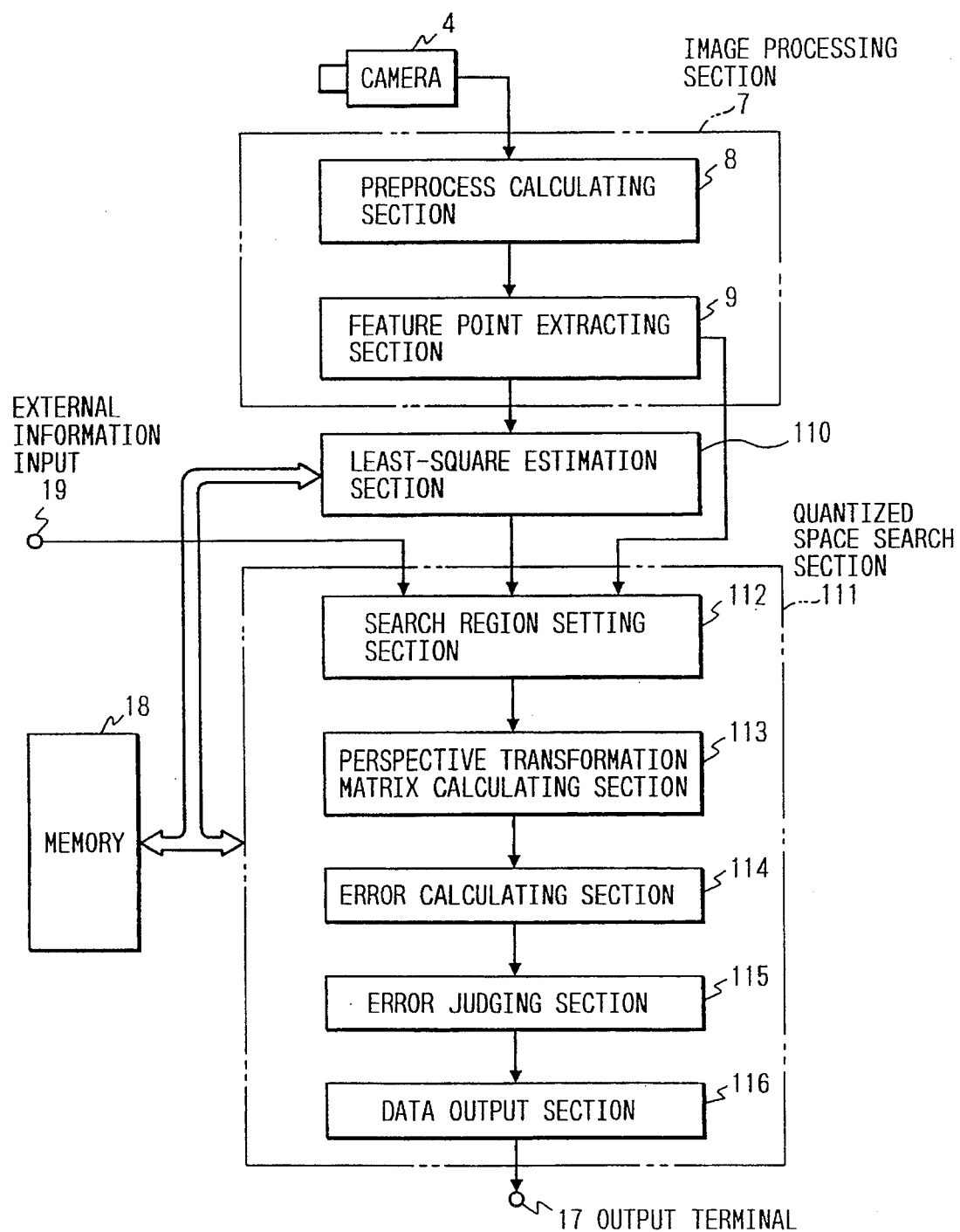
FIG. 11 is a schematic block diagram showing a second embodiment of the present invention.

Next, a 3-D position-and-attitude recognition apparatus in accordance with the second embodiment of the present invention will be explained with reference to FIG. 11.

An image processing section 7, serving as image processing means, consists of a preprocess calculating section 8 and a feature point extraction section 9, in the same manner as in the first embodiment. The preprocess calculating section 8 preprocesses an image signal of a view of the workpiece 5 taken by the camera 4. On the basis of the image information calculated by the preprocess calculating section 8, the feature point extraction section 9 extracts two-dimensional image feature points corresponding to the feature points of the workpiece 5, respectively.

A least,square estimation section 110, serving as least-square estimation means, receives the image feature points extracted by the image processing section 7. On the basis of these image feature points, the least-square estimation section 110 selects one of patterns showing various perspective views of the workpiece 5, which are to be taken by the camera 4 according to various positions and attitudes of the camera 4. Furthermore the least-square estimation section 110 executes the least-square estimation of the camera matrix corresponding to the present position and attitude of the camera 4, and then obtains the estimated perspective transformation matrix Ms as a result of this least-square estimation.

A quantized space search section 111 comprises a search region setting section 112 qualifying as search region setting means; a perspective transformation matrix calculating section 113 qualifying as perspective transformation matrix calculating means; an error calculating section 114 qualifying as error calculating means; an error judging section qualifying as error judging means; and a data output section 116 qualifying as data output means.

The search region setting section 112, as a process for setting a search area, sets a space search region S containing a plurality of discrete quantized space points E having a density determined based on approximate position information of the autonomous mobile robot 1 with respect to the workpiece 5 in the work area 2. The perspective transformation matrix calculating section 113, as a process for calculating the perspective transformation matrix, calculates a perspective transformation matrix M based on approximate position information of the autonomous mobile robot 1 and attitude parameters of the camera 4, for obtaining the coordinates of image feature points in an image obtained from an image signal when a view of workpiece 5 is taken by the camera 4 at a quantized space point E of the space search region S.

The error calculating section 114, as a process for error calculation, calculates an error between the estimated perspective transformation matrix Ms obtained by the least-square estimation section 110 and the perspective transformation matrix M calculated by the perspective transformation matrix calculating section 113 using the error evaluation function which obtains square error sum of respective matrix elements. The error judging section 115, as a process for error judgement, judges whether the square error sum calculated is smaller than a required error accuracy $\epsilon$. When the square error sum is smaller than the required error accuracy $\epsilon$, the position-and-attitude data of the camera 4 are output through an output terminal 17. On the contrary, if the square error sum is not smaller than the required error accuracy $\epsilon$, the program returns to the search region setting section 112 and repeats the above-described processes in respective sections. And, the data output section 116, as a process for data output, generates a concerned quantized space point E in the space search region S on the basis of the result of above-described judgement.

The quantized space search section 111 is connected with a memory 18 qualifying as memory means which memorize various data later described, so that these data can be written or read out. Furthermore, there is provided an external information input terminal 19 which allows to input various signals, such as a travelling control signal supplied from a controller (not shown) to the autonomous mobile robot 1 or a position detecting sensor signal indicating an approximate position of the autonomous mobile robot 1. The data memorized in advance in the memory 18 are, for example, a feature point matching list; 3-D absolute coordinate data of the workpiece 5 and the work area 2; parameters of the camera 4; and a list of the quantized space points E together with their coordinate data.

Next, an operation of the second embodiment will be explained with reference to FIGS. 4 to 12.

Figure 12:
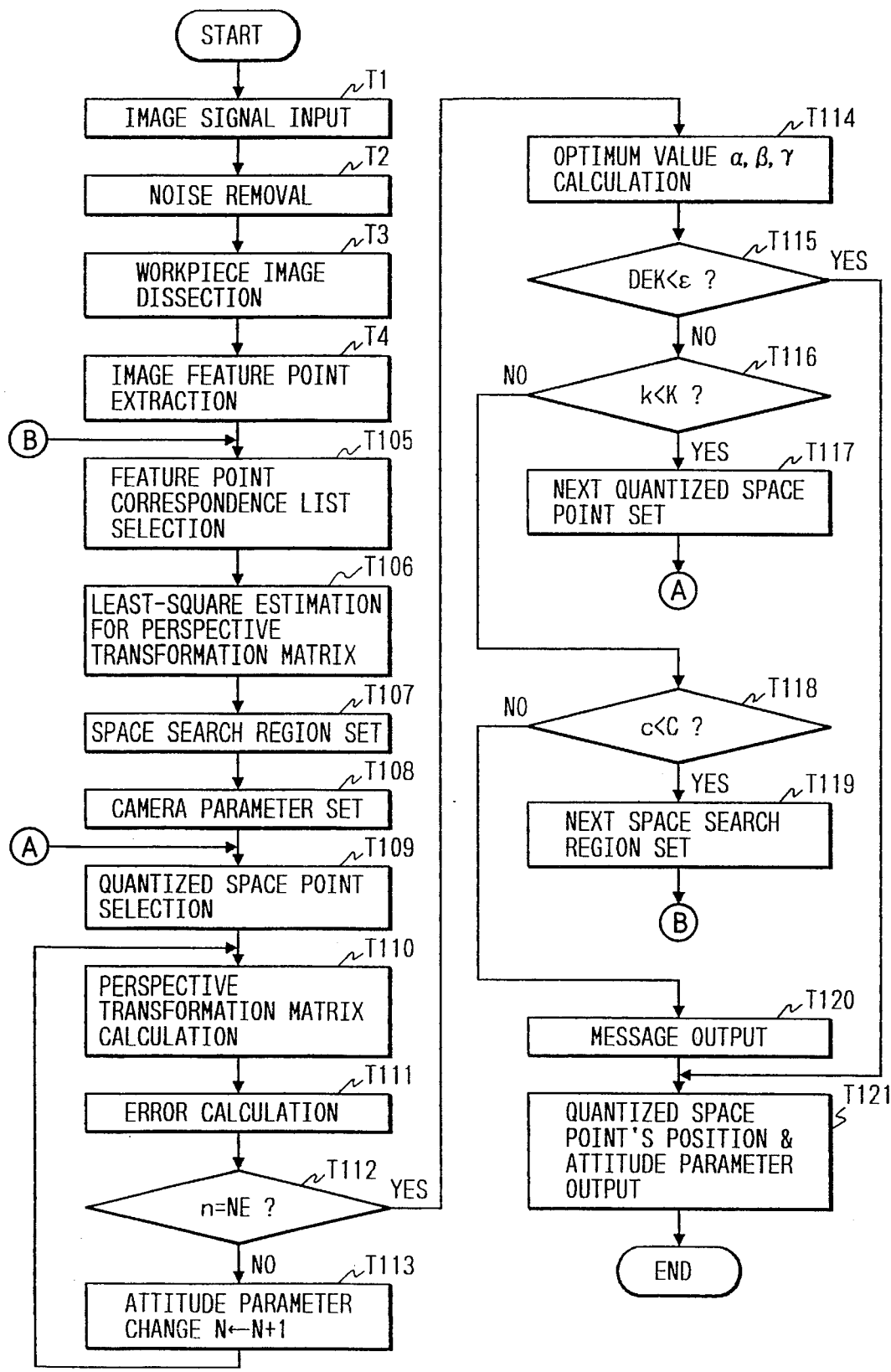
FIG. 12 is a flowchart schematically explaining the processes of the second embodiment of the present invention.

The 3-D position-and-attitude recognition apparatus acts according to the steps shown in the flowchart of FIG. 12 to recognize the position where the autonomous mobile robot 1 is located. First of all, in the condition shown in FIG. 2, when the autonomous mobile robot 1 travels on the rails and approaches the work area 2—namely, when the work area 2 comes into an image pickup zone of the camera 4, the image processing section 7 initiates inputting image signals from the camera 4. (Step T1) In this case, as the autonomous mobile robot 1 simply travels on a predetermined track in a predetermined direction and an approximate stop position of the autonomous mobile robot 1 can be known beforehand from internal information of the controller, it will be possible to set the relationship between the workpiece 5 qualifying as an object and the camera 4 in such a manner that the workpiece 5 is positioned within the visual field of the camera 4 at the stop position of the autonomous mobile robot 1.

Next, an image signal of the workpiece 5 taken by the camera 4 is applied preprocessing in the preprocess calculating section 8 of the image processing section 7. That is, noise removal process (Step T2) and image dissecting process of the image of the workpiece 5 (Step T3) are executed. Thereafter, the feature extracting section 9 outputs a set Q consisting of m image feature points $Q_j$ based on the image signal in the same manner as in the first embodiment. (Step T4)

Next, in the same manner as in the first embodiment, one perspective pattern corresponding to the approximate position A0 is selected among various perspective patterns of the workpiece 5 (refer to FIGS. 4(A) to 4(F)), which are memorized in advance in the memory 18. (Step T105) Let us assume now that a perspective pattern of FIG. 4(B) corresponds to the approximate position A0, and a set of the 3-D feature points $P_1$ of the workpiece 5 depicted on this pattern is expressed as follows.

$$P = \{P_i; l = 1, 2, \cdots, n\} \quad (25)$$

Then, the image feature points $Q_j$ are obtained so as to correspond to these feature points $P_i$. Extracted image feature points $Q_j$ are memorized in the memory 18. For example, the memory 18 stores the coordinates of the feature points $P_i$ of the work area 2 and the workpiece 5 shown in FIG. 9(A). These feature points $P_i$ are interrelated to the image feature points $Q_j$ obtained from the image signal shown in FIG. 9(B) with reference to the selected perspective pattern (FIG. 4(B)), thereby creating a feature point correspondence list is selected.

Meanwhile, the least-square estimation section 110 calculates the least square estimation of the camera matrix C with respect to the present position and attitude of the camera 4 on the basis of thus selected correspondence list. (Step T106) The camera matrix C is set based on the following equations 26, 27 and 28. Where, (u,v,w) represents a point of the image display screen; (U,V) represents coordinate values expressed by using coordinate axes of the image display plane; and (x,y,z) represents a corresponding point in the 3-D absolute coordinate space. That is, the camera matrix C is a parameter for executing the conversion between the coordinates of the 3-D absolute space and the coordinates of the image display screen. And, w represents a scale factor by the camera 4.

$$(u,v,w) = w(U,V,1) \quad (28)$$

$$= (x,y,z,1) \begin{pmatrix} C11 & C12 & C13 \\ C21 & C22 & C23 \\ C31 & C32 & C33 \\ C41 & C42 & C43 \end{pmatrix}$$

From above equations 28 and 27, the following equation is derived.

$$u - Uw = 0, \; v - Vw = 0 \quad (29)$$

Then, from the equation 28, the following equations are obtained.

$$w = (x,y,z,1) \begin{pmatrix} C13 \\ C23 \\ C33 \\ C43 \end{pmatrix}, \; C43 = 1 \quad (30)$$

$$u = (x,y,z,1) \begin{pmatrix} C11 \\ C21 \\ C31 \\ C41 \end{pmatrix} \quad (31)$$

$$v = (x,y,z,1) \begin{pmatrix} C12 \\ C22 \\ C32 \\ C42 \end{pmatrix} \quad (32)$$

Next, substituting the equations 30, 31 and 32 into the equation 8, the following equation is obtained.

$$(x,y,z,1) \begin{pmatrix} C11 \\ C21 \\ C31 \\ C41 \end{pmatrix} - U(x,y,z,1) \begin{pmatrix} C13 \\ C23 \\ C33 \\ 1 \end{pmatrix} = 0 \quad (33)$$

$$(x,y,z,1) \begin{pmatrix} C12 \\ C22 \\ C32 \\ C42 \end{pmatrix} - V(x,y,z,1) \begin{pmatrix} C13 \\ C23 \\ C33 \\ 1 \end{pmatrix} = 0 \quad (34)$$

Eliminating the scale factor w, above equations 33 and 34 are modified into the following equations.

$$U - (x,y,z,1) \begin{pmatrix} C11 \\ C21 \\ C31 \\ C41 \end{pmatrix} + (x,y,z) \begin{pmatrix} C13 \\ C23 \\ C33 \end{pmatrix} U = 0 \quad (35)$$

$$V - (x,y,z,1) \begin{pmatrix} C12 \\ C22 \\ C32 \\ C42 \end{pmatrix} + (x,y,z) \begin{pmatrix} C13 \\ C23 \\ C33 \end{pmatrix} V = 0 \quad (36)$$

From these result, evaluation functions expressed by the following equations 37 and 38 can be obtained. Thereafter, under the condition that the equations 39 and 40 are established for minimizing Eu and Ev, a linear equation whose coefficients are identical with respective elements of the camera matrix C is obtained so as to finally determine the camera matrix C.

$$Eu = \sum_{i=1}^{n} \left\{ Ui - (xi,yi,zi,1) \begin{pmatrix} C11 \\ C21 \\ C31 \\ C41 \end{pmatrix} + (xi,yi,zi) \begin{pmatrix} C13 \\ C23 \\ C33 \end{pmatrix} \right\}^2 \quad (37)$$

$$Ev = \sum_{i=1}^{n} \left\{ Vi - (xi,yi,zi,1) \begin{pmatrix} C12 \\ C22 \\ C32 \\ C42 \end{pmatrix} + (xi,yi,zi) \begin{pmatrix} C13 \\ C23 \\ C33 \end{pmatrix} Vi \right\}^2 \quad (38)$$

$$\frac{\partial Eu}{\partial CA} = 0 \; (A = 11,21,31,41,13,23,33) \quad (39)$$

$$\frac{\partial Ev}{\partial CB} = 0 \; (B = 12,22,32,42) \quad (40)$$

Then, thus obtained estimation result of the camera matrix C—the perspective transformation matrix in a broad meaning—are memorized as the estimated perspective transformation matrix Ms.

Next, the quantized space search section 111 sets a space search region Sc by the search region setting section 112, so that the approximate position A0 (X0, Y0, Z0) serves as a reference point in this space search region Sc. (Step T107) This space search region Sc is already defined by the equation 5 of the first embodiment. This space search region Sc includes a plurality of discrete quantized space points E(k, c) quantized and allocated in a lattice form so as to have a predetermined density, as shown in FIG. 5 and defined by the equation 6.

Next, search region for various parameters of the camera 4 is set in the same manner as the step T6 of the first embodiment. (Step T108)

Subsequently, the perspective transformation matrix calculating section 13 selects a quantized space point E (1, 1) of quantized space points E (k, 1), where k=1,2,- - - ,K, as an initial search point in the space search region S1. (Step T109) On the basis of the 3-D absolute coordinates of this quantized space point E (1, 1) and initial values of the attitude parameters CP ($\alpha$, $\beta$, $\gamma$), the perspective transformation matrix M (k, c) is calculated in the same manner as the first embodiment. (Step T110)

The perspective transformation matrix M (k, c) is expressed by the equation 15 of the first embodiment.

In turn, the error calculating section 114 calculates an error evaluation function D (1, 1) between the perspective transformation matrix M (k, c) thus calculated and the estimated perspective transformation matrix Ms obtained by the least-square estimation section 110. (Step T111) In this case, the error evaluation function D (k, c) obtains a square error sum between respective matrix elements of the perspective transformation matrix M and the estimated perspective transformation matrix Ms.

Thereafter, only the parameters $\alpha$ and $\beta$ of the attitude parameters CP ($\alpha$, $\beta$, $\gamma$) are varied in the concerned quantized space point E(1, 1), in order to obtain the error evaluate function D (nE, 1), where nE=1, 2, - - - , NE in the same manner. (Steps T112, 113, 110 and 111) And then, an optimum value DE1 ($\alpha$E, $\beta$E, $\gamma$E) is obtained from these error evaluation function D (nE, 1). (Step T114)

Subsequently, the error judging section 115 makes a judgement as to whether the optimum value DE1 obtained from the error evaluation function D (k, 1) satisfies the following equation. (Step T115)

$$DEk < \epsilon \quad (41)$$

Where, $\epsilon$ is a required error accuracy.

If the equation 41 is not satisfied, the above calculation is carried out with respect to other quantized space point E(k, 1) in the same initial search region S1. (Steps T116, T117, and T109 to T115) If the equation 41 is not satisfied with respect to other quantized space point E(k, 1), the next space search region S2 is newly set based on the position of the quantized space point E (k, 1) whose optimum value DEk is most closest to the required error accuracy $\epsilon$. (Steps T118 and T119) And, the above-described calculating processes are executed again. (Steps T105 to T115)

On the contrary, when the equation 41 is satisfied in the judging step T115, the data output section 116 outputs the position data (rE, $\theta$E, $\phi$E) of the quantized space E(k, c) corresponding to the concerned optimum value DEk and the attitude parameters ($\alpha$E, $\beta$E, $\gamma$E) of the camera 4 through the output terminal 17. (Step T121) Subsequently, the search program is terminated.

If the equation 41 is not satisfied with respect to all the space search regions S1 to SC (Step T118), a message is output that no quantized space point E(k, c) satisfies the required error accuracy $\epsilon$. (Step T120) Then, the data output section 116 outputs the position data (rE, $\theta$E, $\phi$E) of the quantized space E(k, c) whose optimum value DEk is most closest to the required error accuracy $\epsilon$ and the attitude parameters ($\alpha$E, $\beta$E, $\gamma$E) of the camera 4 through the output terminal 17. (Step T121) Subsequently, the search program is terminated.

Although the above-described embodiment shows the search process of setting the space search region S in order of S1, S2, - - - so that the quantized space point E (k, 1) satisfying the required error accuracy $\epsilon$ is obtained at a constant distance (X=XL1) from the origin $O_p$ of the workpiece 5 of the work area 2, it is also possible to execute the search process of setting the space search region S (k, c) in accordance to the approaching distance of the autonomous mobile robot 1 when the autonomous mobile robot 1 moves (X<XL1) toward the workpiece 5 as shown in FIG. 10.

Accordingly, the second embodiment of the present invention extracts image feature points $Q_j$ of the work area 2 and the workpiece 5 which qualify as object having known shape on the basis of the image information taken by the camera 4; obtains the estimated perspective transformation matrix Ms in the least-square estimation section 110 by executing the least-square estimation of the camera matrix representing a perspective pattern of the workpiece 5 corresponding to the concerned position and attitude of the camera 4, through the selection of the feature point correspondence list describing the relationship between the image feature points extracted and the preset perspective patterns; sets a space search region Sc with a plurality of quantized space points; calculates the perspective transformation matrix M (k, c) for obtaining image feature points of the workpiece 5 to be obtained when a view of the workpiece 5 is taken at the quantized space point E(k, c) by the camera 4 with attitude parameters CP ($\alpha$, $\beta$, $\gamma$); and makes a judgement as to whether the error evaluation function D (k, c) thereof satisfies the required error accuracy $\epsilon$, thereby estimating the position-and-attitude parameters CP of the camera 4.

The second embodiment of the present invention brings the following effects.

First of all, no marker is required and, therefore, there is no time loss due to detection of the marker. Thus, the computational time can be reduced compared with the conventional system.

Second, this embodiment does not calculate the parameters from the components of the perspective transformation matrix. Instead, the space search region Sc with quantized space points E allocated to have the predetermined density is set to calculate the perspective transformation matrix. Then, conformity between this perspective transformation matrix and the estimated perspective transformation matrix is evaluated. Accordingly, the calculation can be accomplished promptly because the huge calculation can be omitted.

Third, this embodiment can be applicable to the camera 4 whose attitude parameters are unknown.

Fourth, accuracy in calculating the position of the camera 4 can be flexibly adjusted by varying the setting of the quantized space point E. For example, low accuracy will be acceptable when the camera is located far away in view of work content and actual environment. Instead, high accuracy will be required when the camera 4 comes close to the workpiece 5.

Fifth, as the calculation is executed in this manner when the camera 4 moves actively toward the workpiece 5 qualifying an object, cooperative adjustment between the camera 4 and the autonomous mobile system can be realized from rough aiming of optical axis of the camera 4 at a remote place to fine aiming at a close place.

As described in the foregoing description, the present invention provides a position-and-attitude recognition method which extracts 2-D image feature points representing structural characteristics of the object, when 3-D absolute coordinate system defining the shape of the object is known, on the basis of the image information taken by an image pickup means; obtains the estimated perspective transformation matrix and in the least-square estimation step by executing the least-square estimation of the camera matrix, through the selection of the feature point correspondence list describing the relationship between the image feature points extracted and the perspective patterns stored in the memory means on the basis of the approximate position and attitude of the image pickup means; sets a search region based on the approximate estimated points of the image pickup means by use of the search region setting step, perspective transformation matrix calculating step, error calculating step, error judging step, and data output step; calculates the perspective transformation matrix of the object corresponding to a plurality of quantized space points in this search region; calculates an error between this perspective transformation matrix and the above estimated perspective transformation matrix by the error evaluation function; searches a space point which satisfies the require error accuracy to estimate the 3-D absolute coordinate position of the image pickup means; and outputs the finally obtained position and attitude parameters of the image pickup means. Therefore, even if the optical axis of the image pickup means is deviated, the image pickup means can be recognized promptly and accurately without using a marker. Furthermore, by varying the required error accuracy, matching between calculation speed and calculation accuracy can be adequately adjusted based on the distance between the image pickup means and the object.

Moreover, the present invention provides a position-and-attitude recognition apparatus comprising means for realizing the above steps. Thus, it becomes possible to obtain the quantized space point closest to the actual 3-D absolute coordinates of the image pickup means as an approximate point, and also to detect the attitude parameters representing deviation of the optical axis of the image pickup means. Thus, the control of the mobile system can be adequately carried out on the basis of thus obtained data.

THIRD EMBODIMENT

Figure 13:
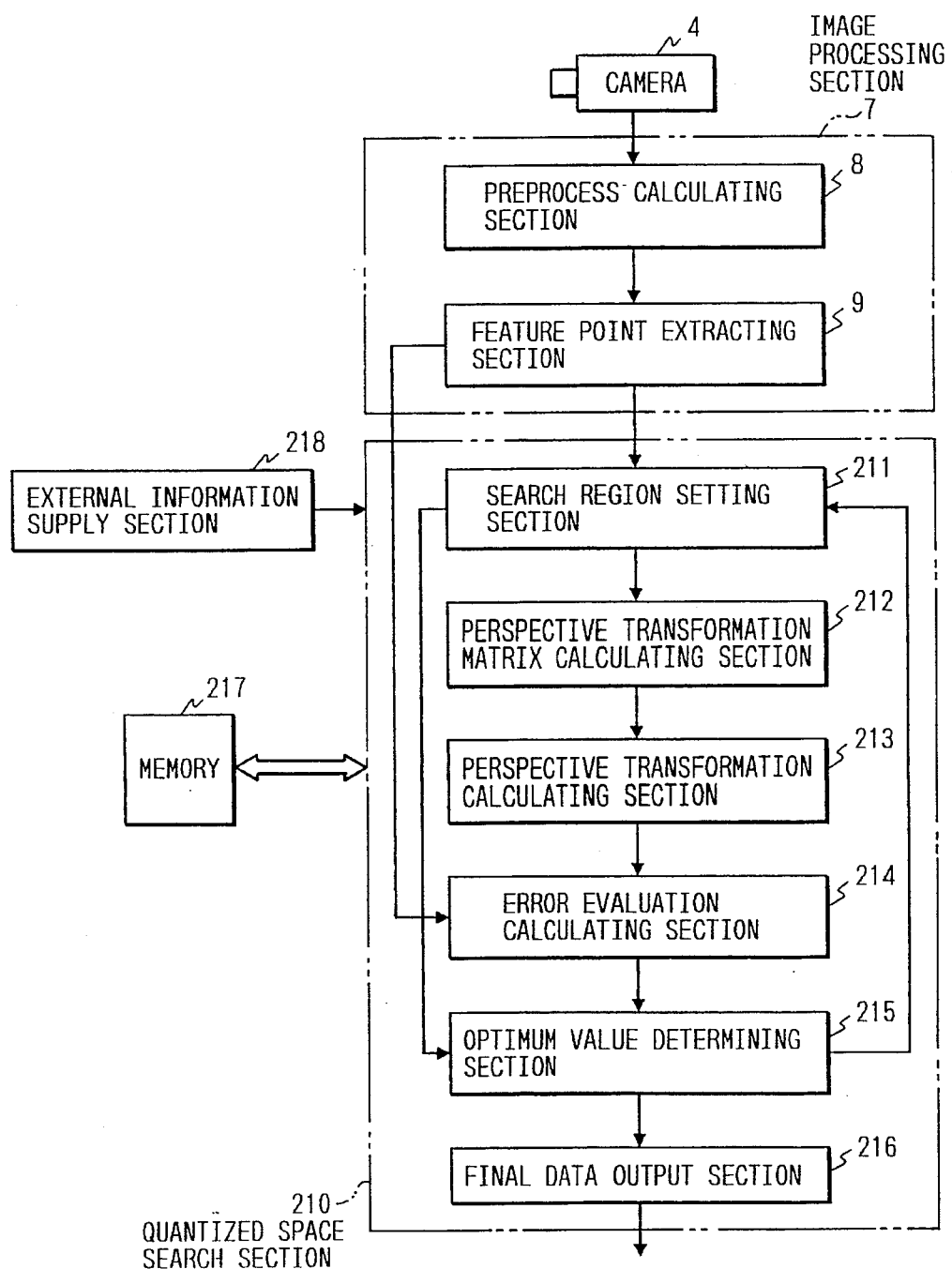
FIG. 13 is a schematic block diagram showing a third embodiment of the present invention.
Figure 14:
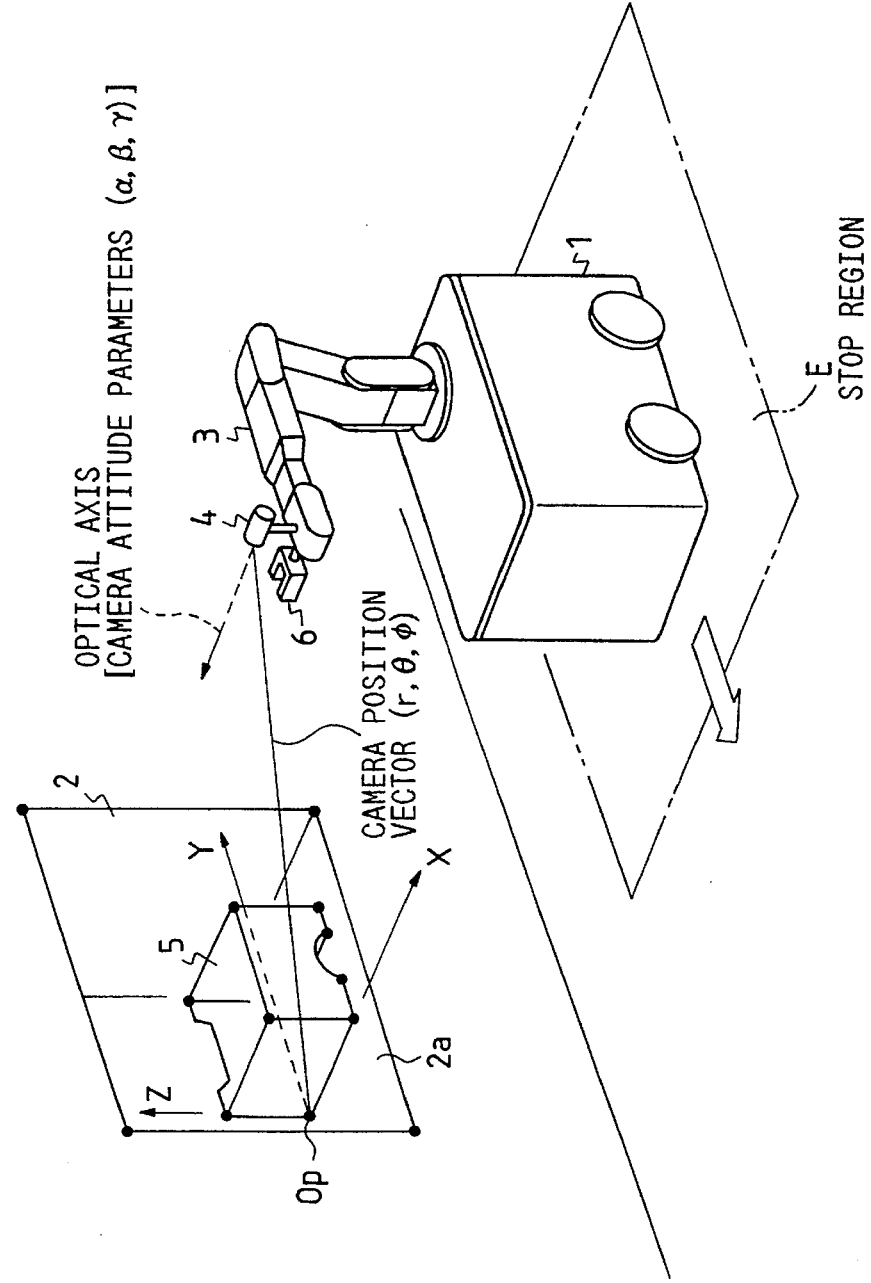
FIG. 14 is a view illustrating the relationship between an autonomous mobile robot and a work area in accordance with the third embodiment of the present invention.

In FIG. 14, illustrating an overall constitution of the third embodiment, an autonomous mobile robot 1 travels on the rails, for example, provided on a floor of a factory so as to move from one work area 2 to another work area 2. This autonomous mobile robot 1 is equipped with the 3-D position-and-attitude recognition apparatus (FIG. 13) of the present invention. The autonomous mobile robot 1 has an arm 3 provided on the upper surface thereof. The arm 3 has a distal end equipped with a camera 4 as an image pickup means and a hand 6 executing various manipulation works, such as gripping a workpiece 5 qualifying as an object to be detected. In this embodiment, the work area 2 is a rectangular cavity formed on a wall, with a base 2a on which the workpiece 5 having a predetermined shape is placed.

FIG. 1B shows a schematic circuit diagram of the 3-D position-and-attitude recognition apparatus. An image processing section 7, serving as image processing means, consists of a preprocess calculating section 8 and a feature point extraction section 9. The preprocess calculating section 8 receives an image signal of a view of the workpiece 5 taken by the camera 4, and executes the signal preprocess, such as binary coding process etc. On the basis of the image information calculated by the preprocess calculating section 8, the feature point extraction section 9 extracts two-dimensional (hereinafter abbreviated as 2-D) image feature points corresponding to the feature points of the workpiece 5, respectively, as described later.

A quantized space search section 210 comprises a search region setting section 211 qualifying as search region setting means; a perspective transformation matrix calculating section 212 qualifying as perspective transformation matrix calculating means; a perspective transformation calculating section 213 qualifying as perspective transformation calculating means; an error evaluation function calculating section 214 qualifying as error calculating means; an optimum value determining section 215 qualifying as local optimum parameter calculating means and optimum position & attitude data determining means; and a final data output section outputting the determined optimum position & attitude data. and 4) parameters of the position-and-attitude vector s [$\gamma$, $\theta$, $\phi$, $\rho$] of the camera 4, sets a parameter search start point s (1, 1), a parameter search width $\delta$ (k, h) and a parameter search region on the basis of the approximate position information of the autonomous robot 1 with respect to the workpiece 5 in the work area 2. Where, k (=1,2,- - - , K) represents the search repetition number. The parameters $\gamma$, $\theta$, $\phi$ and $\rho$ will be explained later.

The perspective transformation matrix calculating section 212 calculates a perspective transformation matrix M based on the approximate position information of the autonomous mobile robot 1 and attitude parameters of the camera 4, for obtaining coordinates of the image feature points on the image to be obtained from the image signal when the workpiece 5 is taken a view by the camera 4 at the parameter search point s (k, h) in the concerned parameter search region. The perspective transformation calculating section 213 calculates 2-D estimated image feature points to be obtained corresponding to the feature points of the workpiece 5 using the perspective transformation matrix M when a view of the workpiece 5 is taken by the camera 4 from the parameter search point s (k, h).

The error evaluation function calculating section interrelates the image feature point extracted from the image processing section 7 with the estimated image feature point and further calculates a position error therebetween based on the error evaluation function D obtaining square error sum. The optimum value determining section 215 determines an optimum value for one search parameter as a local optimum parameter; calculates the local optimum value with respect to respective parameters of the position-and-attitude vector in a pre-designated order; and repeats this procedure a predetermined number of times, thereby determining all the parameters of the position-and-attitude vector.

The quantized space search section 210 is connected with a memory 217 qualifying as memory means, so that these data can be written or read out. The data memorized in advance in the memory 217 are, for example, a feature point matching list; 3-D absolute coordinate data of the workpiece 5 and the work area 2; a focal distance f of the camera 4; a list of the parameter search points and parameter search width together with their coordinate data; and search order designation information for searching the position-and-attitude parameters.

Furthermore, there is provided an external information supply section 218 which supplies the data representing the external position information of the camera 4 to the quantized space search section 210. The signals to be input from the external information supply section 218 are, for example, a travelling control signal supplied from a controller (not shown) to the autonomous mobile robot 1 and a position detecting sensor signal indicating an approximate position of the autonomous mobile robot 1.

Next, an operation of the third embodiment will be explained with reference to FIGS. 15 to 21.

Figure 15:
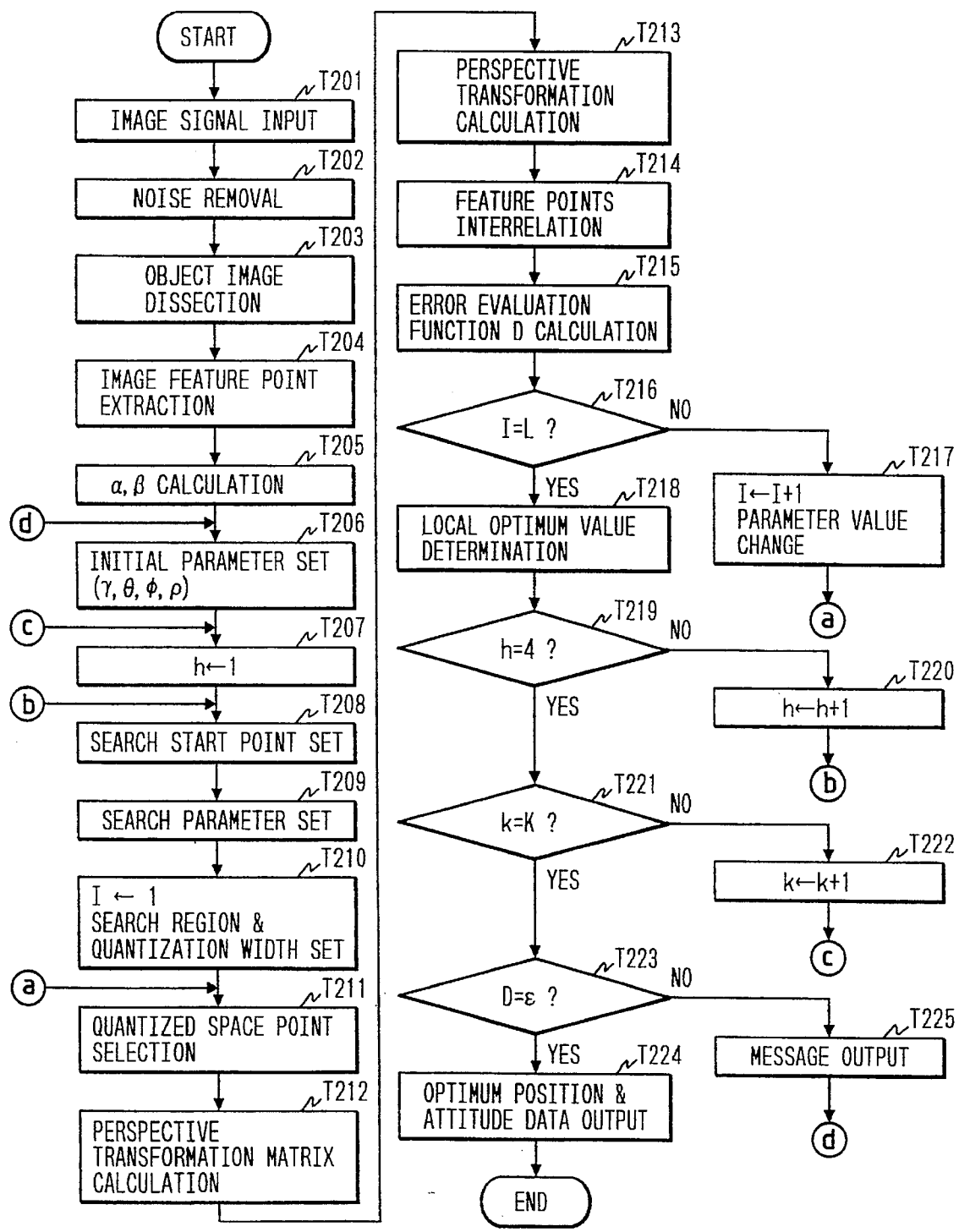
FIG. 15 is a flowchart schematically explaining the processes of the third embodiment of the present invention.

The 3-D position-and-attitude recognition apparatus acts according to the steps shown in the flowchart of FIG. 15 to recognize the position where the camera 4, i.e. the autonomous mobile robot 1, is located. First of all, in the condition shown in FIG. 14, when the autonomous mobile robot 1 travels on the rails and approaches the work area 2—namely, when the work area 2 comes into an image pickup zone of the camera 4, the image processing section 7 initiates inputting image signals from the camera 4. (Step T201)

In this case, the autonomous mobile robot 1 simply travels on a predetermined track in a predetermined direction and stops at a predetermined stop region E predetermined on the basis of the sensor signals or control information of the autonomous mobile robot 1. Accordingly, the relationship between the workpiece 5 and the camera 4 is determined in such a manner that the workpiece 5 is positioned within the visual field of the camera 4 at the stop region E of the autonomous mobile robot 1.

Next, an image signal of the workpiece 5 taken by the camera 4 is applied preprocessing in the perprocess calculating section 8 of the image processing section 7. That is, noise removal process (Step T202) and image dissecting process of the image of the workpiece 5 (Step T203) are executed. Thereafter, the feature extracting section 9 outputs a set Q consisting of m image feature points $Q_j$ based on the image signal in the following manner. (Step T204) The set of the image feature points $Q_j$ is defined by the equations 1 and 2 in the same manner as in the first embodiment.

In extracting the image feature point $Q_j$, the following calculation is carried out on the basis of approximate position information given through the external information supply section 218. In this embodiment, the approximate position information comprises, for example, a work plan memorizing the traveling path of the autonomous mobile robot 1, and hysteresis information representing the spacial trace of the autonomous mobile robot 1 as a result of travelling control. Based on this external information, the central position of the autonomous mobile robot 1 is obtained as approximate 3-D absolute coordinate value. The mutual position of the camera 4 with respect to the central position of the autonomous mobile robot 1 can be known from the control position information of the arm 3; therefore, the approximate position of the camera 4 can be determined also. On the basis of thus obtained approximate position information of the camera 4, an initial search region S (1) can be set as a reference search region for succeeding searches.

Subsequently, the search region setting section 211 sets the search region for various parameters of the camera 4. (Steps T205 and T208) In this embodiment, the parameters of the camera 4 are as follows:

(a) Attitude parameters CP($\alpha$, $\beta$, $\gamma$);

(b) Focal distance parameter f; and (c) Position parameters (r, $\theta$, $\phi$).

Figure 16:
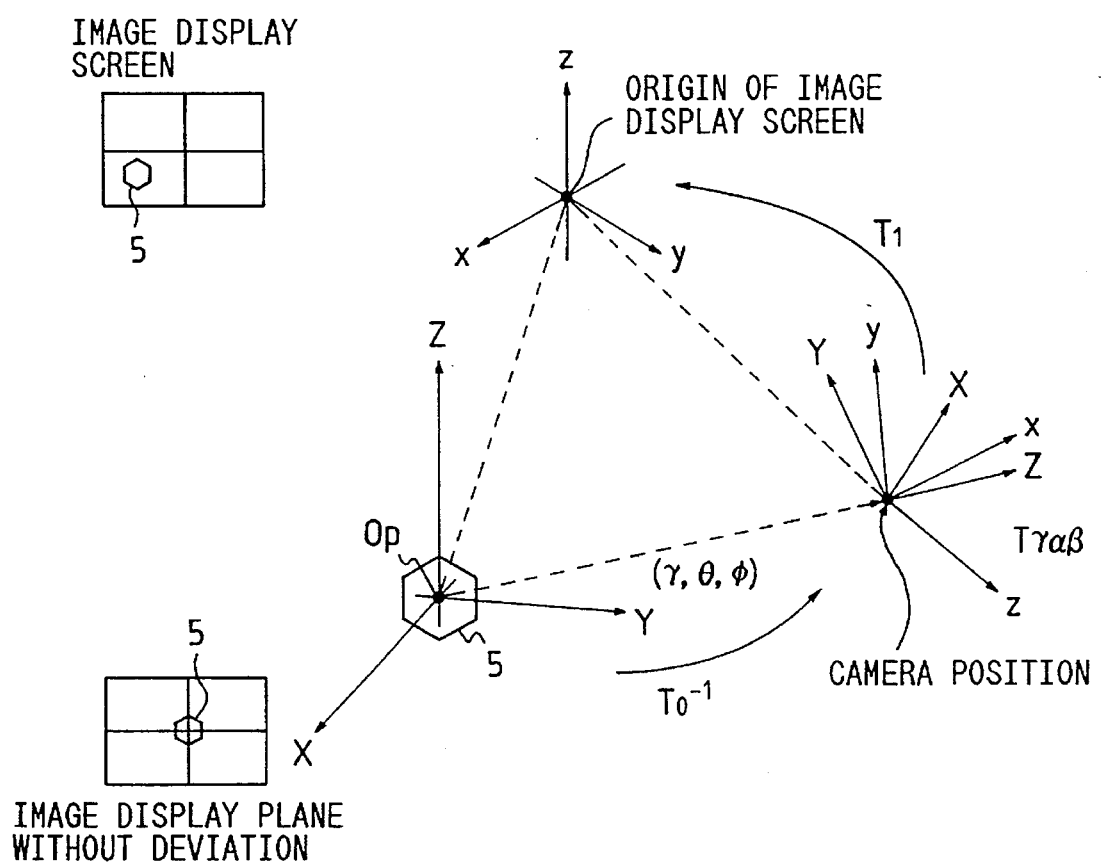

FIGS. 14 and 16 show the relationship among these parameters. The focal distance f is a data inherently determined depending on the characteristic of the camera 4; therefore, the memory 217 stores it as focal distance data beforehand. Let us assume that the optical axis of the camera 4 is defined as a z axis, the horizontal direction of the camera 4 is an x axis, and a vertical direction of the camera 4 is a y axis. The attitude parameters CP are defined as follows: the parameter $\alpha$ represents a rotational angle about the x axis; the parameter $\beta$ represents a rotational angle about the y axis; and the parameter $\gamma$ represents a rotational angle about the z axis. Furthermore the position parameters are polar coordinate values representing the view point of the camera 4 with respect to the origin of the 3-D absolute coordinates system. Namely, r represents a distance while $\theta$ and $\phi$ represent inclined angles.

Figure 17:
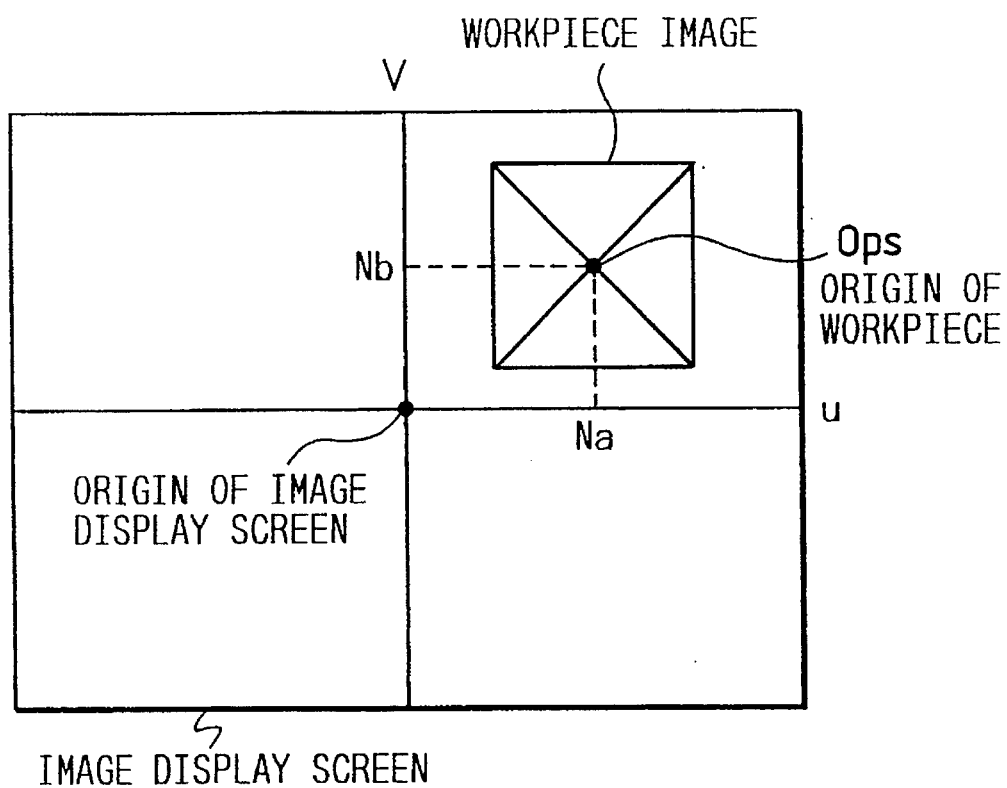
FIG. 17 is a view illustrating the relationship between a workpiece displayed on a camera screen and attitude parameters of the camera in accordance with the third embodiment of the present invention.

Among the attitude parameters CP ($\alpha$, $\beta$, $\gamma$) of the camera 4, parameters $\alpha$ and $\beta$ representing the deviation of the optical axis of the camera 4 can be determined based on the coordinate data of the central position of the object on the image screen. Namely, as shown in FIG. 17, if an image position $O_{ps}$ of the origin $O_p$ is designated as a predetermined position of the workpiece 5, this image position $O_{ps}$ is for example expressed as (Na, Nb) in the 2-D coordinates (u, v) of a picture element (pixel) with respect to the origin of the screen. (The origin $O_p$ can be replaced by another feature point if the origin $O_p$ is not included in the image information) In this case, estimation values of the parameters $\alpha$ and $\beta$ can be calculated according to the following equations 42 and 43.

$$\alpha = arctan\ \{(Na.\ \cos\ \beta)/f\} \quad (42)$$

$$\beta = arctan\ \{-(Nb/f)\} \quad (43)$$

The reason why $\cos\beta$ is involved in the value $\alpha$ is to correct the variation of 2-D coordinate data Na of the image position $O_{ps}$ when the origin $O_p$ of the coordinate system of the workpiece 5 is shifted away in response to the rotation of an angle $\beta$ about y axis in the beginning.

This results in the camera parameter representing the position-and-attitude of the camera 4 becomes 4-dimensional position-and-attitude vector s [$\gamma$, $\theta$, $\phi$, r]. Namely, the remaining unknown parameters $\gamma$, $\theta$, $\phi$ and r are set as search parameters. By the way, in order to avoid any possible confusion between the parameters $\gamma$ and r, the reference character "r" is replaced by "$\rho$" in the following description. Accordingly, the above position-and-attitude vector s [$\gamma$, $\theta$, $\phi$, r] is replaced by a position-and-attitude vector s [$\gamma$, $\theta$, $\phi$, $\rho$], although the reference character "r" is unchanged in FIGS. 14, 16 and 18.

Next, in order to designate the search parameter to be searched, a variable h is set "1" (Step T207) and "$\gamma$" is designated as first parameter (Step T208). Then, one point in the search region S (1) is set as a parameter search start point s (1, 1) for the search parameter $\gamma$. The parameter search start point s (1, 1) is an initial value of the parameter search point s (k, h), where k denotes a search repetition number.

Furthermore, at the parameter search start point s (1, 1), a parameter search width $\delta$ (1, 1) is set with respect to the search parameter $\gamma$ before executing the search. (Steps T210 and T211) This parameter search width $\delta$ determines a variation of the search parameter in the search region, because a variable 1 is successively incremented later (Step T217).

Next, the perspective transformation matrix calculating section 212 calculates a perspective transformation matrix M (1, 1) on the basis of 3-D position coordinate values of the parameter search start point s (1, 1), the values of the attitude parameters $\alpha$ and $\beta$ obtained from the previous equations 42 and 43, and the initial value of the search parameter $\gamma$. (Step T212)

The perspective transformation matrix M is calculated in the following manner. Namely, in the 3-D absolute coordinates system (X, Y, Z) defined with respect to the origin $O_p$ of the workpiece 5, the initial search region S (1) is set. This initial search region S (1) is determined based on the stop region E of the autonomous mobile robot 1. An approximate position A0 ($\rho 0, \theta 0, \phi 0$) represents the polar coordinate values of the approximate position A0 (X0, Y0, Z0) of the camera 4. Placing this approximate position A0 ($\rho 0, \theta 0, \phi 0$) on the center, the position search region is determined in the following manner in view of stop position accuracy.

$$\rho 0 - \Delta \rho 1 \leq \rho \leq \rho 0 + \Delta \rho 2$$

$$\theta 0 - \Delta \theta 1 \leq \theta \leq \theta 0 + \Delta \theta 2$$

$$\phi 0 - \Delta \phi 1 \leq \phi \leq \phi 0 + \Delta \phi 2$$

Regarding the attitude search region, the results of the equations 42 and 43 are used for the parameters $\alpha$ and $\beta$. And, the region of $\gamma$ is determined as follows.

$$-\Delta \gamma 1 \leq \gamma \leq \Delta \gamma 2$$

Figure 18:
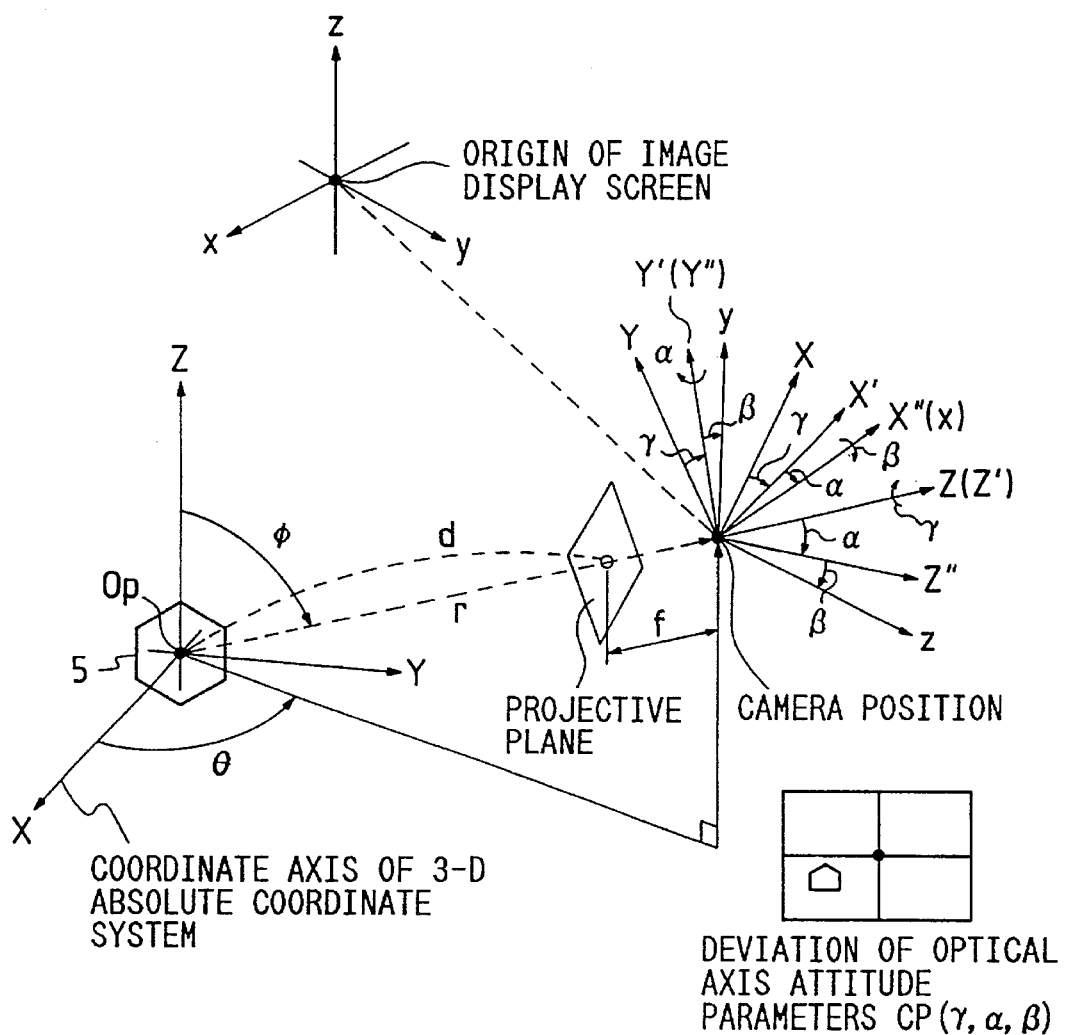
FIG. 18 is a view illustrating the relationship between coordinate axes used in the calculation of the perspective transformation matrix in accordance with the third and fourth embodiments of the present invention.

Then, the perspective transformation matrix M is obtained based on the attitude parameters CP($\alpha$, $\beta$, $\gamma$) of the camera 4 and a distance d with respect to the projective plane and a view point position of the camera 4 obtained from the focal distance parameter f, in view of the relationship shown in FIG. 18.

The perspective transformation matrix M is expressed in the following equation.

$$M = T.M1.M2.M3 \qquad (44)$$

Where, T represents a transformation matrix for rotation, parallel shift, enlargement, contraction (In this embodiment, T is used for the calculation of rotation expressed by the attitude parameters CP of the camera 4); M1 represents a perspective transformation matrix from the workpiece to the projective space; M2 represents a perspective transformation matrix from a plane in the projective space to the projective plane; and M3 represents a coordinate transformation matrix from the projectlye plane to the image display plane. Where, a product of perspective transformation matrixes M1.M2 and the coordinate transformation matrix M3 are expressed by the following equations 45 and 48.

$$M1 \cdot M2 = \begin{pmatrix} (d-\rho)\sin\theta & (d-\rho)\cdot\cos\phi\cdot\cos\theta & -\sin\phi\cdot\cos\theta \\ -(d-\rho)\cdot\cos\theta & (d-\rho)\cdot\cos\phi\cdot\sin\theta & -\sin\phi\cdot\sin\theta \\ 0 & -(d-\rho)\cdot\sin\phi & -\cos\phi \\ 0 & 0 & \rho \end{pmatrix} \qquad (45)$$

$$M3 = \begin{pmatrix} NH/(2\cdot LH) & 0 & 0 \\ 0 & NV/(2\cdot LV) & 0 \\ 0 & 0 & 1 \end{pmatrix} \qquad (46)$$

$$LH = \rho \cdot \tan(wH/2)$$
$$LV = \rho \cdot \tan(wV/2)$$

Where, NH represents the horizontal image size of the image display screen; NV represents the vertical image size of the image display screen; wH represents the horizontal field angle of the camera; and wV represents the vertical field angle of the camera.

Furthermore, the transformation matrix T is used to calculate the rotation in accordance with the attitude parameter CP ($\alpha$, $\beta$, $\gamma$) corresponding to the deviation of the optical axis of the camera 4. The transformation matrix T is expressed by the following equations 47, 48 and 49 as rotation transformation matrix rotating in order of $\gamma$, $\alpha$ and $\gamma$, on the basis of the relationship shown in FIGS. 16 and 18.

$$T = T0^{-1} \cdot T\gamma\alpha\beta \cdot T1 \qquad (47)$$

$$= \begin{pmatrix} A^t(\theta,\phi) & 0 \\ -x0 & 1 \end{pmatrix} \begin{pmatrix} R(\gamma,\alpha,\beta) & 0 \\ 0 & 1 \end{pmatrix} \begin{pmatrix} A(\theta,\phi) & 0 \\ x1 & 1 \end{pmatrix}$$

$$x_0 = 0, \; x_1 = \rho \cdot \sin\phi \cdot \cos\theta$$
$$y_0 = 0, \; y_1 = \rho \cdot \sin\phi \cdot \sin\theta$$
$$z_0 = \rho, \; z_1 = \rho \cdot \cos\phi$$

$$A(\theta,\phi) = \begin{pmatrix} -\sin\theta & \cos\theta & 0 \\ -\cos\phi\cdot\cos\theta & -\cos\phi\cdot\sin\theta & \sin\phi \\ \sin\phi\cdot\cos\theta & \sin\phi\cdot\sin\theta & \cos\phi \end{pmatrix} \qquad (48)$$

$$R(\gamma,\alpha,\beta) = R\gamma \cdot R\alpha \cdot R\beta \qquad (49)$$

$$= \begin{pmatrix} \cos\gamma & \sin\gamma & 0 \\ -\sin\gamma & \cos\gamma & 0 \\ 0 & 0 & 1 \end{pmatrix} \begin{pmatrix} \cos\alpha & 0 & -\sin\alpha \\ 0 & 1 & 0 \\ \sin\alpha & 0 & \cos\alpha \end{pmatrix}$$

$$\begin{pmatrix} 1 & 0 & 0 \\ 0 & \cos\beta & \sin\beta \\ 0 & -\sin\beta & \cos\beta \end{pmatrix}$$

By the way, calculation amount can be more reduced in the calculating steps of the above-described perspective transformation matrix M, in the following manner. Namely, if the equation 47 is substituted into the transformation matrix T of the equation 44, the following equation 44A will be derived. In the equation 44A, MT is identical with T1.M1.M2. Using the equations 45 and 47, the element MT can be further simplified as shown in the following equation 44B. If the equation 44B is substituted into the equation 44A, the perspective transformation matrix M is obtained as shown in the following equation 44C. If this equation 44C is used in a practical calculation, overall calculation time will be more reduced and, therefore, calculating speed will be further increased.

$$M = T_0^{-1} \cdot T_{\gamma\alpha\beta} \cdot T_1 \cdot M_1 \cdot M_2 \cdot M_3 \qquad (44A)$$

$$= (T_0^{-1} \cdot T_{\gamma\alpha\beta}) \cdot M_T \cdot M_3$$

$$M_T = T_1 \cdot M_1 \cdot M_2 \qquad (44B)$$

$$= \begin{bmatrix} \rho-d & 0 & 0 \\ 0 & \rho-d & 0 \\ 0 & 0 & -1 \\ 0 & 0 & 0 \end{bmatrix}$$

$$M = \begin{bmatrix} A^t(\theta,\phi) & 0 \\ -X0 & 1 \end{bmatrix} \begin{bmatrix} R(\gamma,\alpha,\beta) & 0 \\ 0 & 1 \end{bmatrix} \begin{bmatrix} \rho-d & 0 & 0 \\ 0 & \rho-d & 0 \\ 0 & 0 & -1 \\ 0 & 0 & 0 \end{bmatrix} \cdot M_3 \qquad (44C)$$

Next, on the basis of thus calculated perspective transformation matrix M(1, 1), the perspective transformation calculating section 213 executes the calculation of perspective transformation to convert n feature points $P_i$ of the set P, which represent the 3-D feature points of the work area 2 and the workpiece 5 mounted thereon, into coordinates on the 2-D image display screen. (Step T213) And then, the estimated image feature points $Q_{ei}$ are obtained so as to correspond to respective feature points $P_i$. A set Qe of estimated image feature points $Q_{ei}$ is expressed in the following manner.

$$Qe=\{Qei; i=1, 2, \cdots, n\} \quad (n \geq m) \qquad (50)$$

$$Qei=(uei, vei) \qquad (51)$$

Where, uei and vei are element values of the estimated image feature point Qei on the 2-D coordinates of the image display screen. Using the equation 44 or 44C, the transformation from the set P of the feature points $P_i$ to the set Qe of the estimated image feature points Qei is expressed in the following manner.

$$(uei, vei, 1)=(Xi, Yi, Zi, 1).M \qquad (52)$$

$$Pi=(Xi, Yi, Zi)$$

Where, (Xi, Yi, Zi) represents the 3-D absolute coordinates of the feature point $P_i$.

Figure 19A:
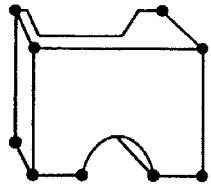
FIGS. 19(A) to 19(F) are views showing various patterns of perspective views of the object to be seen.
Figure 19B:
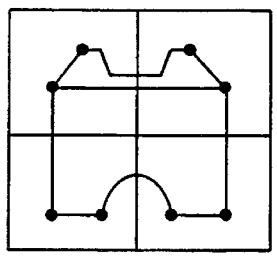
Figure 19C:
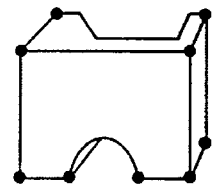
Figure 19D:
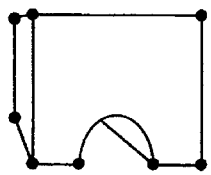
Figure 19E:
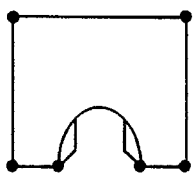
Figure 19F:
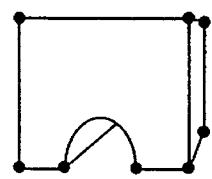
Figure 20A:
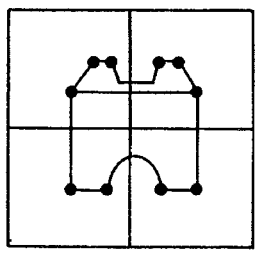
FIGS. 20(A) to 20(C) are views showing further various patterns modifying one perspective view of the object.
Figure 20B:
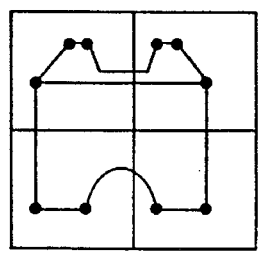
Figure 20C:
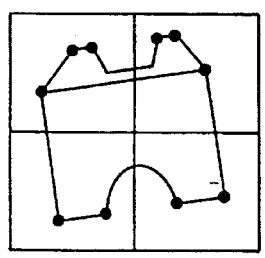

Next, a feature point correspondence list is created. (Step T214) This feature point correspondence list represents the relationship between the image feature points $Q_j$ of the workpiece 5 taken by the camera 4, which are extracted from the image processing section 7, and the 3-D feature points $P_i$ of the workpiece 5 which are pre-memorized. In this case, the feature points $P_i$ of the workpiece 5 shown in FIG. 9(A) are compared with the perspective patterns shown in FIGS. 19(A) to 19(F). With this comparison, one of perspective pattern of the workpiece 5 is determined as shown in FIG. 9(B) in view of correspondence between the feature points $P_i$ and the image feature points Qj on the image display screen. For example, in the case where a feature point correspondence list relating to FIG. 19(B) is obtained, some modifications will be included in the perspective pattern, as shown in FIGS. 20(A) to 20(C); FIG. 20(A) is a contracted pattern, FIG. 20(B) is an offset pattern, FIG. 20(C) is an inclined pattern. Such deviation of the perspective pattern of the workpiece 5 will be searched in the search process described hereinafter.

Subsequently, the error evaluation function calculating section 214 calculates an error evaluation function D (1, 1) between the image feature point $Q_j$ and the set Qe(=P.M) of estimated image feature points Qei. (Step T215) In this case, the error evaluation function D (k, h) obtains a value corresponding to the square error sum of the distance between the image feature point $Q_j$ and the estimated image feature point Qei.

Thereafter, the search procedure is continued by repeating the above-described steps T211 through T215 with respect to the quantized parameter search points in the parameter search region of the search parameter γ at intervals of the parameter search width δ (1, 1). (Steps T216 and 217)

Obtaining a local optimum value $D_{min}$ (1, 1) which is the minimum value of the error evaluation function D(1, 1), the search point where the above local optimum value $D_{min}$ is obtained is found. On the basis of the search parameter y at this parameter search point, a point s (1, 2) is determined as a parameter search point in this concerned parameter search region. (Step T218) In this calculating process, values of other parameters θ, φ and ρ are fixed at their initial values.

Subsequently, thus-obtained position & attitude parameter search point s (1, 2) is set as a new parameter search start point. Then, setting θ (h=2) as the next search parameter (Steps T219 and T220), the above-described steps T208 to T217 are repeated, so as to calculate a local optimum value $D_{min}$ with respect to the search parameter θ.

The search procedure for the search parameter θ is executed by repeating the above-described steps T208 through T217 with respect to the quantized parameter search points in the parameter search region of the search parameter θ at intervals of the parameter search width δ (1, 2).

Obtaining a local optimum value $D_{min}$ (1, 2) for the search parameter θ in the step T218, the search point where the above local optimum value $D_{min}$ is obtained is assigned to be s (1, 3).

In the same manner, for the remaining search parameters φ and ρ, the above-described steps T208 to T218 are repeatedly executed. After obtaining a parameter search point s (1, 4) corresponding to a local optimum value $D_{min}$ (1, 4) of the search parameter φ, a local optimum value $D_{min}$ (2, 1) of the search parameter ρ is obtained. In this instance, a parameter search point s (2, 1) is believed to be a final local optimum value $D_{min}$ with respect to all the search parameters γ, θ, φ and ρ in the first search procedure.

Accordingly, through the step T219, the search program proceeds to a step T221 and then goes to a step T222 unless the search repetition number k becomes a predetermined value K. Above-described search processes steps T207 to T222 are thus repeatedly executed.

The search region S (k) is renewed from the search region S (1) to a new search region S (2). In other words, search region for the respective search parameters γ, θ, φ and ρ is narrowed in this second search process in taking account of the result of the first search process, so that the accuracy of the search is increased by setting a parameter search width δ (2, h) having a narrower width.

Furthermore the parameter search point s (2, 1), which corresponds to the final local optimum value $D_{min}$ (2, 1) in the first search process for the search parameters γ, θ, φ and ρ, is newly set as a parameter search start point in the second search process, in order to execute the calculation in the same manner. Accordingly, the search process is successively and independently repeated with respect to all the search parameters γ, θ, φ and ρ until this calculating procedure is repeated K times.

The concept of the above search process will be simply explained with reference to FIG. 21. In the drawing, the 4-D position-and-attitude vector s [γ, θ, φ, ρ] is simplified into a 3-D position-and-attitude vector s [θ, φ, ρ] for the convenience of explanation.

Figure 21:
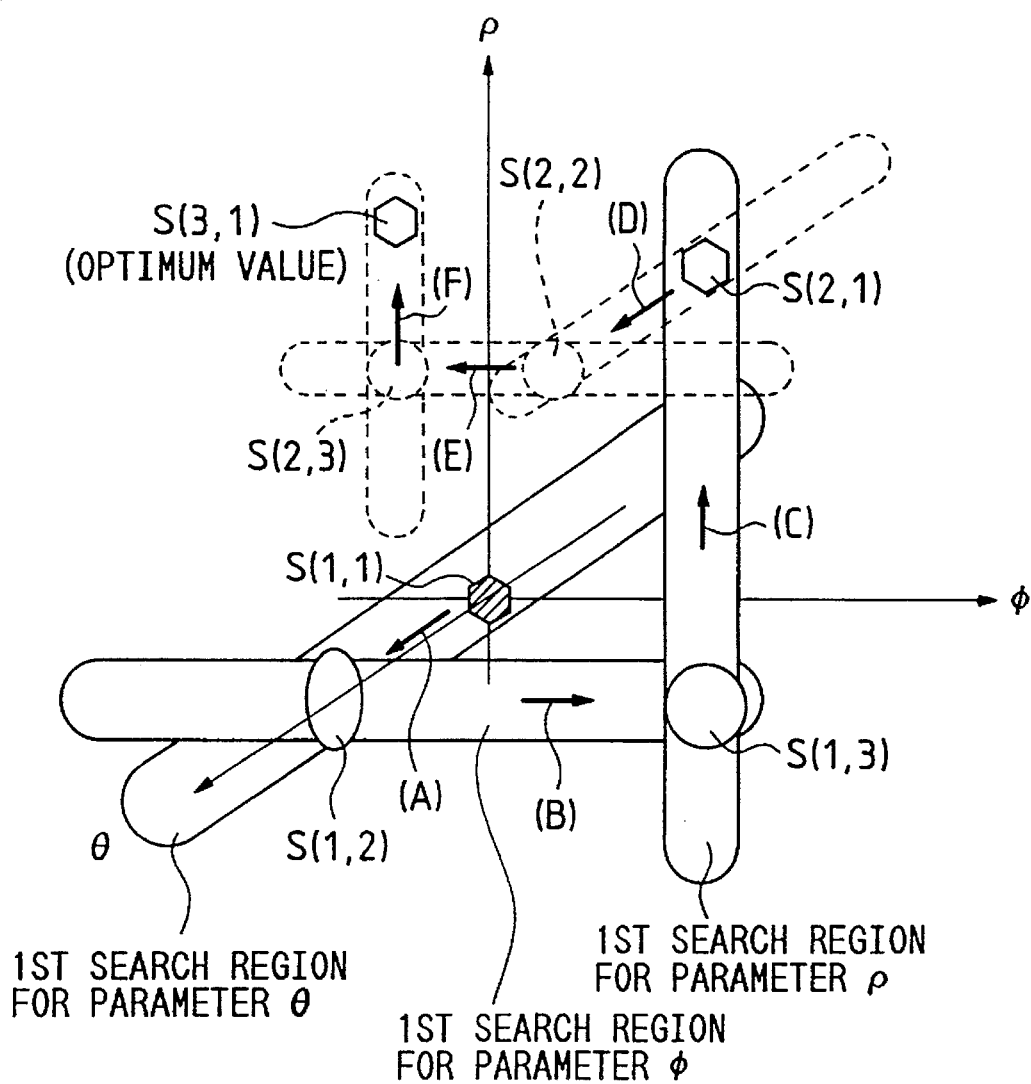
FIG. 21 is a schematic view showing search processes in accordance with the third embodiment of the present invention.

That is, as shown in FIG. 21, the respective search parameters θ, φ and ρ of the position-and-attitude vector s [θ, φ, ρ] are allocated as θ axis, φ axis and ρ axis, respectively, which define a rectangular coordinates system in the 3-D space with an origin located at the parameter search start point s (1, 1).

First, fixing the search parameters φ and ρ at their initial values, only the search parameter θ is independently searched to calculate the parameter search point s (1, 2) of the position-and-attitude vector where the error evaluation value $D_{min}$ becomes minimum. Namely, along the θ-axis direction (a direction of an arrow A), the error evaluation value $D_{min}$ is obtained at each of the parameter search points allocated at the predetermined parameter search width δ (1, 1). Using the search parameter θ corresponding to the error evaluation value $D_{min}$, a new parameter search point s (1, 2) is obtained. Thus, the first independent search for the search parameter θ is accomplished.

Next, thus obtained parameter search point s (1, 2) is designated as a new parameter search start point to execute the similar search for the next search parameter φ. Fixing other search parameters θ and ρ, only the search parameter φ is searched at intervals of a parameter search width δ (1, Accordingly, the search is executed from the parameter search point s (1, 2) along the φ axis (a direction of an arrow B in the drawing). Obtaining the local optimum value $D_{min}$ in the predetermined search region, a new parameter search point s (1, 3) is obtained on the basis of the value of the search parameter φ corresponding to the local optimum value $D_{min}$.

Subsequently, the same procedure is executed with respect to the search parameter ρ to obtain a parameter search point s (2, 1), which becomes a parameter search start point in the second search process. The similar search process is repeated K times. This parameter search goes like arrows C to F in FIG. 21, so the parameter search point s (k, h) converges to the optimum value. Thus finally obtained parameter point s (K+1, 1) becomes an optimum position-and-attitude data identifying the optimum position-and-attitude vector s [θ, φ, ρ].

Once the first search is accomplished with respect all the parameters, the search region of the second search is narrowed. In this manner, the search region is gradually narrowed with increasing search repetition number K. In other words, the target detection accuracy can be increased by enlarging the search repetition number K.

After K (e.g. K=5) times repetitive executions of the above-described steps T207 to T222, the search program proceeds through the step T221 to a step T223.

Subsequently, the optimum value determining section 215 makes a judgement as to whether the local optimum value $D_{min}$ corresponding to the finally obtained parameter search point s (6, 1) is smaller than a target error accuracy ε.

If the local optimum value $D_{min}$ is smaller than the target error accuracy, the final data output section 216 outputs the position vector s [γ, θ, φ, ρ] corresponding to the parameter search point s (6, 1) and the attitude parameters α and β as optimum position-and-attitude data. (Step T224)

On the contrary, if the local optimum value $D_{min}$ is always not smaller than the target error accuracy throughout a series of search processes, a message is output that no search point s satisfies the target error accuracy ε. (Step T225) Then, the next search start point and a new search region S are set at the point represented by the position-and-attitude vector s [γ, θ, φ, ρ] and the attitude parameters (α, β) of the camera 4, which is the position of the parameter search point s (k, h) whose local optimum value $D_{min}$ is most closest to the target error accuracy ε. Thereafter, the program returns to the step T208 to execute the same search procedure.

The parameter search width δ needs to be sufficiently smaller than the target error accuracy ε when the search repetition number k becomes its maximum value K, meanwhile it will be allowed that the parameter search width δ is larger than the target error accuracy ε if the search repetition number k is fairly smaller than K. Thus, it becomes possible to promptly calculate the approximate position-and-attitude of the camera 4 in the beginning of the search by widely setting the parameter search width δ on one hand, and to increase the accuracy of detection in the final stage of the search by finely setting the parameter search width δ on the other hand. In other words, reduction of calculating time and increase of accuracy can be both effectively realized.

According to the experimental result of the inventors, even if the search repetition number k is as small as 5, a satisfactory result was obtained to attain a detection error accuracy of ±1.0 mm in the distance and ±0.5° in the attitude. It is thus assured that the promptness, accuracy and robustness are satisfied in the recognition of the position and attitude.

Accordingly, the third embodiment of the present invention extracts image feature points Qj of the work area 2 and the workpiece 5 which qualify as object having known shape on the basis of the image information taken by the camera 4; sets a space search region Sc with a plurality of quantized space points; calculates the estimated image feature points Qei of the workpiece 5 to be obtained when a view of the workpiece 5 is taken at the search point s(k, 1) by the camera 4 with the position vector s [γ, θ, φ, ρ], through the calculation of the perspective transformation matrix M (k, h); calculates the local optimum value $D_{min}$ of the error evaluation function D from the interrelation between the image feature points Qj and the estimated image feature points Qei with respect to each search parameter so as to execute the independent search successively as much times as the repetition number K; makes a judgement as to whether the local optimum value $D_{min}$ satisfies the required error accuracy ε, and outputs the position vector s [γ, θ, φ, ρ] corresponding to the parameter search point s satisfying the required error accuracy ε and the attitude parameters α and β, as optimum position-and-attitude data.

The third embodiment of the present invention brings the following effects.

First, no marker is required and, therefore, there is no time loss due to detection of the marker. Thus, the computational time can be reduced compared with the conventional system.

Second, this embodiment does not calculate the parameters from the components of the perspective transformation matrix. It means that the least-square estimation of the perspective transformation matrix is no longer required; accordingly, the calculation can be promptly accomplished because the huge calculation for the least-square estimation of the perspective transformation matrix can be omitted.

Third, this embodiment can be applicable to the camera 4 whose attitude parameters are unknown.

Fourth, in the calculation for obtaining the position vector s [γ, θ, φ, ρ] of the camera 4, successive and independent search is cyclically repeated, thereby assuring the highly accurate and robust recognition of the optimum position-and-attitude can be realized with the least search times.

Fifth, the perspective transformation matrix M can be simplified from the equation 44 to the equation 44C for practical use. The calculation amount can be fairly reduced.

Although the above embodiment pre-designated the search order of the search parameters γ, θ, φ and ρ, this search order can be flexibly changed. For example, if the parameter ρ has a great effect on the determination of the search region, this parameter ρ can be searched first. Anyway, the search order should be determined in view of efficiency of the search.

Figure 23:
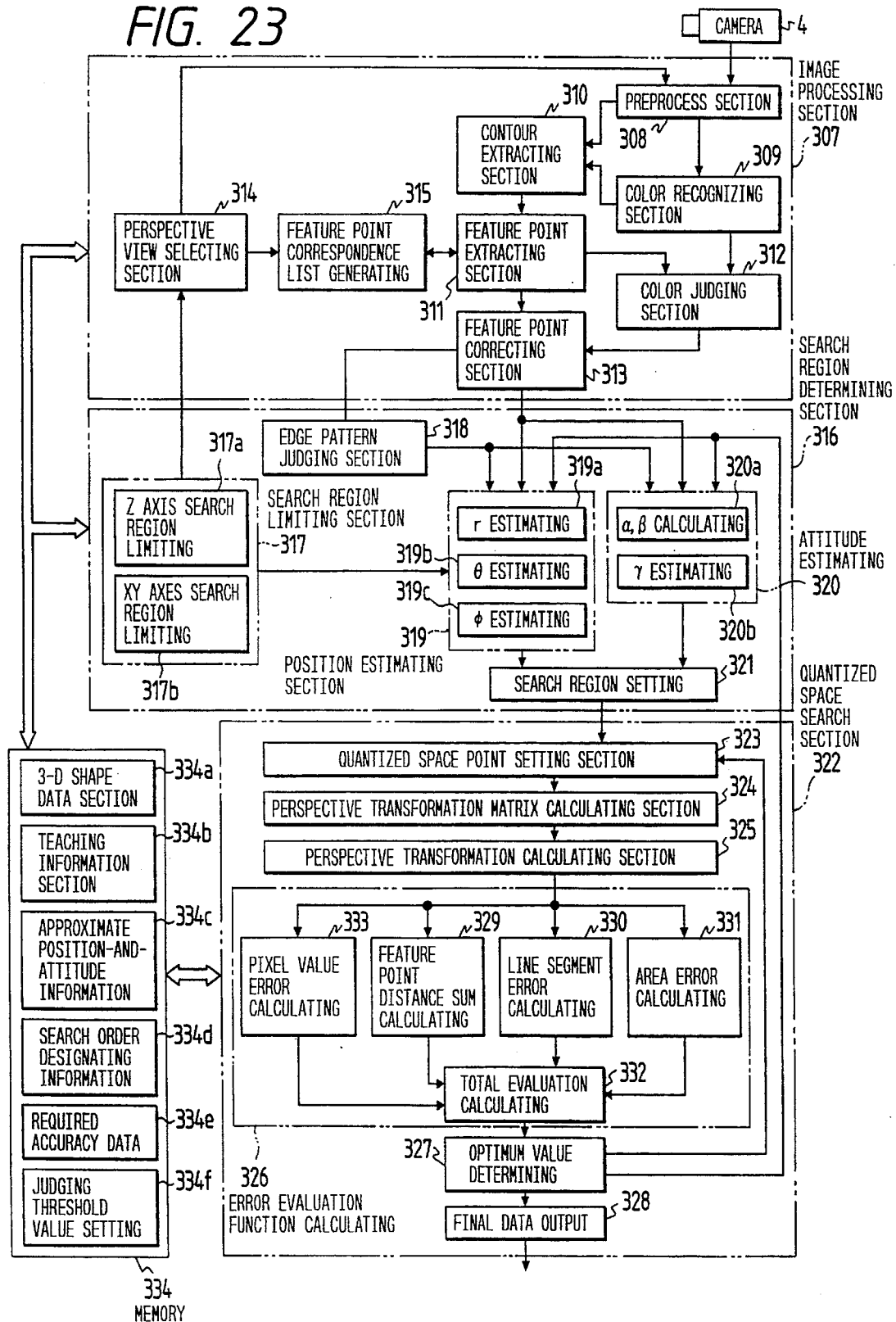
FIG. 23 is a schematic block diagram showing a fourth embodiment of the present invention.

FIG. 23 shows a modified embodiment of the third embodiment. Only the difference will be explained hereinafter. Namely, the modified embodiment executes the steps shown in FIG. 23 in addition to the steps of the third embodiment in order to increase the robustness.

Although the third embodiment determined the values of the attitude parameters α and β of the camera based on the image information in the very beginning of the search, these parameters α and β possibly include an error if the 2-D coordinate values representing the origin of the object coordinate system includes an error when extracted from the image data of the image display screen. This modified embodiment eliminates the effects of such errors.

Figure 22:
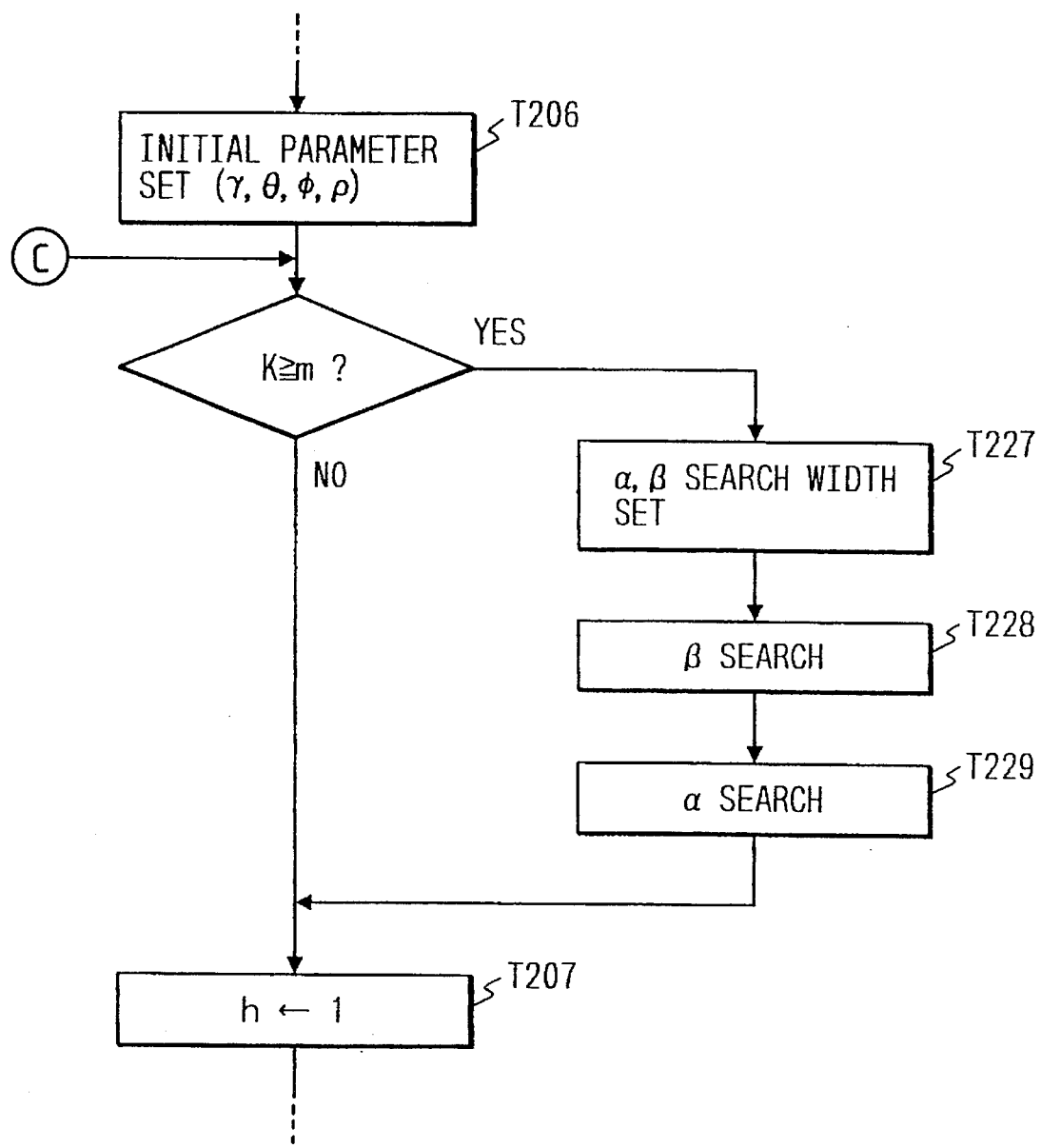
FIG. 22 is an additional part of the flowchart of FIG. 15 schematically explaining the processes of the third embodiment of the present invention.

After completing the step T206 of the third embodiment, the search program of the modified embodiment, proceeds to a step T226 shown in FIG. 22. In this step T226, it is judged whether the search repetition number k is not smaller than the predetermined number m, which represents a search start number of the camera attitude parameters α and β. If the judgement in the step T226 is "NO", the program proceeds to the step T207 and executes the same procedure as the third embodiment. On the other hand, if the judgement in the step T228 becomes "YES", the program proceeds to steps T227 to T229.

That is, the step T227 determines the search widths of the attitude parameters α and β; the step T228 executes the search of the attitude parameter β; and the step T229 executes the search of the attitude parameter α. Thereafter, the program returns to the step 207 and executes the same procedure as the third embodiment. In this case, the larger the search repetition times, the narrower the search width in the step T227. Thus, search accuracy is increased.

In accordance with this modified third embodiment, the camera parameters α and β are added as search parameters as well as other four search parameters γ, θ, φ and ρ. Thus, even if the parameters α and β accidentally include an error due to detection error of the origin coordinate data $O_p$ from the image display screen in the beginning of the search, such errors can be corrected in the later stage—at the repetition number m (2<m<K)—of the search through the steps T227 to T229 of the above-described flowchart of FIG. 22. Hence, the search accuracy is increased. In addition, reduction of calculation speed can be suppressed compared with the case where the six search parameters α, β, γ, θ, φ and ρ are all searched from the beginning.

FOURTH EMBODIMENT

The invention of the fourth embodiment will be described with reference to FIGS. 23 to 35. An autonomous mobile robot 1 travels on the rails, for example, provided on a floor of a factory so as to move from one work area 2 to another work area 2. This autonomous mobile robot 1 is equipped with the 3-D position-and-attitude recognition apparatus (FIG. 23) of the present invention. The autonomous mobile robot 1 has an arm 3 provided on the upper surface thereof. The arm 3 has a distal end equipped with a camera 4 as an image pickup means and a hand 6 executing various manipulation works, such as gripping a workpiece 5 qualifying as an object to be detected. In this embodiment, the work area 2 is a rectangular cavity formed on a wall, with a base 2a on which the workpiece 5 having predetermined shape is placed.

FIG. 23 shows a schematic circuit diagram of the 3-dimensional position-and-attitude recognition apparatus. An image processing section 307, serving as image processing means, comprises a preprocess section 308, a color recognizing section 309, a contour extracting section 310, a feature point extracting section 311, a color judging section 312, a feature point correcting section 313 qualifying as feature point correcting means, perspective view selecting section 314, and a feature point correspondence list generating section 315.

The preprocess section 308 receives the image signal of a view of the workpiece 5 taken by the camera 4, and executes the signal preprocess, such as binary coding process from analogue signal to digital signal by using a predetermined threshold value. The color recognizing section 309 recognizes the color of the image signal on the basis the digital image signal from the preprocess section 308, in order to recognize the image condition of the workpiece 5 on the image screen which is affected by background environment of the work area 2 and difference of illumination.

The contour extracting section 310 extracts an edge line making up the contour of the workpiece 5 on the basis of the digital image signal and supplies the edge line to the feature point extracting section 311. The feature point extracting section 311 extracts a 2-D image feature points corresponding to the feature points of the workpiece 5o The color judging section 312 makes a judgement of color of the workpiece 5 on the basis of the color recognition signal from the color recognizing section 309 and an image feature point signal from the feature point correcting section 311, and sends this judgement result to a feature point correcting section 313 as correcting information.

The feature point correcting section 313, on the basis of the correcting information from the color judging section 312, starts the search from the presently obtained image feature point for finding an optimum image feature point according to the feature point correcting program later described, and outputs the resultant point as optimum image feature point.

The perspective view selecting section 314 selects one of a plurality of patterns on the basis of information memorized in a memory 303. These plural patterns represent various perspective views of the workpiece 5 to be displayed on the image display screen when the workpiece 5 is taken by the camera 4. Namely, the perspective view selecting section 314 selects the most closest perspective pattern among pre-stored plural patterns, and transmits it to the preprocess section 308 and the feature point correspondence list generating section 315. The feature point correspondence list generating section 315, on the basis of the perspective pattern selected by the perspective view selecting section 314, creates a correspondence list showing the relationship between the actual feature points of the workpiece 5 and the image feature points of the workpiece 5 on the image pickup screen to be obtained when taken a view by the camera 4, and outputs the resultant list to the feature point extracting section 311.

A search region determining section 318, qualifying as search region setting means, comprises a search region limiting section 317, an edge pattern judging section 318, s position estimating section 319, an attitude estimating section 320, and a search region setting section 321.

The search region limiting section 317, divided into a Z axis search region limiting subsection 317a and an XY axes search region limiting subsection 317b, limits the search region in each of the X, Y and Z axes on the basis of the teaching information later described. The edge pattern judging section 318 makes a judgement of the edge pattern by estimating a deviation of a deviation parameter on the basis of the corrected optimum feature point data and predicted image feature point data obtained from the perspective pattern.

The position estimating section 319, divided into an r estimating subsection 319a, a θ estimating subsection 319b and a φ estimating subsection 319c, estimates the values of the parameters (r, θ, φ) on the basis of the edge pattern data estimated by the edge pattern judging section 318. The parameters (r, θ, φ) are polar coordinate values representing the position of the camera 4 with respect to the origin of the 3-D absolute coordinates system.

The attitude estimating section 320, divided into an calculating subsection 320a and a y estimating subsection 320b, estimates the values of the parameters (α, β, γ) on the basis of the edge pattern data estimated by the edge pattern judging section 318. The parameters (α, β, γ) represent the attitude of the camera 4.

The search region setting section 321 sets a search region on the basis of the estimated data of respective parameters given from the position estimating section 319 and the attitude estimating section 320 and the approximate position-and-attitude information.

The search region setting section 311, using 4 (h=4) parameters of the position-and-attitude vector s [γ, θ, φ, ρ] of the camera 4, sets a parameter search start point s (1, 1), a parameter search width δ (k, h) and a parameter search region on the basis of the approximate position information of the autonomous robot 1 with respect to the workpiece 5 in the work area 2. Where, k (=1,2, - - - , K) represents the search repetition number. The parameters γ, θ, φ and ρ will be explained later.

A quantized space search section 322, as quantized space search means, comprises a quantized space point setting section 323; a perspective transformation matrix calculating section 324 qualifying as perspective transformation matrix calculating means; a perspective transformation calculating section 325 qualifying as perspective transformation calculating means; an error evaluation function calculating section 326 qualifying as error calculating means; an optimum value determining section 327; and a final data output section 328.

The quantized space point setting section 327, in order to execute the calculation for search processing, successively sets a quantized space search point within the search region set by the search region setting section 321. The perspective transformation matrix calculating section 324 calculates a perspective transformation matrix M based on the approximate position information of the autonomous mobile robot 1 and the attitude parameters of the camera 4, for obtaining coordinates of the image feature points on the image to be obtained from the image signal when the workpiece 5 is taken a view by the camera 4 at the parameter search point s (k, h) in the concerned parameter search region. The perspective transformation calculating section 325 calculates 2-D estimated image feature points to be obtained corresponding to the feature points of the workpiece 5 using the perspective transformation matrix M when a view of the workpiece 5 is taken by the camera 4 from the parameter search point s (k, h).

The error evaluation function calculating section 326 interrelates the optimum image feature point extracted from the image processing section 307 with the estimated image feature point and further calculates a position error therebetween based on the error evaluation function D explained below. More specifically, the error evaluation function calculating section 326 consists of a feature point distance sum calculating section 329, a line segment error sum calculating section 330, an area error calculating section 331, a pixel value error calculating section 333, and a total evaluation calculating section 332.

The feature point distance sum calculating section 329 calculates an error value based on an error evaluation function D1. The error evaluation function D1 obtains the relationship between the optimum image feature point and estimated image feature point based on the distance therebetween. The line segment error sum calculating section 330 calculates an error value based on an error evaluation function D2. The error evaluation function D2 obtains a deviation amount between a line segment connecting the optimum image feature points and a line segment connecting the estimated image feature points so as to correspond to the distance between the lines.

The area error calculating section 331 obtains an error value based on an area error evaluation function D3. The area error evaluation function D3 calculates a deviated area generated between a shape whose contour connecting the optimum image feature points and a shape whose contour connecting the estimated image feature points. The total evaluation calculating section 332 calculates a total error value based on these error evaluation functions D1, D2 and D3.

An optimum value determining section 327 determines an optimum value for each search parameter as local optimum parameter; successively calculates the local optimum value with respect to respective parameters of the position-and-attitude vector in the pre-designated order; and repeats this procedure predetermined times, thereby determining all the parameters of the position-and-attitude vector. The final data output section 328 outputs, as final output data, the values of the plural parameters of the position-and-attitude vector determined by the above-described optimum value determining section 327.

A memory 334, qualifying as memory means, stores the information required for recognizing the position and attitude. More specifically, the memory 334 comprises a 3-D shape data section 334a, a teaching information section 334b, an approximate position-and-attitude information section 334c, a search order designating information section 334d, a required accuracy data section 334e, and a judging threshold value setting section 334f.

Next, an operation of the fourth embodiment will be explained with reference to FIGS. 25 to 35.

Figure 24:
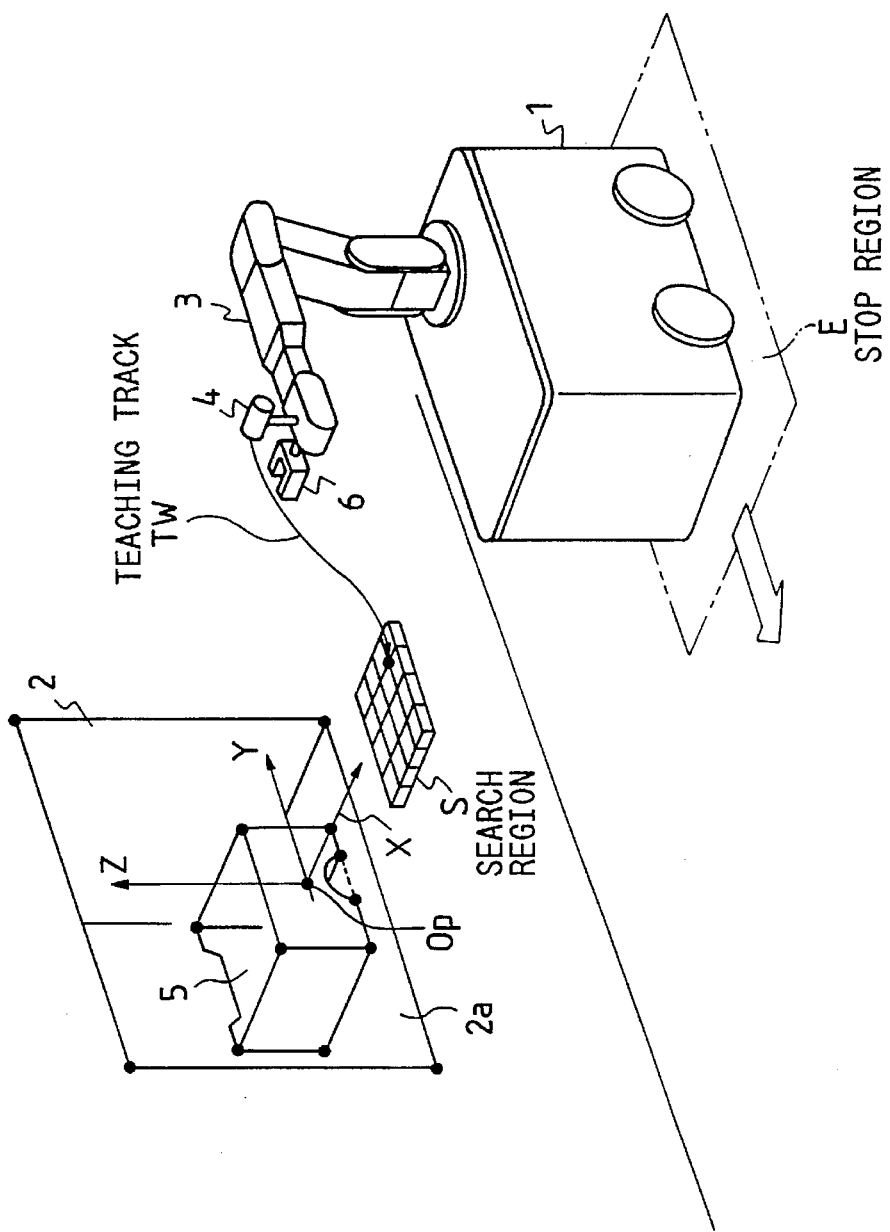
FIG. 24 is a view illustrating the relationship between an autonomous mobile robot and a work area in accordance with the fourth embodiment of the present invention.
Figure 25:
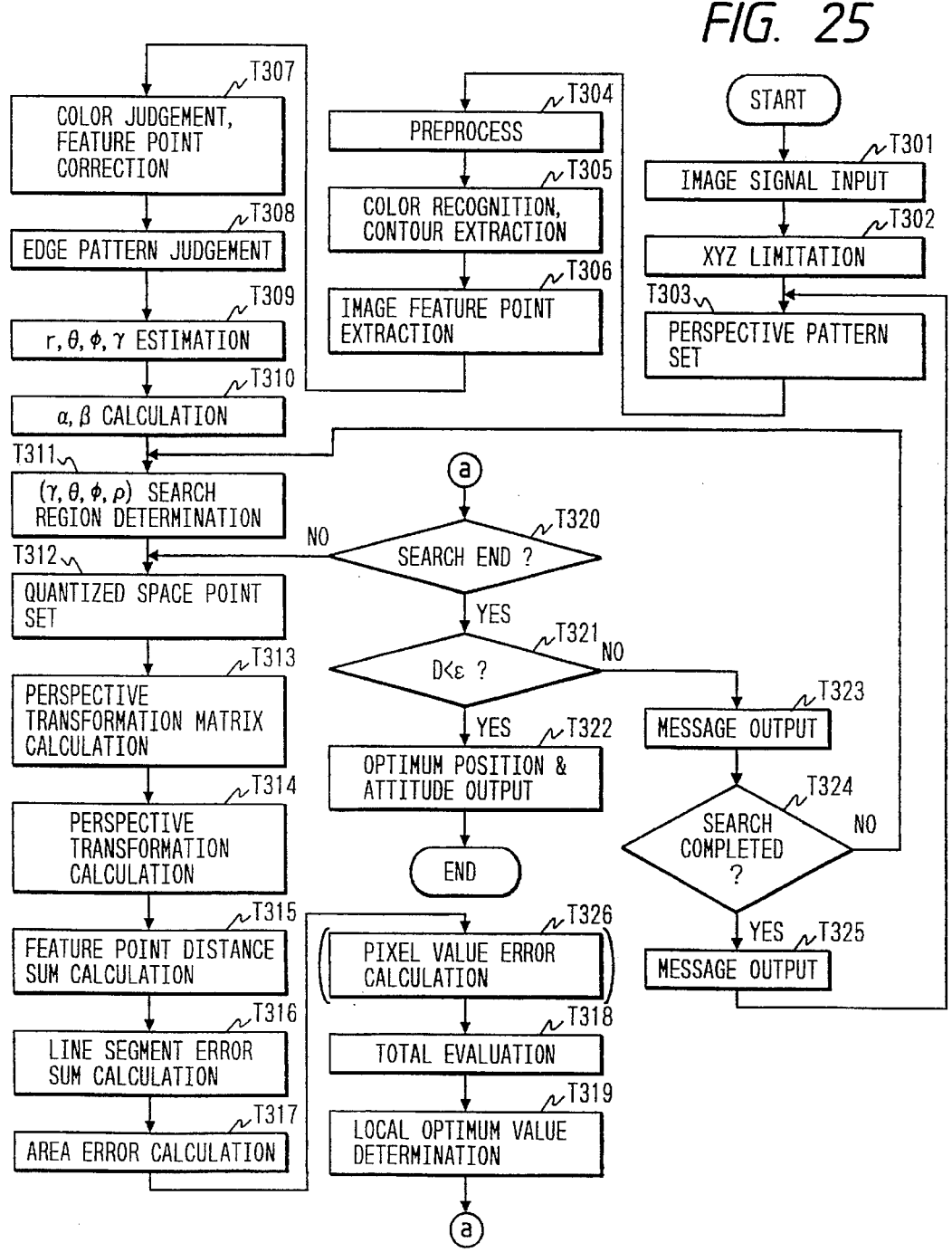
FIG. 25 is a flowchart schematically explaining the processes of the fourth embodiment of the present invention.

The 3-D position-and-attitude recognition apparatus acts according to the steps shown in the flowchart of FIG. 25 to recognize the position of the autonomous mobile robot 1. First of all, in the condition shown in FIG. 24, when the autonomous mobile robot 1 travels on the rails and approaches the work area 2—namely, when the autonomous mobile robot 1 stops within a predetermined stop region E based on the sensor and program information, the arm 3 is controlled to move toward the work area 2 qualifying as an object according to the control data which is pre-taught. The camera 4 comes to the position confronting with the workpiece 5 along the teaching track TW as shown in FIG. 24.

With this shift control, the workpiece 5 comes into an image pickup zone of the camera 4 with a predetermined perspective view. Assuming that the six perspective views of FIGS. 19(A) to 19(F) are set as image pickup patterns of the workpiece 5, the pre-teaching data, for example, designates the perspective pattern 19(B) as an image view taken by the camera 4.

The camera 4 is shifted toward the workpiece 5 along the teaching track TW until the contour of the workpiece 5 shown in the image pickup screen coincides with the specific perspective view. Therefore, as described later, the search region can be limited within a narrow region as shown by S in FIG. 24. Furthermore, extraction of feature points and identification of these feature points can be promptly executed on the basis of the image information of the workpiece 5.

The image processing section 307 initiates inputting image signals of the workpiece 5 from the camera 4. (Step T301) The absolute coordinate limiting section 317 gives the data identifying the perspective pattern (e.g. the pattern of FIG. 19(b)) to the perspective view selecting section 314 on the basis of the data given from the teaching information section 334b of the memory 334. (Step T302) The perspective view selecting section 314 sets one perspective pattern on the basis of this data. (Step T303) Thus, the remaining search process focuses on the pattern of FIG. 19(B) and executes further search about the conditions of, for example, the patterns of FIGS. 20(A) to 20(C).

Next, in a step T304, the preprocess section 308 executes the preprocessing, such as noise removal process and digital processing based on the image data to convert an image signal into a digital signal. Thereafter, the color recognizing section 309 recognizes color on the basis of the digital image data, and the contour extracting section 310 extracts a contour of the workpiece 5 to be displayed on the image screen, based on the color information recognized by the contour extracting section 310. (Step T305) Subsequently, in a step T306, the feature point extracting section 311 receives the result of the step T305 and extracts the coordinate data of the feature points representing the contour of the workpiece 5 displayed on the image screen as image feature points, based on the digital image data. In this case, image feature points $Q_j$ on the perspective pattern are interrelated and extracted so as to correspond to the feature points Pi of the workpiece 5 as shown in FIGS. 9(A) and 9(B).

Next, when the workpiece 5 has characteristic color as an object, the color judging section 312 judges the color vector expressed in terms of level values of a plurality of color components. On the basis of this color judging result, the feature point correcting section 313 corrects a dissecting region of the object so that the image feature point thus extracted is corrected to be a more accurate image feature point. This is the correction chiefly for the change of environmental condition and illumination difference of the work area 2 in which the workpiece 5 is placed, because the contour of the workpiece 5 may not be accurately detected from the image display screen when the brightness is merely differentiated by using the binary coded data only.

Figure 26:
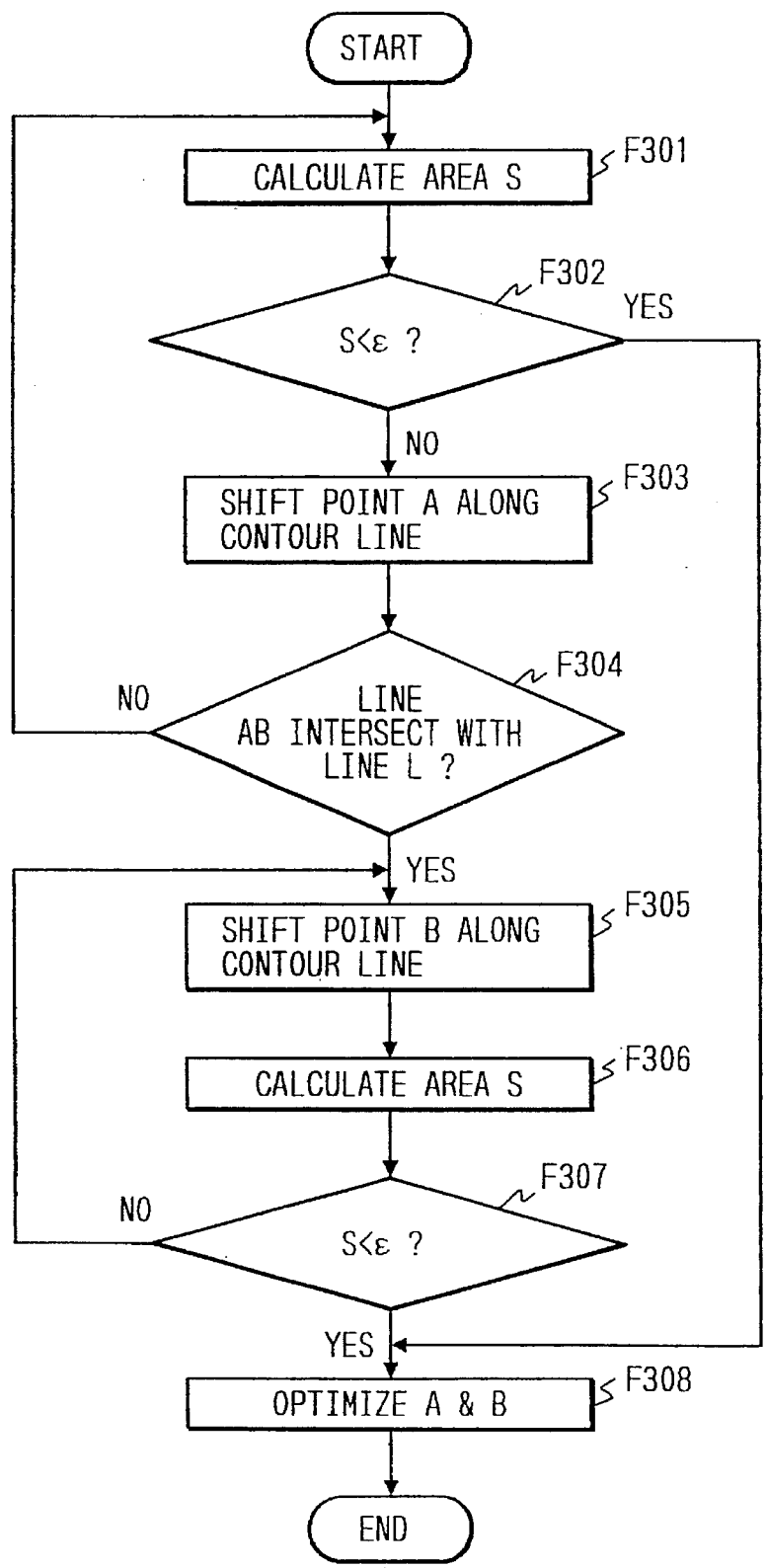
Figure 27:
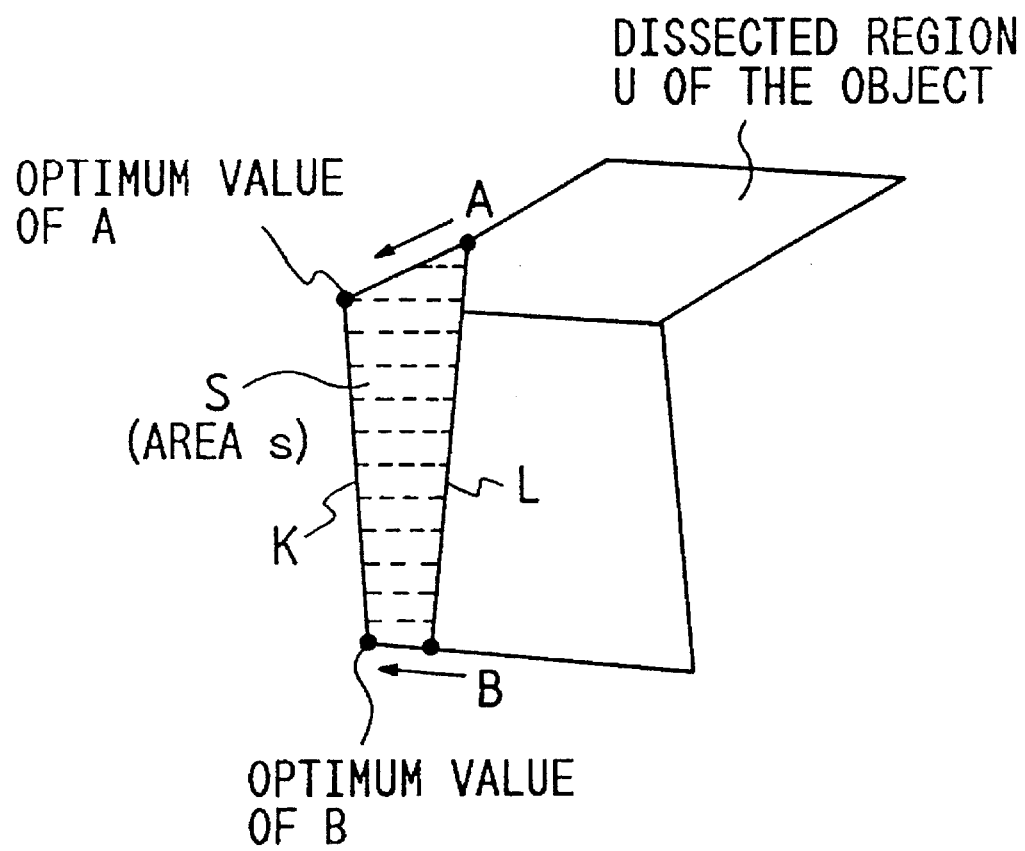
FIG. 27 is a view illustrating feature point correction in accordance with the fourth embodiment of the present invention.

The feature point correcting section 313 executes the correcting calculation of the image feature points in accordance with the flowchart shown in FIG. 26. Let us assume that an actual straight line edge K of the workpiece 5 is shown in FIG. 27, and the feature points extracted by the feature point extracting section 311 are positioned at points A and B, spaced from the straight line edge K.

First of all, designating a line segment AB connecting these feature points A and B as a provisional straight line edge L, an area s of a region S encircled by the contour on the image display screen and the straight line edges K, L is calculated. (Step F301). Next, it is judged whether the area s of the region S is smaller than a predetermined allowable error $\epsilon$. (Step F302) If this condition is not satisfied, the feature point A is shifted a predetermined distance toward the straight line edge K along the contour. (Step F303)

If the line segment AB (straight line edge L) does not intersects with the straight line edge K (Steps F304), the program returns to the step F301 and calculates the area s of the region S until. This return in the program is repeated until the area s becomes smaller than the allowable error $\epsilon$. If the requirement of the step F302 is satisfied, the program jumps to a step F305. On the other hand, if the line segment AB and the straight line edge K intersect with each other before the requirement of the step F302 is fulfilled, the program proceeds to a step F305 to shift the feature point B a predetermined distance toward the straight line edge K along the contour.

Thereafter the area s of the region S is calculated (Step F306) and, then, it is judged whether the area s is smaller than the predetermined allowable error $\epsilon$ (Step F307). If the judging requirement is not satisfied, the steps F305, 306 and F307 are repeated in the same manner. If the requirement is satisfied, then the program proceeds to a step F308.

The positions of the feature points A and B thus obtained become optimum feature points Qj. A set of the optimum feature points Qj are expressed by the following equations 53 and 54.

$$Q=\{Qj: j=1, 2, \cdots, m\} \quad (53)$$

$$Qj=(u_j, v_j) \quad (54)$$

Where, $u_j$ and $v_j$ are element values representing each image feature point Qj in the 2-D coordinates on the image pickup screen.

Obtaining the set Q of the optimum feature points Qj in this manner, the judgement of the edge pattern is executed on the basis of data of these optimum feature points Qj. (Step T308). On the basis of this judgement, the parameters representing the position-and-attitude of the camera 4 are estimated. (Steps T309 and 310) Then, the search region is determined using these results. (Steps T311)

In this embodiment, the parameters of the camera 4 are as follows:

(a) Attitude parameters CP($\alpha$, $\beta$, $\gamma$);

(b) focal distance parameter f; and (c) position parameters (r, $\theta$, $\phi$).

FIG. 16 shows the relationship of these parameters. The focal distance f is a data inherently determined depending on the characteristic of the camera 4; therefore, the memory 334 stores it as focal distance data beforehand. Let us assume that the optical axis of the camera 4 is defined by a z axis, the horizontal direction of the camera 4 is an x axis, and a vertical direction of the camera 4 is a y axis. The attitude parameters CP are defined as follows: the parameter $\alpha$ represents a rotational angle about the x axis; the parameter $\beta$ represents a rotational angle about the y axis; and the parameter $\gamma$ represents a rotational angle about the z axis. Furthermore the position parameters are polar coordinate values representing the view point of the camera 4 with respect to the origin of the 3-D absolute coordinates system. Namely, r represents a distance while $\theta$ and $\phi$ represent inclined angles.

After the edge pattern judging section 318 judged the edge pattern of the contour, the position estimating section 319 and the attitude estimating section 320 estimate the approximate values of the parameters of the camera 4 to be searched. Namely, deviation between the estimated edge line L and the actual edge line K is calculated, wherein the estimated edge line L is a contour presumed based on the approximate estimation data, while the actual edge line K is a line segment formed by connecting the optimum feature points Qj. The result of this calculation is used for making a judgement of the edge pattern, for example, shown in FIGS. 28 to 32.

Figure 28A:
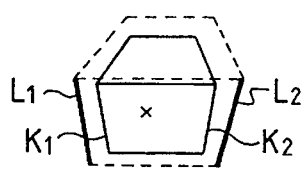
FIGS. 28(A) and 28(B) are views explaining the estimation of deviation with respect to the parameter r, using the edge line judgement in accordance with the fourth embodiment of the present invention.
Figure 28B:
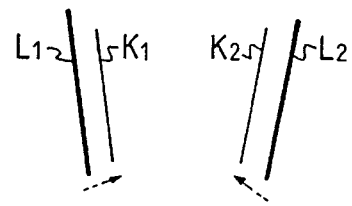

FIG. 28(A) shows a condition where estimated edge lines L1 and L2 are too much larger than actual edge lines K1 and K2. In such a case, a distance parameter r, one of the position parameters of the camera 4, is changed to r' as shown in FIG. 28(B). The r estimating subsection 319a of the position estimating section 319 calculates a variation width $\delta_r$ for shifting the estimated edge lines L1 and L2 in accordance with equations 55 and 56.

$$r' = \left| \frac{x_{L1} - x_{L2}}{x_{K1} - x_{K2}} \right| \cdot r \quad (55)$$

$$r' = \left\{ \frac{1}{N} \cdot \sum_{N}^{i=1} \frac{\text{Norm}(Li)}{\text{Norm}(Ki)} \right\} \cdot r \quad (56)$$

Where, Norm (L) represents the length (pixel value) of the line segment L and $x_L$ represents an x coordinate value (pixel value) of a central point of the line segment L.

Figure 29A:
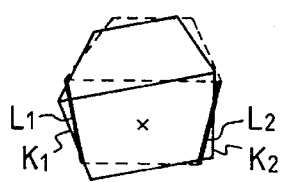
FIGS. 29(A) and 29(B) are views explaining the estimation of deviation with respect to the parameter $\gamma$, using the edge line judgement in accordance with the fourth embodiment of the present invention.
Figure 29B:
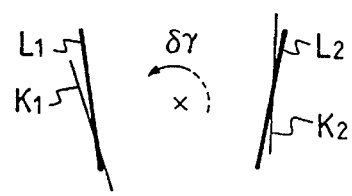

FIG. 29(A) shows a condition where the estimated lines L1 and L2 intersect inclinedly with the actual edge lines K1 and K2. This means that the optical axis of the camera 4 aiming the workpiece 5 is inclined as shown in FIG. 29(B).

Accordingly, in such a case, the γ estimating subsection 320b of the attitude estimating section 320 calculates a rotational variation width $\delta_\gamma$ for altering the attitude parameter γ, which represents a rotation about the optical axis, to γ' in accordance with the following equations 57 and 58.

$$\gamma' = \gamma + \delta\gamma \tag{57}$$

$$\delta\gamma = \frac{\Gamma(L_1) + \Gamma(L_2)}{2} - \frac{\Gamma(K_1) + \Gamma(K_2)}{2} \tag{58}$$

Γ (L); an inclination of the line segment L

Figure 30A:
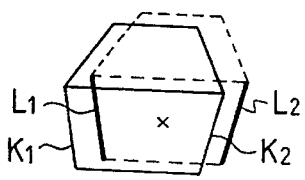
FIGS. 30(A) and 30(B) are views explaining the estimation of deviation with respect to the parameters $\alpha$ and $\beta$, using the edge line judgement in accordance with the fourth embodiment of the present invention.
Figure 30B:
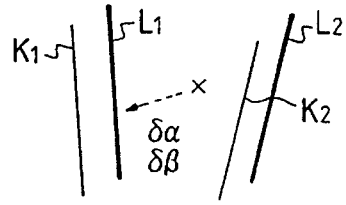

FIG. 30(A) shows a condition where the estimated edge lines L1 and L2 are offset parallel to the actual edge lines K1 and K2. This means that the position of the workpiece 5 is located far from the central position. In such a case, the αβ calculating subsection 320a of the position estimating section 320 calculates rotational variation widths $\delta_\alpha$ and $\delta_\beta$ for altering the attitude parameters α and β to α' and β' in accordance with the following equations 59 to 62, so as to shift the optical axis of the camera 4 as shown in FIG. 30(B).

$$\alpha' = \alpha + \delta\alpha \tag{59}$$
$$\beta' = \beta + \delta\beta \tag{60}$$

$$\delta\alpha = \frac{W_H}{N_H}(Na' - Na) \tag{61}$$

$$\delta\beta = \frac{W_V}{N_V}(Nb' - Nb) \tag{62}$$

Where, WH represents the horizontal field angle of the camera; WV represents the vertical field angle of the camera; NH represents the horizontal image size (pixel value) of the image display screen; g represents the vertical image size (pixel value) of the image display screen; Na, Na' represent x coordinate values (pixel values) on the image display screen, representing the origin of the coordinates system; and Nb, Nb' represent y coordinate values (pixel values) on the image display screen, representing the origin of the coordinates system.

Figure 31A:
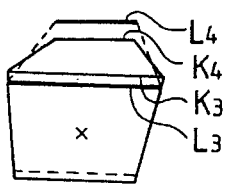
FIGS. 31(A) and 31(B) are views explaining the estimation of deviation with respect to the parameter $\phi$, using the edge line judgement in accordance with the fourth embodiment of the present invention.
Figure 31B:
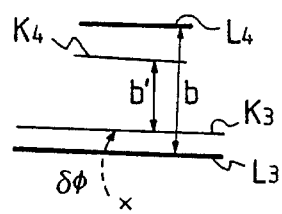

FIG. 31(A) shows a condition where the estimated edge lines L3 and L4 extending in the horizontal direction are offset in the up-and-down direction with respect to the actual edge lines K3 and K4, respectively. This means that the position parameter φ of the camera 4 is deviated. In such a case, the φ estimating subsection 319c of the position estimating section 319 calculates rotational variation widths $\delta_\phi$ for altering the attitude parameter φ to φ' in accordance with the following equations 63 and 64, so as to shift the position of the camera 4 in the up-and-down direction as shown in FIG. 31(B).

$$\phi' = \phi + \delta\phi \tag{63}$$

$$\delta\phi = \cos^{-1}\left(\frac{A \cdot b'}{a' \cdot B}\right) - \cos^{-1}\left(\frac{A \cdot b}{a \cdot B}\right) \tag{64}$$

Where, A represents an actual size of L3 in the 3-D space; B represents a 3-D distance between L3 and L4; a represents Norm (L3); a' represents Norm (K3); b represents a distance (pixel value) between L3 and L4; and b' represents a distance (pixel value) between K3 and K4.

Figure 32A:
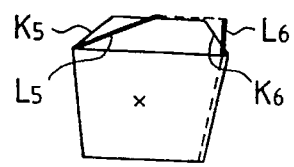
FIGS. 32(A) and 32(B) are views explaining the estimation of deviation with respect to the parameter $\theta$, using the edge line judgement in accordance with the fourth embodiment of the present invention.
Figure 32B:
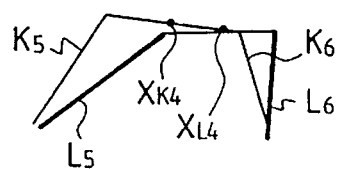

FIG. 32(A) shows a condition where the estimated edge lines L5 and L6 extending in the back-and-forth direction are inclined with respect to the actual edge lines K5 and K6, respectively. This means that the position parameter θ of the camera 4 is deviated. In such a case, the θ estimating subsection 319b of the position estimating section 319 calculates rotational variation widths $\delta_\theta$ for altering the attitude parameter θ to θ' in accordance with the following equations 65 and 66, so as to shift the position of the camera in the right-and-left direction as shown in FIG. 32(B).

$$\theta' = \theta + \delta\theta \tag{65}$$

$$\delta\theta = \sin^{-1}\left(\frac{x_{K4}}{P(r') \cdot B}\right) - \sin^{-1}\left(\frac{x_{L4}}{P(r) \cdot B}\right) \tag{66}$$

Where P(r) represents an actual size of a line segment which is parallel to the image pickup plane and spaced a distance r from a viewpoint, divided by the length (pixel value) on the image pickup plane.

As described above, executing the calculation of six parameters of the camera 4 in view of the condition of the actual edge line K based on the image data of the workpiece 5 with respect to the estimated edge line L based on the approximate positions, values of the search parameters r, θ, φ and γ to be searched next are estimated. (Step T309) Also, values of the position parameters α and β can be calculated. (Steps T310)

This results in that the camera parameter representing the position-and-attitude of the camera 4 becoming 4-dimensional position-and-attitude vector s [γ, θ, φ, r]. Namely, these unknown parameters γ, θ, φ and r are set as search parameters. By the way, in order to avoid any possible confusion between the parameters γ and r, the reference character "r" is replaced by "ρ" in the following description. Accordingly, the above position-and-attitude vector s [γ, θ, φ, r] is replaced by a position-and-attitude vector s [γ, θ, φ, ρ].

Next, in a step T311, the search region setting section 321 determines the search regions for the parameters γ, θ, θ and ρ, provided that the estimated values for respective parameters obtained as described above are not largely deviated from the approximate position-and-attitude information memorized in the memory 334.

Next in a step T312, in order to designate the search parameter to be searched in the quantized space point setting section 323, a variable h designating the search parameter to be searched is set "1" and "γ" is designated as the first parameter. Then, one point in the search region S (1) is set as a parameter search start point s (1, 1) for the search parameter γ. The parameter search start point s (1, 1) is an initial value of the parameter search point s (k, h), where k denotes a search repetition number. Furthermore, at the parameter search start point s (1, 1), a parameter search width δ (1, 1) is set with respect to the search parameter before executing the search. Next, the perspective transformation matrix calculating section 324 calculates a perspective transformation matrix M (1, 1) on the basis of 3-D position coordinate values of the parameter search start point s (1, 1), the values of the attitude parameters α and β obtained from the previous equations 59 and 60, and the initial value of the search parameter γ. (Step T313)

The perspective transformation matrix M is calculated in the following manner. Namely, in the 3-D absolute coordinates system (X, Y, Z) defined with respect to the origin $O_p$ of the workpiece 5, the initial search region S (1) is set. This initial search region S (1) is determined based on the stop region E of the autonomous mobile robot 1. An approximate position A0 (ρ0,θ0, φ0) represents the polar coordinate values of the approximate position A0 (X0, Y0, Z0) of the camera 4. Placing this approximate position A0 (ρ0,θ0, φ0) on the center, the position search region is determined in the following manner in view of stop position accuracy.

ρ0−Δρ1≦ρ≦ρ0+Δρ2

θ0−Δθ1≦θ≦θ0+Δθ2

φ0−Δφ1≦φ≦φ0+Δφ2

Regarding the attitude search region, the results of the equations 42 and 43 of the third embodiment are used for the parameters $\alpha$ and $\beta$. And, the region of $\gamma$ is determined as follows.

$$-\Delta\gamma1 \leq \gamma \leq \Delta\gamma2$$

Then, the perspective transformation matrix M is obtained based on the attitude parameters CP($\alpha$, $\beta$, $\gamma$) of the camera 4 and a distance d with respect to the projective plane and a view point position of the camera 4 obtained from the focal distance parameter f, in view of the relationship shown in FIG. 18.

The perspective transformation matrix M is expressed in the following equation.

$$M = T.M1.M2.M3 \qquad (67)$$

Where, T represents a transformation matrix for rotation, parallel shift, enlargement, contraction (in this embodiment, T is used for the calculation of rotation expressed by the attitude parameters of the camera 4); M1 represents a perspective transformation matrix from the workpiece to the projectlye space; M2 represents a perspective transformation matrix from a plane in the projectlye space to the projectlye plane; and MS represents a coordinate transformation matrix from the projectlye plane to the image display plane.

Where a product of perspective transformation matrixes M1.M2 and the coordinate transformation matrix M3 are expressed by the following equations 68 and 69.

$$M_1 \cdot M_2 = \begin{bmatrix} (d-\rho)\cdot\sin\theta & (d-\rho)\cdot\cos\phi\cdot\cos\theta & -\sin\phi\cdot\cos\theta \\ -(d-\rho)\cdot\cos\theta & (d-\rho)\cdot\cos\phi\cdot\sin\theta & -\sin\phi\cdot\sin\theta \\ 0 & -(d-\rho)\cdot\sin\phi & -\cos\phi \\ 0 & 0 & \rho \end{bmatrix} \qquad (68)$$

$$M_3 = \begin{bmatrix} NH/(2\cdot LH) & 0 & 0 \\ 0 & NV/(2\cdot LV) & 0 \\ 0 & 0 & 1 \end{bmatrix} \qquad (69)$$

$$LH = \rho \cdot \tan(wH/2)$$
$$LV = \rho \cdot \tan(wV/2)$$

Furthermore, the transformation matrix T is used to calculate the rotation in accordance with the attitude parameter CP ($\alpha$, $\beta$, $\gamma$) corresponding to the deviation of the optical axis of the camera 4. The transformation matrix T is expressed by the following equations 70, 71 and 72 as rotation transformation matrix rotating in order of $\gamma$, $\alpha$ and $\beta$, on the basis of the relationship shown in FIGS. 16 and 18.

$$T = T_0^{-1} \cdot T_{\gamma\alpha\beta} \cdot T_1 \qquad (70)$$

$$= \begin{bmatrix} A'(\theta,\phi) & 0 \\ -x_0 & 1 \end{bmatrix} \begin{bmatrix} R(\gamma,\alpha,\beta) & 0 \\ 0 & 1 \end{bmatrix} \begin{bmatrix} A(\theta,\phi) & 0 \\ x_1 & 1 \end{bmatrix}$$

$$x_0 = 0, x_1 = \rho \cdot \sin\phi \cdot \cos\theta$$
$$y_0 = 0, y_1 = \rho \cdot \sin\phi \cdot \sin\theta$$
$$z_0 = \Gamma, z_1 = \rho \cdot \cos\phi$$

$$A(\theta,\phi) = \begin{bmatrix} -\sin\theta & \cos\theta & 0 \\ -\cos\phi\cdot\cos\theta & -\cos\phi\cdot\sin\theta & \sin\phi \\ \sin\phi\cdot\cos\theta & \sin\phi\cdot\sin\theta & \cos\phi \end{bmatrix} \qquad (71)$$

$$R(\gamma,\alpha,\beta) = R_\gamma \cdot R_\alpha \cdot R_\beta = \qquad (72)$$

$$\begin{bmatrix} \cos\gamma & \sin\gamma & 0 \\ -\sin\gamma & \cos\gamma & 0 \\ 0 & 0 & 1 \end{bmatrix} \begin{bmatrix} \cos\alpha & 0 & -\sin\alpha \\ 0 & 1 & 0 \\ \sin\alpha & 0 & \cos\alpha \end{bmatrix} \begin{bmatrix} 1 & 0 & 0 \\ 0 & \cos\beta & \sin\beta \\ 0 & -\sin\beta & \cos\beta \end{bmatrix}$$

Next in a step T314, on the basis of thus calculated perspective transformation matrix M(1, 1), the perspective transformation calculating section 325 executes the calculation of perspective transformation to convert n feature points Pi of the set P, which represent the 3-D feature points of the work area 2 and the workpiece 5 mounted thereon, into coordinates on the 2-D image display screen. And then, the estimated image feature points Qei are obtained so as to correspond to respective feature points Pi. A set Qe of estimated image feature points Qei is expressed in the following manner.

$$Qe = \{Qei; i=1, 2, \cdots, n\} \ (n \geq m) \qquad (73)$$

$$Qei = (uei, vei) \qquad (74)$$

Where, uei and vei are element values of the estimated image feature point Qei on the 2-D coordinates of the image display screen.

Using the equation 67, the transformation from the set P of the feature points Pi to the set Qe of the estimated image feature points Qei is expressed in the following manner.

$$(uei, vei, 1) = (Xi, Yi, Zi, 1).M \qquad (75)$$

$$Pi = (Xi, Yi, Zi)$$

Where, (Xi, Yi, Zi) represents the 3-D absolute coordinates of the feature point $P_i$.

Next, each feature point Qj of the set Q representing the workpiece 5 taken by the camera 4 is compared with the 3-D feature point Pi of the workpiece 5 pre-memorized.

Subsequently, the error evaluation function calculating section 314 calculates an error evaluation function D (1, 1) between the image feature point Qj and the set Qe (=P.M) of the estimated image feature points Qei. (Step T315 to T318) In this case, each of the feature point distance sum calculating section 329, the line segment error sum calculating section 330, and the area error calculating section 331 executes the calculation in the following manner. Then, the total evaluation calculating section 332 obtains a total evaluation value.

The feature point distance sum calculating section 329 obtains a feature point distance sum dn from the error evaluation function D1 which calculates a value corresponding to the square error sum of the distance between the image feature point Qj and the estimated image feature point Qei. (Step T315)

Figure 33A:
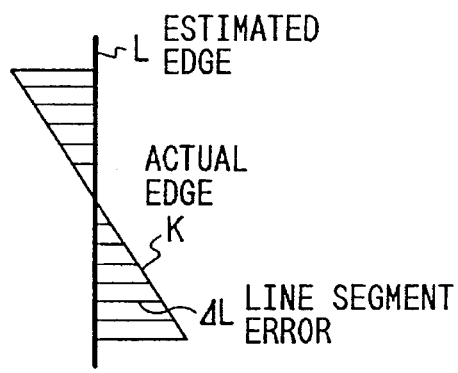
FIGS. 33(A) and 33(B) are views explaining line segment error sum in accordance with the fourth embodiment of the present invention.
Figure 33B:
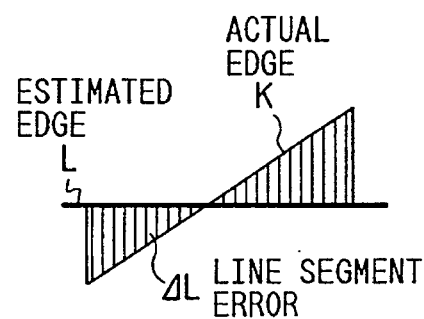

The line segment error sum calculating section 330 obtains a line segment error sum Ei from the error evaluation function D2 which obtains a sum of distances between the actual edge line K connecting the image feature points Qj and the estimated edge line L connecting estimated image feature points along scanning lines extending horizontally or vertically, as shown in FIGS. 33(A) and 33(B). (Step T316)

Figure 34A:
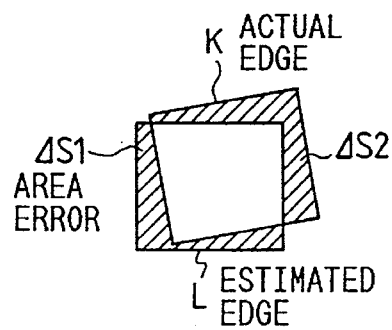
FIGS. 34(A) and 34(B) are views explaining area error sum in accordance with the fourth embodiment of the present invention.
Figure 34B:
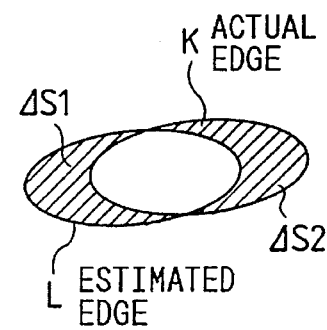

And, the area error calculating section 331 obtains an area error S from the error evaluation function D3 which calculates a sum of non-superimposed areas $\Delta S1$ and $\Delta S2$ between one figure formed by the actual edge line connecting the image feature points Qj and the other figure formed by the estimated edge line connecting the estimated image feature points Qei, as shown in FIGS. 34(A) and 34(B). (Step T317)

Figure 35A:
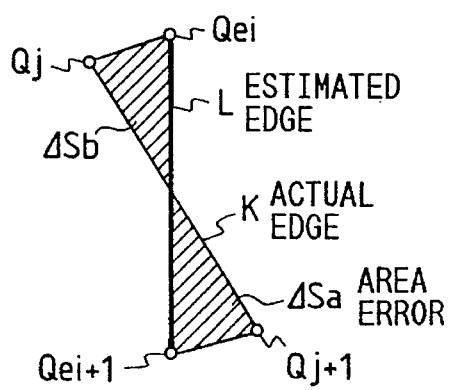
FIGS. 35(A) and 35(B) are views explaining area error sum in accordance with the fourth embodiment of the present invention.
Figure 35B:
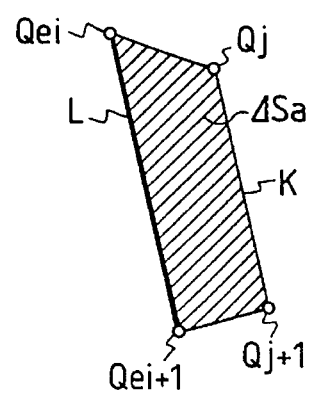

In the calculation of the area error, it will be preferable to obtain the area error S by calculating areas $\Delta Sa$, $\Delta b$ encircled by the actual edge line K connecting the image feature points Qj and Qj+1 and the estimated edge line connecting the estimated feature points Qei and Qei+1, as shown in FIG. 35.

Then the total evaluation calculating section 332 calculates a total error value from the total error evaluation function D defined by the following equations 76 and 77, wherein linear loads of the above-obtained three error values dn, Ei and S are calculated to obtain an error value with respect to the parameter search point s (k, h). (Step T318)

$$D = k_1 \cdot \sum_{n=1}^{N_p} dn + k_2 \cdot \sum_{i=1}^{N_L} \omega i \cdot Ei + k_3 \cdot S \qquad (76)$$

Wherein, km (m=1, 2 and 3) represents a load coefficient; dn (n=1, - - - , Np) represents a square distance relating to the feature point Pn; $\omega i$ (i=1, - - - ,$N_L$) represents a load coefficient; Ei (i=1, - - - , $N_L$) represents a line segment error sum (of the edge Li); and S represents an area error sum.

$$S = \sum_{i=1}^{N_L} \omega i \cdot S(i) \qquad (77)$$

Thereafter, the search procedure is continued by repeating the above-described steps with respect to the quantized parameter search points in the parameter search region of the search parameter $\gamma$ at intervals of the parameter search width $\delta$ (1, 1), in order to obtain a local optimum value $D_{min}$ (1, 1) which is the minimum value of the error evaluation function D. (Steps T319)

On the basis of the obtained local optimum value $D_{min}$ (1, 1), the search point where the above local optimum value $D_{min}$ is obtained is found. On the basis of the search parameter $\gamma$ at this parameter search point, a point s (1, 2) is determined as a position-and-attitude in this concerned parameter search region. In this calculating process, values of other parameters $\theta$, $\phi$ and $\rho$ are fixed at their initial values. Namely, the parameter $\gamma$ was searched independently.

Subsequently, thus obtained position & attitude parameter search point s (1, 2) is set as a new parameter search start point. Then, setting $\theta$ (h=2) as the next search parameter, the above-described steps are repeated so as to calculate a local optimum value $D_{min}$ (1, 2) with respect to the search parameter $\theta$. The search procedure for the search parameter $\theta$ is executed by repeating the above-described steps with respect to the quantized parameter search points in the parameter search region of the search parameter $\theta$ at intervals of the parameter search width $\delta$ (1, 2). After obtaining the local optimum value $D_{min}$ (1, 2) for the search parameter $\theta$, the search point where the above local optimum value $D_{min}$ (1, 2) is obtained is assigned to be s (1, 3).

In the same manner, for the remaining search parameters $\phi$ and $\rho$, the above-described steps are repeatedly executed. After obtaining a parameter search point s (1, 4) corresponding to a local optimum value $D_{min}$ (1, 4) of the search parameter $\phi$, a local optimum value $D_{min}$ (2, 1) of the search parameter $\rho$ is obtained. In this instance, a parameter search point s (2, 1) is believed to be a final local optimum value $D_{min}$ with respect to all the search parameters $\gamma$, $\theta$, $\phi$ and $\rho$ in the first search procedure.

Above-described search processes are thus repeatedly executed as much as a predetermined repetition number. (Step T320) In this case, the search region S (k) is renewed from the search region S (1) to a new search region S (2). In other words, the search region for the respective search parameters $\gamma$, $\theta$, $\phi$ and $\rho$ is narrowed in this second search process in taking account of the result of the first search process, so that the accuracy of the search is increased by setting a parameter search width $\delta$ (2, h) having a narrower width.

Furthermore the parameter search point s (2, 1), which corresponds to the final local optimum value $D_{min}$ (2, 1) in the first search process for the search parameters $\gamma$, $\theta$, $\phi$ and $\rho$, is newly set as a parameter search start point in the second search process, in order to execute the calculation in the same manner. Accordingly, the search process is successively and independently repeated with respect to all the search parameters $\gamma$, $\theta$, $\phi$ and $\rho$ until this calculating procedure is repeated K times.

After K (e.g. K=5) times repetitive executions of the above-described steps, the search procedure proceeds through the step T320 to a step T321. Subsequently, the optimum value determining section 327 makes a judgement as to whether the local optimum value $D_{min}$ corresponding to the finally obtained parameter search point s (6, 1) is smaller than a target error accuracy $\epsilon$. If the local optimum value $D_{min}$ is smaller than the target error accuracy, the final data output section 328 outputs the position vector s [$\gamma$, $\theta$, $\phi$, $\rho$] corresponding to the parameter search point s (6, 1) and the attitude parameters $\alpha$ and $\beta$ calculated in the step T305 as optimum position-and-attitude data. (Step T322)

On the contrary, if the local optimum value $D_{min}$ is always not smaller than the target error accuracy $\epsilon$ throughout a series of search processes, the program proceeds from the step T321 to a step T323 to output a message that no search point s satisfies the target error accuracy $\epsilon$. Then, the next search start point and a new search region S are set based at the point represented by the position-and-attitude vector s [$\gamma$, $\theta$, $\phi$, $\rho$] and the attitude parameters ($\alpha$, $\beta$) of the camera 4, which is the position of the parameter search point s (k, h) whose local optimum value $D_{min}$ is most closest to the target error accuracy $\epsilon$. Thereafter, the program returns to the step T311 to execute the same search procedure.

If the requirement of the step T321 is not satisfied at the time when these search processes are all finished, the program goes to a step T325 through the steps T323 and T324 to output a message that no search point s satisfies the target error accuracy $\epsilon$. Thereafter, the program returns to the step T303 to set a new perspective pattern and repeat the search process for obtaining the optimum position-and-attitude data.

The parameter search width $\delta$ needs to be sufficiently smaller than the target error accuracy $\epsilon$ when the search repetition number k becomes its maximum value K, meanwhile it will be allowed that the parameter search width $\delta$ is larger than the target error accuracy $\epsilon$ if the search repetition number k is fairly smaller than K. Thus, it becomes possible to promptly calculate the approximate position-and-attitude of the camera 4 in the beginning of the search by widely setting the parameter search width 5 on one hand, and to increase the accuracy of detection in the final stage of the search by finely setting the parameter search width $\delta$ on the other hand. In other words, reduction of calculating time and increase of accuracy can be both effectively realized.

By the way, it will be preferable to add the pixel value error calculating section 333 to the error evaluation function calculating section 326 which sets the error evaluation function based on a pixel value of a brightness or a color component of the pixel of the feature point, in order to execute a pixel value error calculation in a step T326.

The fourth embodiment of the present invention brings the following effects.

First, in the extraction of the feature points of the workpiece 5 from the image information to be taken by the camera 4, the color judging section 312 executes the color judgement of the color vector on the basis of the color information of the digital image data, and the feature point correcting section 313 executes the correction of the image feature points so as to extract the optimum image feature points in view of the area error when the feature points are shifted along the edge line. Accordingly, the search process can be executed based on the accurate image feature points.

Second, the edge pattern judging section 318 makes a judgement on the basis of the optimum image feature points extracted. The position estimating section 319 and the attitude estimating section 320 estimate the position-and-attitude parameters of the camera 4. Therefore, it becomes possible to set a narrow search region appropriately. Hence, the accuracy in the detection of position-and-attitude can be increased.

Third, the estimated image feature points are calculated from the perspective transformation matrix in the execution of the search process. The error evaluation function, which indicates an error value between the optimum image feature point based on the image information and the estimated image feature point, is calculated in the following manner. The feature point distance sum calculating section 329 calculates a sum of distances between the feature points; the line segment error sum calculating section 330 calculates a sum of line segment errors between the actual edge line and the estimated edge line; and the area error calculating section 331 calculates a sum of non-superimposed areas between the figure formed by the actual edge line and the figure formed by the estimated edge line. Thereafter, obtaining the linear loads of these error values, the error value is evaluated. Accordingly, compared with a simple calculation solely based on the feature point distance sum, it becomes possible to execute a search calculation sensitive to the tiny search error. Hence, the detection of the position-and-attitude of the camera 4 can be accurately executed.

Fourth, the autonomous mobile robot 1 and the arm 3 are controlled to take the position and attitude corresponding to a predetermined perspective view pattern. Thus, it becomes possible to execute the search process by narrowing the search region; therefore, the search time can be surely reduced. In other words, in the target search time, it becomes possible to set a smaller search width to increase the accuracy.

Fifth, the position-and-attitude vector s [γ, θ, φ, ρ] of the camera 4 is set. The estimated image feature points Qei of the workpiece 5 to be obtained at the parameter search point s (k, h) are obtained from the perspective transformation matrix M (k, h). Then, the local optimum value $D_{min}$ is calculated. Successive and independent search is cyclically repeated for each search parameter as much as the repetition number K. Finding the search point s satisfying the required error accuracy ε, the position vector s [γ, θ, φ, ρ] and the attitude parameters (α, β) of this search point s is output as optimum position-and-attitude data. Therefore, it becomes possible to assure that the highly accurate and robust recognition of the optimum position-and-attitude can be realized with the least search times.

Although the above embodiment pre-designated the search order of the search parameters γ, θ, φ and ρ, this search order can be flexibly changed. For example, if the parameter ρ has a great effect on the determination of the search region, this parameter ρ can be searched first. Anyway, the search order should be determined in view of efficiency of the search.

Figure 36:
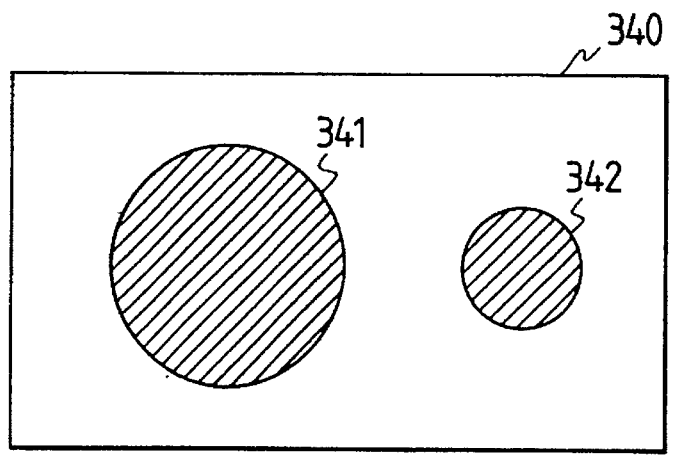
FIG. 36 is a plane view showing a marker adopted in the fourth embodiment of the present invention.
Figure 37:
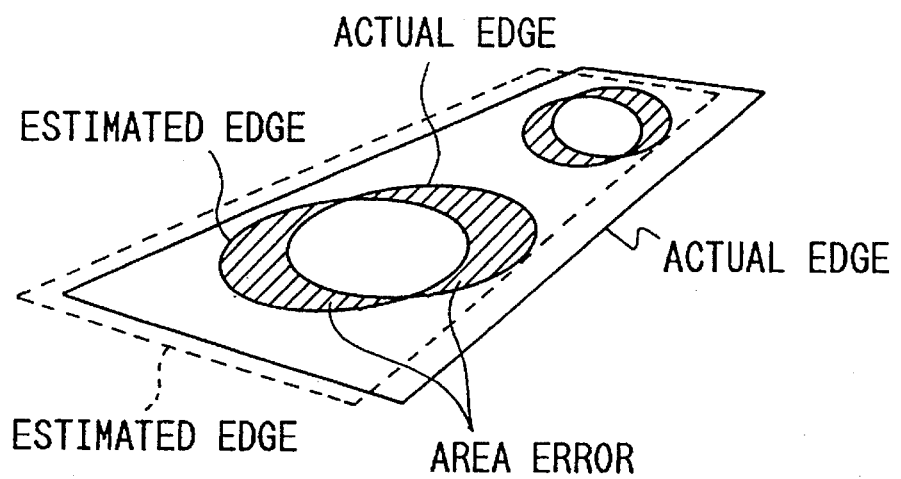
FIG. 37 is a view showing area error based on the marker shape displayed on an image pickup screen and an estimated edge line in accordance with the fourth embodiment of the present invention.

FIGS. 36 and 37 show a modified embodiment of the fourth embodiment, in which the detection of area error is applied to the marker 340 having a flat shape. As shown in FIG. 36, a large circle 341 and a small circle 342 are depicted on the marker 340. Contours of these circles are detected on the image display screen as ellipses 341 and 342 as shown in FIG. 37.

The area error is calculated on these circles 341 and 432, taking account of the non-superimposed areas of the large and small circles which are calculated on the basis of the approximate position-and-attitude data of the camera 4.

As described in the foregoing description, the present invention provides a position-and-attitude recognition method comprises: a image processing step for extracting 2-D image feature points representing structural characteristics of the object on the basis of the image information taken by an image pickup means; a feature point correcting step for obtaining an area error on the basis of the judgement of color information of the image signal and further obtaining the optimum image feature points by correcting contour of the object with reference to the area error; a search area setting step for setting a parameter search start point, space search region in accordance with the estimated distance given by the external information; a perspective transformation matrix calculating step for calculating a perspective transformation matrix for calculating 2-D estimated image feature points; a perspective transformation calculating step for executing the perspective transformation calculation; an error calculating step for finding the relationship between the image feature points and estimated image feature points and calculating an evaluation error value therebetween using the predetermined error evaluation function; a quantized space search step for finding, as a local optimum parameter, a parameter search point where the evaluation error value of the image feature point with respect to the estimated image feature point becomes minimum in the parameter search region; and a parameter value determining step for determining the values of the plural position-and-attitude parameters of the image pickup means based on the local optimum parameters when the evaluation error value is smaller than the predetermined required error accuracy. Accordingly, in the condition where the object whose 3-D absolute coordinates are known is taken a view by the image pickup means within a specific region corresponding to the specific perspective view of the object, the feature point correcting step corrects the image feature points to be more accurate optimum feature points and calculates the position-and-attitude parameters. Accordingly, highly accurate and robust detection of the feature points can be realized even if actual environment of the object disturbs the detection of the image information of the object.

Furthermore, the error calculating step obtains the relationship between the 2-D image feature points of the object extracted by the image processing step and the 2-D estimated image feature points calculated in the perspective transformation step. An evaluation error value, indicating the conformity between the image feature point and the estimated image feature point, is calculated on the basis of the error evaluation function, such as the feature point distance error evaluation function which obtains a sum of distances between the image feature points and the estimated image feature points; the line segment distance error evaluation function which obtains a deviation between the line segments connection the feature points; or the area error evaluation function which obtains an area error between figures formed by the feature points. Thus, the error evaluation function can be sensitively corrected in accordance with a tiny error of the position-and-attitude search caused due to line segment distance error and area error between the image feature points and the estimated image feature points. Accordingly, highly accurate and robust calculation of the position and attitude of the object can be realized with least search time.

Furthermore, in a case where the image pickup means is mounted on a mobile robot or the like, the control apparatus of the robot control the position of the robot so that the position of the image pickup means is set at a position where the perspective view of the object to be taken by the image pickup means is substantially identical with a specific pattern. Therefore, in the position-and-attitude recognition process, the search region can be limited within a narrow region. Hence, not only the estimation region of the unknown parameters can be fairly narrowed, but the search points can be finely set in the estimation region. Accordingly, high accuracy and promptness in the recognition of the position and attitude can be realized.

As this invention may be embodied in several forms without departing from the spirit of essential characteristics thereof, the present embodiments are therefore illustrative and not restrictive, since the scope of the invention is defined by the appending claims rather than by the description preceding them, and all changes that fall within meets and bounds of the claims, or equivalents of such meets and bounds are therefore intended to embraced by the claims.

What is claimed is:

1. A position and attitude recognition method for determining the position and attitude of an image pickup means with respect to an object having three-dimensional shape, the method comprising:

an image pickup step using the image pickup means for taking two-dimensional image information of the object;

an image processing step for extracting actual image feature representing the shape of an object, on the basis of said two-dimensional image information of said object taken by said image pickup means;

a search region setting step for setting a search region with a plurality of discrete space points having a required accuracy in discrete value and allocated in the vicinity of said image pickup means whose position and attitude are estimated based on external information;

perspective transformation equation calculating step for obtaining a perspective transformation equation for calculating two-dimensional estimated image feature of said object to be obtained when a view of said object is taken by said image pickup means located at each of said discrete space points of said search region, derived from the three-dimensional shape of said object;

an error calculating step for calculating an error between said actual image feature extracted by said image processing step and said estimated image feature calculated by said perspective transformation calculating step for each of said discrete space points; and a searching step for searching each of said discrete space points to find a space point which has a minimum error between said actual image feature and said estimated image feature, thereby determining the position and attitude of said image pickup means with respect to said object.

2. A position and attitude recognition method in accordance with claim 1, wherein said actual image feature and said estimated image feature are represented by actual image feature points and estimated image feature points, respectively.

3. A position and attitude recognition method in accordance with claim 2, wherein said error is calculated as an error based on a distance between an actual image feature point and an estimated image feature point.

4. A position and attitude recognition method in accordance with claim 2, wherein said error is calculated as an error between a line connecting said actual image feature points and a line connecting said estimated image feature points.

5. A position and attitude recognition method in accordance with claim 2, wherein said error is calculated as an area error between a shape whose contour connecting said actual image feature points and a shape whose contour connecting said estimated image feature points.

6. A position and attitude recognition method in accordance with claim 2, wherein said search region setting step sets said search region on the basis of an edge error between edge pattern formed by said actual image feature points and edge pattern formed by said estimated image feature points.

7. A position and attitude recognition method in accordance with claim 6, further comprising a judging step for judging error condition of said attitude based on said edge error, and a search region for attitude is determined on the basis of the result of said judging step.

8. A position and attitude recognition method in accordance with claim 1, wherein said error is calculated as a pixel value error between said actual image feature and said estimated image feature.

9. A position and attitude recognition method in accordance with claim 1, wherein said image processing step corrects said actual image feature on the basis of color information involved in said image information.

10. A position and attitude recognition method in accordance with claim 1, wherein said image pickup means is a single image pickup means.

11. A position and attitude recognition method in accordance with claim 1, further comprising steps of:

obtaining said perspective transformation equation between said actual image feature and absolute values of said object according to least-square estimation method;

obtaining an estimated perspective transformation equation based on said estimated image feature, wherein said error is obtained as error between components between said perspective transformation equation and said estimated perspective transformation equation.

12. A position and attitude recognition method in accordance with claim 1, wherein said search region setting step sets a plurality of search regions for renewal of said search region so as to repeatedly execute said search region setting step, said estimated image feature calculating step, and said error calculating step, thereby allowing said searching step to find a space point which reduces said error within a desired region.

13. A position and attitude recognition method in accordance with claim 12, wherein said search region setting step sets a new search region which is smaller than an older search region in said renewal of said search region.

14. A position and attitude recognition method in accordance with claim 1, wherein said estimated image feature is selected from perspective patterns memorized in memory means.

15. A position and attitude recognition method in accordance with claim 1, wherein said position and attitude are defined by a plurality of parameters, and said searching step is executed independently for each of said parameters.

16. A position and attitude recognition method in accordance with claim 15, wherein a parameter defining position is searched after a specific parameter defining attitude is fixed as a predetermined value.

17. A position and attitude recognition apparatus in accordance with claim 1, wherein said attitude, estimated by the external information, is estimated based on a deviation amount from a central position of an image plane of said two-dimensional image information.

18. A position and attitude recognition apparatus for determining the position and attitude of image pickup means with respect to an object having three-dimensional shape, said apparatus comprising:

image pickup means for taking two-dimensional image information of the object having three-dimensional shape;

image processing means for extracting actual image feature representing the shape of an object, on the basis of said two-dimensional image information of said object taken by said image pickup means;

search region setting means for setting a search region with a plurality of discrete space points having a required accuracy in discrete value allocated in the vicinity of said image pickup means whose position and attitude are estimated based on external information;

perspective transformation equation calculating means for obtaining a perspective transformation equation for calculating two-dimensional image feature of said object to be obtained when a view of said object is taken by said image pickup means located at each of discrete space points of said search region, derived from the three-dimensional shape of said object;

perspective transformation calculating means for obtaining estimated image feature of said object to be obtained when view of said object is taken by said image pickup means located at each of said discrete space point of said search region, based on said perspective transformation equation;

error calculating means for calculating an error between said actual image feature extracted by said image processing means and said estimated image feature calculated by said perspective transformation calculating means for each of said discrete space points; and position and attitude determining means for searching each of said discrete space points to find a space point which has a minimum error between the actual image feature and the estimated image feature, thereby determining the position and attitude of said image pickup means with respect to said object.

19. A position and attitude recognition apparatus in accordance with claim 18, wherein said search region setting point found by said position and attitude determining means, so as to execute search until said error becomes smaller that a predetermined value.

* * * * *